(12) United States Patent
Tachiwana et al.

(10) Patent No.: US 9,718,723 B2
(45) Date of Patent: Aug. 1, 2017

(54) GLASS ARTICLE

(71) Applicant: HOYA CORPORATION, Tokyo (JP)

(72) Inventors: Kazuo Tachiwana, Tokyo (JP); Junko Akojima, Tokyo (JP); Teruo Yamashita, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/648,821

(22) PCT Filed: Nov. 29, 2013

(86) PCT No.: PCT/JP2013/082275
§ 371 (c)(1),
(2) Date: Jun. 1, 2015

(87) PCT Pub. No.: WO2014/084380
PCT Pub. Date: Jun. 5, 2014

(65) Prior Publication Data
US 2015/0299029 A1 Oct. 22, 2015

(30) Foreign Application Priority Data

| Nov. 30, 2012 | (JP) | ................................ 2012-263738 |
| Nov. 30, 2012 | (JP) | ................................ 2012-263739 |
| Nov. 30, 2012 | (JP) | ................................ 2012-263740 |
| May 29, 2013 | (JP) | ................................ 2013-113431 |
| May 29, 2013 | (JP) | ................................ 2013-113432 |
| May 29, 2013 | (JP) | ................................ 2013-113433 |

(51) Int. Cl.
*C03C 3/247* (2006.01)
*G02B 3/00* (2006.01)
*G02B 1/00* (2006.01)
*C03C 21/00* (2006.01)
*C03C 23/00* (2006.01)

(52) U.S. Cl.
CPC ............ *C03C 3/247* (2013.01); *C03C 21/001* (2013.01); *C03C 23/008* (2013.01); *G02B 1/00* (2013.01); *G02B 3/00* (2013.01)

(58) Field of Classification Search
None
See application file for complete search history.

(56) References Cited

U.S. PATENT DOCUMENTS

| 5,053,360 A * | 10/1991 | Myers ....................... C03C 3/17 |
| | | 252/301.4 P |
| 6,093,484 A | 7/2000 | Oguma |
| 6,225,244 B1 * | 5/2001 | Oguma ..................... C03C 3/16 |
| | | 501/45 |
| 6,652,972 B1 * | 11/2003 | Conzone ................... C03C 3/17 |
| | | 156/106 |
| 2005/0188724 A1 | 9/2005 | Ikenishi et al. |
| 2015/0177422 A1 * | 6/2015 | Liu ......................... B29C 35/02 |
| | | 264/1.36 |

FOREIGN PATENT DOCUMENTS

| EP | 1814289 A1 | 8/2007 |
| JP | H02-153843 A | 6/1990 |
| JP | H10-330132 A | 12/1998 |
| JP | H11-209144 A | 8/1999 |
| JP | 3361270 B2 | 1/2003 |
| JP | 2005-281045 A | 10/2005 |
| JP | 2007-197283 A | 8/2007 |
| JP | 2008-088047 A | 4/2008 |
| JP | 2005-247658 A | 9/2008 |
| JP | 2009-167039 A | 7/2009 |
| JP | 2010-083733 A | 4/2010 |
| JP | 2010-108590 A | 5/2010 |
| JP | 2013-112585 A | 6/2013 |

OTHER PUBLICATIONS

Jun. 2, 2015 International Preliminary Report on Patentability issued in International Patent Application No. PCT/JP2013/082275.
Feb. 25, 2014 International Search Report issued in International Patent Application No. PCT/JP2013/082275.

* cited by examiner

*Primary Examiner* — David Sample
(74) *Attorney, Agent, or Firm* — Oliff PLC

(57) ABSTRACT

A glass article includes P, Al, an alkali earth metal, F and O, wherein the content of P and O is greater at the surface side of the glass article than the inner side thereof and the content of the alkali earth metal and F is less at the surface side of the glass article than the inner side thereof.

21 Claims, 10 Drawing Sheets

GLASS ARTICLE

BACKGROUND OF THE INVENTION

1. Field of the Invention

The invention relates to a glass article.

2. Description of Related Art

A glass article is used as many optical elements themselves or materials thereof. During a process of manufacturing the optical elements, processing liquids, foreign matters, or the like may adhere to a surface of the glass article, thus causing it to be contaminated. Therefore, a cleaning process is appropriately performed for the glass article so that the glass article is kept clean. Further, in order to rinse out cleaning liquid used for the cleaning process, a rinsing process is provided with the cleaning process. Examples of the rinsing liquids that are usually used for the rinsing process include pure water described in Patent Document 1, other deionized water (hereinafter referred to as DI water), or the like. Hereinbelow, the case of using the DI water for the cleaning process will be described by way of example. In addition, an organic compound such as IPA is also used as the rinsing liquid.

Further, while the glass article is transferred between processes or to a next process, it is necessary to temporarily store the glass article.

In the case of storing the glass article, it is considered that the glass article is stored in air or stored in contact with storage liquid. In the case of using the storage liquid, as described in Patent Document 2 for example, it is considered that the glass article is stored in the water.

Further, when the glass article is manufactured, the glass article is brought into contact with various kinds of liquids. Examples of the liquids include a polishing liquid, in addition to the above-described cleaning liquid, rinsing liquid and storage liquid. As the polishing liquid, technology of making the pH of the glass article to be similar to the pH of dispersion liquid containing a polishing agent therein is disclosed in Patent Document 3 by the same applicant as the invention. This technology is based on an idea of suppressing a chemical reaction between the glass article and the polishing liquid (refer to paragraph [0010] of Patent Document 3).

CITATION LIST

Patent Document (Patent Document 1) Japanese Patent Laid-Open Publication No. 2010-108590

(Patent Document 2) Japanese Patent Laid-Open Publication No. 2009-167039

(Patent Document 3) Specification of Japanese Patent No. 3361270

SUMMARY OF THE INVENTION

Technical Problem

However, if a glass article is subjected to a wet process (a process where liquid and glass come into contact with each other) including a grinding process, a polishing process, a cleaning process using cleaning liquid, a rinsing process using rinsing liquid, and a storing process and the like to manufacture a lens that is an optical element, browning or fogging may be generated or a latent scratch may appear on a surface of the lens unless the lens surface is coated with an anti-reflection film.

For example, when fluorophosphate glass having superior optical properties (anomalous dispersibility or low dispersibility) is subjected to several processes (grinding, polishing, cleaning, rinsing, storing and the like) using water (deionized water or pure water) as treatment liquid, dimming, staining and fogging may occur, or a latent scratch may appear. As a result, the surface quality of the glass article is considerably deteriorated.

Accordingly, an object of the present invention is to provide a glass article, which is capable of maintaining a high surface quality even though the glass article is subjected to a wet process.

Solution to Problem

In order to solve the above problems, the inventors carried out a detailed examination on fluorophosphate glass. Specifically, in the case of using water such as DI water or pure water as treatment liquid of the fluorophosphate glass, they paid attention to a change occurring in the proximity of a surface of the fluorophosphate glass. It is believed that the fluorophosphate glass has generally a network structure obtained by combining phosphorus P and oxygen O, and gaps of the network structure are filled with a component having a strong ion bonding ability, such as fluorine F. The inventors found that, if the surface of the fluorophosphate glass is in contact with water as treatment liquid, an alkali earth metal component or a F component that is a modifying component is eluted from the glass surface to water, and ions such as hydronium ions $H_3O^+$ or hydroxide ions $OH^-$ derived from water easily move into the glass, although the network structure is not largely affected. Moreover, the inventors have found that the migration of the hydronium ions or the hydroxide ions into the glass leads to the generation of dimming, staining and fogging on the fluorophosphate glass, the appearance of latent scratches, or the like.

Based on the above-mentioned knowledge, the inventors thought that a substance contained in the treatment liquid and a glass component contained in the glass are combined to produce a compound which is poorly soluble in water, thereby causing the glass surface to be poorly solubilized and suppressing the migration of the hydronium ions, the hydroxide ions or the like into the glass. Further, the inventors found that the above-described problems can be solved when the compound which is poorly soluble in water is densely present on the surface of the fluorophosphate glass. Based on the finding, the present invention is achieved.

Specifically, the inventors found that, when some of solute is combined with the glass component present on the surface of the fluorophosphate glass using the treatment liquid containing the solute and solvent, a compound which is poorly soluble in the solvent is formed on the surface of the fluorophosphate glass after it comes into contact with the treatment liquid, thus enabling to reconstitute the glass surface to some extent that it is possible to cause the glass surface to be poorly solubilized in the solvent and suppress hydrogen contained in the solvent from being moved into the glass (moved as the hydronium ions or hydroxide ions).

In other words, a new method is created, in which treatment liquid that is solution consisting of solvent and solute is used and the solute is adopted as a new source of the glass component in the glass article. Further, a new glass article is created, in which a content of a component capable of constituting the skeleton of the glass on a surface side (shallow part) of the glass article is greater than that on an inner side (deep part) thereof, in consideration of a composition of the glass article.

The present invention has a completely opposite point of view to the related art which suppresses the glass component from being eluted, as in Patent Document 1 or 2. That is, the present invention is based on an idea in which the solute is taken as one of the glass components. Particularly, technique described in Patent Document 3 and the present invention are based on the completely opposite ideas. The technique described in Patent Document 3 is made based on the suppression of a chemical reaction between the glass article and the polishing liquid. In contrast, the present invention is made based on the promotion of the chemical reaction, which rather actively takes some of the solute of the treatment liquid as one of the glass components on a glass surface layer.

Further, the treatment liquid of the present invention means liquids that are used to perform any one or more of grinding treatment, polishing treatment, cleaning treatment, rinsing treatment and storing treatment for glass, for instance, grinding liquid, polishing liquid, cleaning liquid, rinsing liquid and storage liquid.

The aspects of the present invention specifically realizing the above-described configuration are as follows.

A first aspect of the present invention provides a glass article containing P, Al, alkali earth metals, F and O, wherein contents of P and O are greater at a surface side of the glass article than an inner side thereof, and a total content of the alkali earth metals and a content of F are less at the surface side of the glass article than the inner side thereof.

A second aspect of the present invention provides the glass article described in the first aspect, wherein a content of the alkali earth metal may be less at the surface side of the glass article than the inner side thereof.

A third aspect of the present invention provides the glass article described in the first or second aspect, wherein a content of Al may be greater at the surface side of the glass article than the inner side thereof.

A fourth aspect of the present invention provides the glass article described in any one of the first to third aspects, wherein the glass article may be an optical element.

Advantageous Effect of Invention

According to the present invention, it is possible to provide a glass article, which is capable of maintaining a high surface quality even though the glass article is subjected to a wet process.

DETAILED DESCRIPTION OF EXEMPLARY EMBODIMENTS

Figure 1:
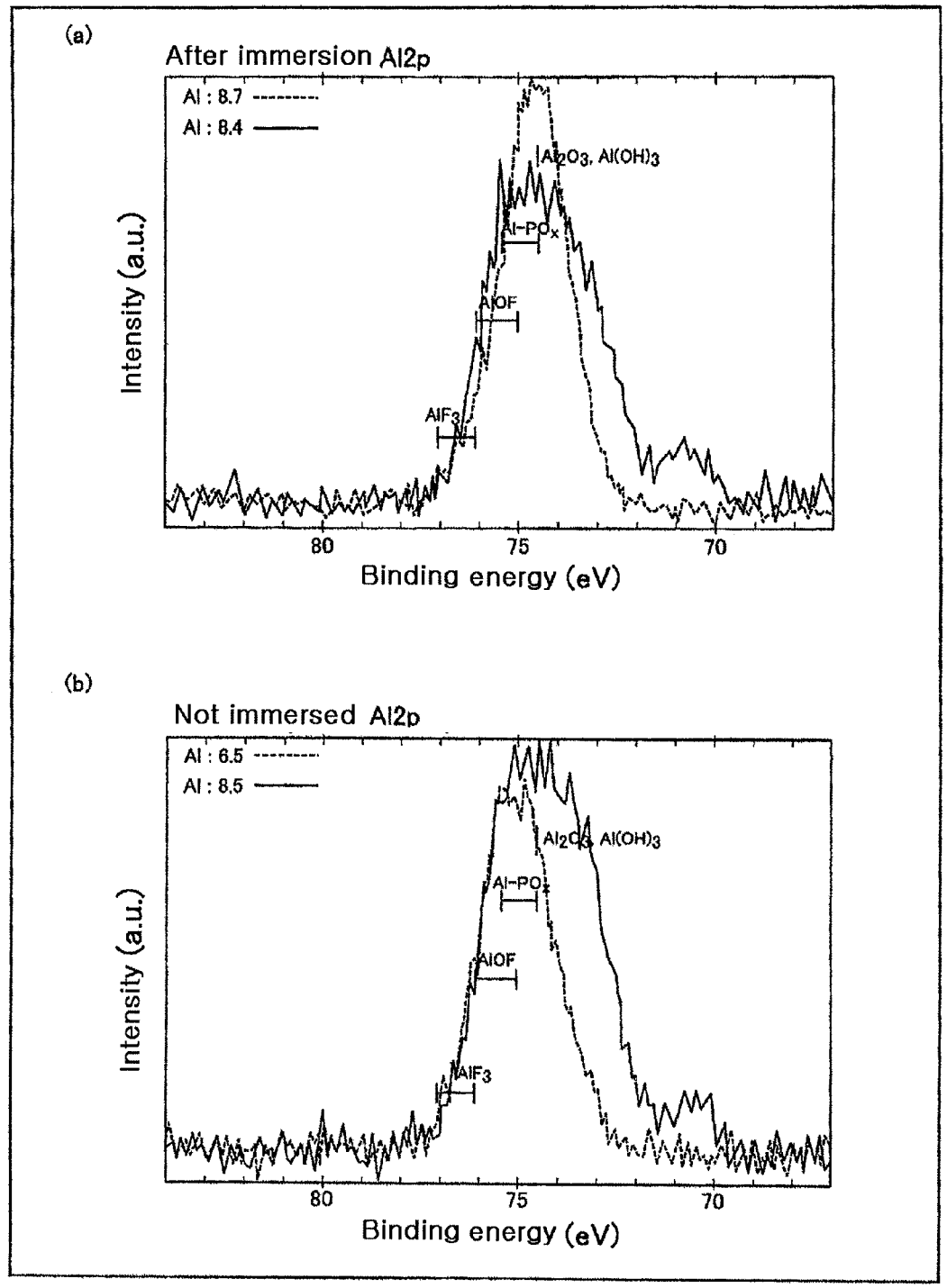
FIG. 1 is a graph showing results of performing XPS (X-ray Photoelectron Spectroscopy) for glass articles (glass substrates) according to Example 1 and a reference example, and is a graph showing results for Al. (a) shows the result of Example 1, and (b) shows the result of the reference example.

Hereinafter, exemplary embodiments of the present invention will be explained.

Exemplary embodiments will be described in the following order. Hereinafter, unless otherwise specifically mentioned herein, known technology may be used.

1. Method of manufacturing a glass article
   A) Preparation of the glass article
   B) Processings for the glass article
      a) CG processing
      b) Smoothing
      c) Polishing processing
      d) Defect suppressing treatment
      e) First cleaning
      f) First rinsing
      g) Centering processing
      h) Second cleaning
      i) Second rinsing
   C) Storage of the glass article
   D) Others (Deposition and the like)
2. Glass Article
3. Effects according to Exemplary embodiments
4. Variants Further, as for the exemplary embodiment, the case where the configuration of the present invention is applied to treatment liquid used in defect suppressing treatment that will be described later, and the case where this configuration is applied to cleaning liquid, rinsing liquid and storage liquid will be described. As described above, in the present invention, term 「treatment liquid」 may be liquid used in the defect suppressing treatment, may be liquid including 「cleaning liquid」 or 「storage liquid」, and may be liquid used to treat the glass surface and thereby prevent its quality from being deteriorated. Further, term 「cleaning liquid」 may be literally liquid having a cleaning purpose, may embrace liquid containing detergent for example, and moreover may include rinsing liquid used to rinse out the cleaning liquid, particularly the detergent.

1. Method of Manufacturing Glass Article

A) Preparation of the Glass Article

The glass article according to this exemplary embodiment indicate an optical element itself, a material (glass material) thereof, or an intermediate product in a stage prior to becoming a finished product. Examples of the glass material may include a preform for precision press forming and the like. This glass article is made of glass containing P, Al, alkali earth metals, F and O as glass components, and is not limited to a specific material or shape as long as it has a quality that is sufficient to act as the optical element. In this exemplary embodiment, a case where fluorophosphate glass is used as the glass article will be described. Likewise, the glass article is not limited to a specific composition.

B) Processing (Treatment) for the Glass Article a) CG Processing

As a cutting or grinding method for a glass article (e.g., optical element blank) formed to have a shape similar to an optical element of a final shape, a curve generating processing (CG processing) for forming a spherical surface processing, a toric surface processing, and a free curved surface processing is performed. A process of performing the CG processing is also referred to as a rough grinding process.

b) Smoothing

Smoothing is performed for the glass article that has been subjected to the CG processing. The smoothing is a process for trimming a glass article surface that is roughened due to the CG processing. The CG processing and the smoothing are polishing that is a stage before a subsequent polishing process, and are also referred to as the grinding process. In this grinding processing, the glass article surface (lens surface, etc.) is subjected to grinding while grinding liquid is supplied. This grinding liquid is liquid containing a surfactant and the like, and is used to enhance lubricity and cool an object to be processed during the grinding processing.

c) Polishing Processing

Subsequently, in the polishing process, while polishing liquid is supplied using a polishing tool that has a shape obtained by approximately reversing a lens shape, the lens surface is polished to have a smooth surface. The polishing liquid is liquid containing polishing particles (cerium oxide particles, zirconium oxide particles, etc.) that are several micrometers in particle size, for example.

Further, the glass article (lens and the like) may be processed by precision press forming, instead of the above-described a) CG processing, b) smoothing, c) polishing processing.

d) Defect Suppressing Treatment

As described above, in each process for manufacturing the glass article, the surface quality of the glass article may be undesirably deteriorated. In addition, in order to prevent the surface quality of the glass article from being deteriorated, there is an instance where it is necessary to use a substance that is large in environmental load.

In order to solve the above-described problems, according to this exemplary embodiment, the defect suppressing treatment is performed, which treats the glass article using the treatment liquid. This will be described below in detail.

First, the treatment liquid is a solution consisting of a solvent and a solute. Further, when the defect suppressing treatment is performed by causing the treatment liquid to be in contact with the glass article, the solute in question is used as a new source for the glass component in the glass article. In other words, some of the solute in question is intended to be freely combined with the glass component in the proximity of the surface of the glass article, and intended to be freely added as the glass component into the glass surface layer.

To be more specific, the glass article using the fluorophosphate glass in this exemplary embodiment forms a network by mainly bonding ions of P, O, Al and the like as a glass skeleton (network former). Since the substances are the glass component but mainly served to form the glass skeleton, these components are also referred to as 「glass skeleton substances」. Further, glass components such as $CaF_x$, $SrF_x$, $BaF_x$ and the like are present in gaps of the network. These components are also referred to as 「modifying substances」. Of course, the ions of P, O, Al and the like may be used as the modifying substances. However, a case where these ions are used as the glass skeleton substances will be described below.

If the glass article is immersed in pure water as in the conventional storing process before the article is subjected to the defect suppressing treatment, the modifying substances present in the proximity of the glass surface are eluted into the pure water. Then, substances (e.g., $H^+$ or $OH^-$) originating from water are introduced into portions from which the modifying substances are removed. Consequently, it is understood that the modifying substance represented by a metal compound is eluted so that the durability of the surface of the glass article is lowered and thereby defects occur or appear in the subsequent process of the manufacturing the glass article. Further, for the convenience of description, term 「defect suppressing treatment」 is used herein, but means the action of 「suppressing the occurrence or appearance of the defects」 in this treatment.

Meanwhile, when the defect suppressing treatment of this exemplary embodiment is performed, the modifying substance is eluted into the solvent of the treatment liquid (hereinafter referred to as the 「solution」), but some of the solute in the treatment liquid, for instance, phosphate ions are bonded to the glass components. That is, a new bond is created between the glass skeleton substance and some of the solute in the treatment liquid, thus causing the glass skeleton to be dense. Moreover, examples of another mechanism may include a mechanism where aluminum oxide (Al in an oxidation state) that is not involved in forming the network structure or other Al is changed into aluminum phosphate (Al in a phosphate state) and in addition, the aluminum phosphate is newly inserted into the network structure. In any case, as a result, it is believed that it is possible to suppress the durability of the surface of the glass article from being lowered and it is possible to suppress the defects from occurring in the subsequent process of manufacturing the glass article.

Further, when the defect suppressing treatment of this exemplary embodiment is performed, the surface of the glass article that has come into contact with the treatment liquid is reconfigured to be different from the surface before the contact with the treatment liquid, and aluminum phosphate is formed on the glass surface as a compound that is poorly soluble in the solvent, so that the glass surface becomes poorly soluble for the solvent. The reconfigured surface may suppress a component, contained in the treatment liquid and leading to a reduction in quality of the glass surface, namely, hydrogen from moving from the glass surface into the glass.

Further, the treatment liquid preferably has the buffer action of pH. In this exemplary embodiment, since the glass article is an article made of the fluorophosphate glass, the phosphate aqueous solution is preferably used as the treatment liquid. That is, it is preferable to use solution having water as the solvent and phosphate as the solute.

The reasons are as follows. First, the phosphate aqueous solution is the buffer solution, and may lead to a mild change in pH. This may reduce a possibility that $H^+$, $H_3O^+$ and $OH^-$ are introduced into the glass article.

Further, as for the treatment liquid, as described above, the conventional treatment liquid (DI water, pure water, or the like) significantly affects degradation in surface quality of the glass article. Generally, it is to be understood by those skilled in the art that water and a water-base treatment liquid are not necessarily desirable. However, the inventors obtained the above-described knowledge, and then employed water as the solvent based on the knowledge.

Therefore, the inventors made a research and devised the treatment liquid that may eliminate the aforementioned effect by adding solute that is a substance that may become the glass skeleton substance to solvent that is water. This treatment liquid allows even a type of glass article, in which components contained in the glass article are eluted into the water, to have the function of suppressing the degradation in the surface quality.

Water is a substance that is very convenient to use. If an organic compound such as IPA is used as the treatment liquid, this leads to harmfulness or odors when the treatment liquid is vaporized. Moreover, the use of the organic compound as the treatment liquid (cleaning liquid or storage liquid) incurs a high wastewater treatment cost, and thereby significantly affects the cost of the glass product such as the optical element. Therefore, in consideration of a worker's safety and an environment, it is very preferable that the treatment liquid uses water without using the organic compound.

Thus, the use of the fluorophosphate glass as in this exemplary embodiment solves the above-described problems by a method in which water may be used as the solvent of the treatment liquid and a compound which is capable of making the solute as a new supply source of the glass component in the glass article as described above is added to the water. Consequently, it is possible to suppress the degradation in surface quality of the glass article while guaranteeing working safety and reducing a load to an environment. Further, a whole surface of the glass article may not require a high quality. For example, faces other than an optical functional face of the optical element, for example, a face corresponding to an edge of the optical lens do not undergo a reduction in performance as the optical element even though latent scratches appear or browning occurs. Therefore, the surface of the glass article in this exemplary embodiment indicates a face (e.g., the optical functional face of the optical element) at least requiring the high quality in the surface of the glass article, and is not necessarily the whole surface of the glass article. Further, the optical functional face means a face used for the transmission, refraction, reflection, diffraction and the like of light of the optical element to be controlled. The optical functional face of the optical element is frequently the surface of the glass article, like the optical functional face of the lens.

Other preferred examples of the exemplary embodiment may include a case of using an aqueous solution containing the same kind of ion as the component contained in the glass skeleton substance, as the treatment liquid. To be more specific, the glass article is a glass article containing P, the solvent of the treatment liquid is water, and the solute of the treatment liquid contains phosphate.

Further, the same kind of ion means the same ion or ion that is in equilibrium with the same ion, and is the phosphate ion in this exemplary embodiment. That is, this indicates a state where P and O that are components contained in the glass article become the phosphate ion when they are eluted from the glass article. In this case, the ⌈same ion⌋ contained in the treatment liquid indicates $P_xO_y^{n-}$ (x, y and n are natural numbers), for example $PO_4^{3-}$, and the ⌈ion that is equilibrium with the same ion⌋ indicates ions that are in equilibrium of electrolytic dissociation with $P_xO_y^{n-}$, for example, include $HPO_4^{2-}$ and $H_2PO_4^-$ as well as $PO_4^{3-}$.

Further, the treatment liquid of this exemplary embodiment has pH which is preferably in the range of 3 to 9.8, more preferably 5 to 9, still more preferably 6 to 8, yet more preferably 6.5 to 7.5, and particularly preferably 6.6 to 7.3. This range of pH prevents the components contained in the glass article from being excessively eluted from the glass article. Particularly, when the phosphate aqueous solution is used as the treatment liquid, the phosphate aqueous solution has the dissociation equilibrium state of three stages, and a change in pH is reduced in three states where pH=2.15, 7.20 and 12.38. Above all, pH is preferably in range of 5 to 9 to cover pH=7.20. Further, according to this exemplary embodiment, it is still much more preferable to use the aqueous solution containing phosphate ion $PO_4^{3-}$ therein and being controlled to have pH around 7 as the treatment liquid.

Hereinafter, specific examples of the treatment liquid according to this exemplary embodiment will be described in detail.

The treatment liquid is the solution containing the solute and the solvent. In this exemplary embodiment, aqueous solution containing phosphate ions $PxOy^{n-}$, for example, $PO_4^{3-}$ and alkali metal ions is used as the example of the treatment liquid. It is preferable that the pH of the aqueous solution is controlled by these ions. To this end, the treatment liquid contains phosphate as the solute and water as the solvent. As the phosphate, sodium dihydrogen phosphate ($NaH_2PO_4$), disodium hydrogen phosphate ($Na_2HPO_4$), sodium phosphate ($Na_3PO_4$), potassium dihydrogen phosphate ($KH_2PO_4$), hydrogenphosphate potassium ($KH_2PO_4$), potassium phosphate ($K_3PO_4$) and the like are exemplified without being limited to the particular phosphate. However, if a substance (chelate complex), having a chelate effect although it is a phosphate compound, such as tripolysodium phosphate (STTP $Na_5P_3O_{10}$) is used as the solute, metal ions are inserted into a substance having the chelate effect, thus causing the degradation in the quality of the glass surface. Therefore, it is preferred that the substance having the chelate effect is not added to the treatment liquid and the treatment liquid contain no substance having the chelate effect. The treatment liquid may be a solution produced by dissolving the solute such as phosphate in the solvent, or be a solution produced by adding acid and alkali in the solvent to neutralize it and then have the same state as a state where the solute is dissolved in the solvent. In any case, the treatment liquid contains the solute and the solvent.

Specific examples of the treatment liquid include, for example, treatment liquid obtained by mixing sodium dihydrogen phosphate and disodium hydrogen phosphate in a mole ratio of 1:1, and then introducing the mixture into the DI water or pure water such that phosphorous and sodium have a concentration in the range of 10 to 1000 ppm, respectively. Alternatively, a predetermined concentration of sodium dihydrogen phosphate aqueous solution and a predetermined concentration of disodium hydrogen phosphate aqueous solution may be prepared and then mixed with each other. Here, if the introduction ratio of the sodium dihydrogen phosphate increases, the pH of the treatment liquid tends to be reduced. In contrast, if the introduction ratio of the disodium hydrogen phosphate increases, the pH of the treatment liquid tends to be increased. Thus, it is possible to easily adjust the pH of the treatment liquid by adjusting the introduction ratio of the phosphate component and the alkali component.

Further, the temperature of the treatment liquid is not limited to a specific temperature, but the temperature in the range of 5 to 60° C. including, for example, room temperature, may appropriately used.

In the treatment liquid, the phosphate that is the solute is electrolytic dissociated according to its dissociation constant, and phosphate ions ($H_2PO_4^-$, $HPO_3^{2-}$, $PO_4^{3-}$, etc.) are present. If the glass article (processed glass material) comes into contact with the treatment liquid, the phosphate ions are present in the proximity of the surface of the glass article. The phosphate ions are combined with at least one kind of the glass component in the glass surface, for example, Al. Since the Al component acts to form the network structure of the glass, some of the solute, namely, the phosphate ions in this exemplary embodiment are newly combined with the network structure that is previously present in the glass article before coming into contact with the treatment liquid, and aluminum phosphate that is a poorly soluble compound in the water is formed on the glass surface. As a result, the glass surface becomes poorly soluble in the water.

Examples of another mechanism include a mechanism where aluminum oxide that is not involved in forming the network structure is changed into aluminum phosphate and in addition, the aluminum phosphate is newly inserted into the network structure. In any case, such a new bond is generated in the proximity of the surface of the glass article or the glass material. As a result, it is possible to suppress hydrogen in the solvent leading to the deterioration in quality of the glass article, for example, hydronium ions ($H_3O^+$), hydroxide ions ($OH^-$) or the like from moving into the glass article.

In other words, the surface of the glass article that has come into contact with the treatment liquid is reconfigured as a surface that is different from the surface before the article comes into contact with the treatment liquid, and aluminum phosphate that is a poorly soluble compound with regard to the solvent is formed on the glass surface, so that the glass surface becomes poorly soluble with regard to the solvent. In addition, the reconfigured surface may suppress the component contained in the treatment liquid and leading to the deterioration in quality of the glass surface, that is, hydrogen from moving from the glass surface into the glass. Particularly, if the solvent of the treatment liquid is water, it is possible to suppress hydrogen, such as hydronium ions or hydroxide ions contained in water, from moving into the glass.

Further, it is considered that the above-described poor solubilization of the glass surface starts from a moment when the glass surface comes into contact with the treatment liquid. Thus, since the poor solubilization of the glass surface proceeds abruptly in an initial stage, the poor solubilization is sufficiently achieved even if the glass surface comes into contact with the treatment liquid for a short period time. Therefore, as long as the glass surface comes into contact with the treatment liquid even if the contact time is short, the above-described effect is obtained. Consequently, it is possible to suppress hydrogen from moving into the glass.

In contrast, if the treatment liquid is water (DI water, pure water, or the like), there is no solute that is combined with the glass component existing in the glass surface to produce a poorly soluble compound, so that the reconfiguration of the glass surface does not occur. Thus, it is impossible to suppress the hydrogen present in the water from moving into the glass. As a result, dimming, staining, and fogging occur, or latent scratches appear.

Meanwhile, if the ion bonding compound (e.g. a fluoride of the alkali earth metallic element) filling the gaps of the network structure in the glass article and being present therein is likely to be eluted into the treatment liquid, gaps are formed in the glass structure by the elution of the compound. Therefore, hydrogen leading to the deterioration in quality of the glass surface more easily move from the treatment liquid into the glass. Consequently, the deterioration in quality of the glass surface is further promoted.

However, in the exemplary embodiment, even if the glass component is likely to be eluted, some of the solute, such as phosphate ions, rather than hydrogen leading to the deterioration in quality of the glass surface preferentially moves into the gaps formed by the elution of the component, and is combined with Al that forms the network structure. In this way, the glass surface becomes poorly soluble with regard to the solvent.

Generally, it is undesirable that the components constituting the glass are discharged to the treatment liquid. However, in the exemplary embodiment, the elution of the alkali earth metal component or the F component suppresses hydrogen leading to the deterioration in quality of the glass surface from moving from the treatment liquid into the glass, thus being capable of suppressing the deterioration in quality of the glass surface.

Further, it is believed that the formation of the poorly soluble compound (the poor solubilization of the glass surface) resulting from the combination of some of the solute, for example, the phosphate ions and at least one kind of the glass components occurs in the proximity of the glass surface. Specifically, it is thought that such a structure is formed within 10 nm in the depth direction from the surface. Therefore, it is believed that such a structure rarely affects the optical properties (refractive index, dispersion value, or the like) of the glass article.

Further, it is thought that Zn does not form the network structure before the glass comes into contact with the treatment liquid and is present as the so-called modifying component. However, in the glass surface after the glass comes into contact with the treatment liquid, it is possible to form a substance that is combined with some of the solute introduced into the glass article and becomes poorly soluble in water. Therefore, if the fluorophosphate glass contains Zn, a substance (zinc phosphate) that is poorly soluble in water may be more preferably formed on the surface of the glass article.

Furthermore, in the exemplary embodiment, water is selected as the solvent. As described above, when the treatment liquid is water, hydronium ions, hydroxide ions, or the like move from the surface of the fluorophosphate glass into the glass, thus undesirably resulting in the deterioration in quality of the glass surface.

Although the use of isopropyl alcohol (IPA) as the treatment liquid may suppress the deterioration in surface quality of the fluorophosphate glass, the organic solvent is large in load to environment and is high in cost. Further, since the organic solvent mostly has volatility, a working environment that is sufficiently evacuated is required. Also, a filter is required to remove volatile gas from exhaust gas. If water may be used as the solvent, the above-described measures are not required. Further, since water is lower in cost than the organic solvent such as IPA, water is suitable as the solvent of the treatment liquid.

As such, the use of water as the treatment liquid has both merits and demerits. However, by using the above-described treatment liquid in the exemplary embodiment, the solute of the treatment liquid is combined with the glass component that is originally present on the surface of the glass article, thus suppressing hydrogen and the like in the treatment liquid from moving into the glass. Thus, since it is possible to enjoy only the merits occurring when water is selected as the solvent, water may be selected as the solvent even if it is conventionally considered that water is unsuitable to store the fluorophosphate glass.

In the exemplary embodiment, the treatment liquid preferably has the buffer action of pH. Some of the solute is combined with the glass component on the glass surface by consuming some of the solute. Thus, the solute of the treatment liquid may be considered as a material supply source for the poorly soluble compound to be formed on the glass surface. Therefore, even if some of the solute (e.g., phosphate ions (e.g., $PO_4^{3-}$) contained in liquid coming into contact with the surface of the glass article) is consumed to be newly combined with the Al component, etc. on the glass surface, the buffer action causes new phosphate ions ($PO_4^{3-}$) to be supplied to the treatment liquid. Further, even if hydrogen ions are increased in the treatment liquid, its variation may be reduced.

It may be determined whether the above-described structure is formed or not on the surface of the glass article after it comes into contact with the treatment liquid, by a method of comparing the kind and bond state of elements in the proximity of the surface. In the exemplary embodiment, this is determined by the following method, for example.

First, a glass article which is in a state before coming into contact with the treatment liquid and a glass article which is in a state after coming into contact with the treatment liquid are prepared. By measuring the surfaces of samples of the prepared glass article, using an X-ray photoelectron spectroscope, XPS spectrums are obtained. The photoelectron energy to be detected as the XPS spectrum reflects the kind or bond state of the elements existing in the proximity of the surface of the sample. Thus, the existence of the elements in the proximity of the surface may be estimated by considering a photoelectron energy value, a peak shift and the like for each element.

In the exemplary embodiment, a specific peak representing the bond state of each element to be obtained by the XPS is analyzed, and a sample before coming into contact with the treatment liquid is compared with a sample after coming into contact with the treatment liquid. Further, for example, if the solute contains P and O therein, the sample before the contact and the sample after the contact are compared with each other in peak intensity indicating a bond of P and O or a bond of P, O, and another metal. If the compared result shows that the peak intensity is increased in the sample after the contact, it is determined that some of the solute (P and O, i.e., phosphate ions) is combined with the glass component (Al and another metal) of the glass article in the proximity of the surface of the glass article by contact of the surface of the glass article with the treatment liquid. Quantitatively, an area ratio of regions to be surrounded by a base line and waveforms of respective elements of the XPS spectrum becomes an existence ratio of the respective elements. If a different bond state is present in the specific element, XPS spectrum waveforms may be separated into Gaussian function type waveforms for every bond state, and an area ratio of respective regions to be surrounded by the Gaussian function type waveforms and the baseline becomes the existence ratio of the elements present in respective bond states.

The X-ray photoelectron spectroscopy (XPS) method may not detect a hydrogen element, but an amount of the hydrogen element on the surface of the glass material or the glass article may be measured by a secondary ion mass spectroscopy (SIMS) method, for example. Thus, in the analysis by the SIMS, an analysis result of the glass article before the contact with the treatment liquid is compared with an analysis result of the glass article after the contact with the treatment liquid, so that it can be directly seen that the movement of the hydrogen into the glass which is being treated was suppressed.

The treatment liquid used in this defect suppressing treatment may be applied as polishing liquid, cleaning liquid, rinsing liquid and storage liquid. Thus, when the glass article according to the present invention is manufactured, the defect suppressing treatment is not necessarily provided as an independent process. The defect suppressing treatment may be performed simultaneously in the course of the polishing processing, the cleaning process, the rinsing process, and the storing process by using a predetermined treatment liquid.

This is the d) defect suppressing treatment in the exemplary embodiment. Subsequently, the e) first cleaning process is carried out.

e) First Cleaning (Process)

In order to remove an adhesive material (polishing liquid, polishing agent or the like) from the surface of the glass article which has been subjected to the polishing processing, the glass article is cleaned. Although the cleaning process known to those skilled in the art may be employed, the cleaning process is preferably performed using liquid produced by adding detergent to the treatment liquid used in the above-described d) defect suppressing treatment which is the main characteristics of the exemplary embodiment. Specifically, the glass article (optical lens) that has been subjected to the polishing process is placed on a holder, and then is immersed in a cleaning tank storing the cleaning liquid produced by adding the detergent or surfactant to the above-described treatment liquid, so that the glass article is cleaned (cleaning process). Preferably, a ultrasonic wave of a predetermined frequency (e.g., 50 kHz) is applied to the cleaning liquid around a bottom of the cleaning tank to vibrate the cleaning liquid, so that an ultrasonic cleaning process is performed. A desired number of cleaning processes may be performed in a plurality of tanks.

f) First Rinsing (Process)

After the first cleaning process is completed, a first rinsing process is performed on the glass article to rinse out the cleaning liquid attached to the surface of the glass article. Although a known rinsing process may be used, the first rinsing process is preferably performed by the treatment liquid used in the d) defect suppressing treatment which is the main characteristics of the exemplary embodiment. Further, the first rinsing process may be performed as a series of processes included in the first cleaning process.

Specifically, the optical lens subjected to the cleaning process is placed on the holder, and then is immersed in a rinsing tank storing the rinsing liquid as the above-described treatment liquid, so that the lens is rinsed (rinsing process).

Preferably, a ultrasonic wave of a predetermined frequency (e.g., 50 kHz) is applied to the rinsing liquid to vibrate the aqueous solution, so that an ultrasonic rinsing process is performed. A desired number of rinsing processes may be performed in a plurality of tanks. The ultrasonic wave is not necessarily applied to the rinsing liquid.

g) Centering Processing

The centering processing is a process that grinds an outer periphery of the glass article, obtained by the polishing processing or the precision press forming, around an optical axis to make a desired shape. In this process, the outer periphery of the glass article is ground while centering liquid is supplied. This centering liquid is used to enhance lubricity during the centering processing and to cool an object to be processed, similarly to the grinding liquid. The centering processing allows the outer peripheral shape of the glass article to have a perfect circular shape around an optical axis when the lens is made of the glass article. It is possible to use a known method as a specific example of the centering processing, for example, a method described in Japanese Patent No. 4084919 by the same applicant as the invention.

h) Second Cleaning (Process)

In order to remove the processing liquid or sludge from the glass article after the centering processing is performed, the glass article is cleaned. Although a known cleaning process may be employed, the cleaning process is preferably performed using the treatment liquid used in the d) defect suppressing treatment which is the main characteristics of the exemplary embodiment, or liquid produced by adding the detergent to the treatment liquid, similarly to the first cleaning process.

i) Second Rinsing (Process)

Thereafter, in order to rinse out the cleaning liquid attached to the surface of the glass article, a second rinsing process is performed on the glass article. Although a known rinsing process may be used, the second rinsing process is preferably performed by the treatment liquid used in the defect suppressing treatment which is the main characteristics of the exemplary embodiment, similarly to the first rinsing process. Further, the second rinsing process may be performed as a series of processes included in the second cleaning process.

The above-described grinding processing, polishing processing, and centering processing correspond to the treatment process in the method of manufacturing the glass article. In the exemplary embodiment, the above-described treatment liquid may be used as either or both of the grinding liquid and the polishing liquid. In this way, it is possible to suppress the deterioration in quality of the glass article resulting from the browning, fogging, latent scratches or the like occurring in the treatment process.

Further, in the exemplary embodiment, water is used as the solvent of the treatment liquid. Meanwhile, since the above-described centering liquid usually uses oil-based liquid, the treatment liquid is not necessarily used as the centering liquid.

The above-described cleaning process and rinsing process also correspond to the treatment process in the method of manufacturing the glass article. In the exemplary embodiment, the above-described treatment liquid may be preferably used as either or both of the cleaning liquid and the rinsing liquid. In this way, it is possible to suppress the deterioration in quality of the glass article resulting from the browning, fogging or latent scratches occurring in the treatment process. In this case, the treatment liquid may include the detergent and the like depending on a purpose. However, the treatment liquid preferably contains no substance having the chelate effect.

The glass article according to the exemplary embodiment is manufactured by the above-described processes. This glass article may be used as the optical element as well as an intermediate product which is in a state before becoming the optical element. Further, this glass article may be used as a pre-form for precision press forming, which requires a high surface quality.

C) Storage of the Glass Article

After or during various processes, such as the polishing process, the cleaning process, or the rinsing process, a storing process may be performed, in which a surface of at least a part of the glass article comes into contact with storage liquid including a solute and a solvent to store the glass material or the glass article. In this regard, the above-described treatment liquid is preferably used as the storage liquid.

For example, in the case of cleaning the glass material to remove the polishing agent or the polishing liquid from the glass material (glass article) after the polishing process, if a predetermined time has passed while the process is transferred to the cleaning process, the polishing agent or the polishing liquid remaining on the glass surface are dried and adhere to the glass surface, so that it is difficult to remove them from the glass surface in the cleaning process. In such a case, the glass material subjected to the polishing process is stored in the storage liquid, so that it is possible to prevent the adherence of the polishing agent or the polishing liquid.

Thus, in the exemplary embodiment, the storing process is preferably performed after the polishing process of the glass material. Further, in the exemplary embodiment, the storing process is preferably performed during the polishing process.

In order to remove the polishing agent or the polishing liquid adhering to the glass surface in a previous process, or to remove the storage liquid making contact with the glass article during the storing process, the glass article subjected to the storing process is cleaned by the cleaning liquid, and then is rinsed by the rinsing liquid to rinse out the cleaning liquid. Subsequently, the glass article is dried.

D) Others (Deposition, Etc.)

After the rinsing process of the exemplary embodiment is performed, the glass article is immersed in a dehydration tank storing IPA (isopropyl alcohol) therein, and substitutes the rinsing liquid of the lens surface with the IPA, thus eliminating the rinsing liquid from the glass surface. Finally, IPA steam drying is performed in the vapor tank (drying process). After the drying process, an anti-reflection film and the like may be deposited on the surface of the glass article, as necessary. Before the deposition is performed, a process of making the surface of the glass article clean, namely, the cleaning process may be performed. The deposition method may adopt a method which is known to those skilled in the art.

2. Glass Article

According to the characteristics of the exemplary embodiment, the glass article has important structural properties after the defect suppressing treatment is performed. To be more specific, there is a great difference in composition between a portion (i.e., outermost portion) which is in direct contact with the treatment liquid and other portions (i.e. inner side portion of the glass article), in the glass article.

Meanwhile, a surface of the optical element made of glass may be coated with the anti-reflection film or the like, or a coating substance may be applied to the glass surface. Such a coat or a coating substance is different in nature from coated glass or glass to which the coating substance is applied.

Even if there is a great difference in composition between the surface side and the inner side, the surface side of the glass article of the exemplary embodiment is clearly distinguished from the coat or the coating substance. Thus, even if the substance having a different nature, such as the coat or the coating substance, exists on the glass surface, the coat or the coating substance is not included in the glass article in the exemplary embodiment.

In the surface of the glass article, a portion requiring the high surface quality is an optically polished surface, namely, an optical polish surface, an optical functional face in the optical element, or a surface that becomes the optical functional face by the precision press forming in the precision press forming pre-form. Thus, according to the exemplary embodiment, the surface side of the glass article indicates the surface side of the surface of the glass article requiring the high surface quality, for example, the optical polish surface, the optical functional face, the surface formed as the optical functional face or the like. Further, the inner side of the glass article indicates a portion which is located to be deeper than the surface side. The depth of the inner side from the outermost surface will be described below.

As well known to those skilled in the art, the optical functional face is a surface that transmits, refracts, diffracts, reflects or partially reflects light. It is preferable that light incident on the surface in question is not scattered. Since the surface defect causes the scattering of the light, it is required to suppress the occurrence of defects in the optical functional face.

Of course, a given relationship may exist between the surface side and the inner side that will be described below, in addition to the surface of the glass article having the high surface quality.

First, the glass article according to the exemplary embodiment has a distribution between the content at the surface side of the glass article and the content at the inner side of the glass article for a specific glass component. According to a specific example, in the case of the glass article containing P, Al, alkali earth metal, F and O, like the glass article using the fluorophosphate glass of the exemplary embodiment, in a first aspect, the contents of P and O are greater at the surface side (shallow part) of the glass article than the inner side (deep part) thereof. The content of Al is preferably greater at the surface side (shallow part) of the glass article than the inner side (deep part) thereof. Meanwhile, the total content of the alkali earth metal and the content of F are less at the surface side of the glass article than the inner side thereof. As in a second aspect, the content of the alkali earth metal is preferably less at the surface side of the glass article than the inner side thereof.

In a third aspect, the contents of P, Al, and O are greater at the surface side (shallow part) of the glass article than the inner side (deep part) thereof. Meanwhile, the contents of the alkali earth metal and F are less at the surface side of the glass article than the inner side thereof. That is, P, Al, and O are present at the surface side of the glass article like the inner side thereof.

In this context, the surface side of the glass article refers to a depth range of 4 to 5 nm from the outermost surface of the glass article. The inner side of the glass article refers to a portion which is in the range of 100 nm to 104 or 105 nm in depth with respect to the outermost surface (outermost surface before sputtering) of the glass article.

Amounts of P, Al, alkali earth metal, F and O are obtained based on the existence ratio of the respective elements by the XPS. In the XPS waveform, spectrums are provided, which are derived from the respective elements at positions corresponding to the inherent binding energy (bond energy) of the elements. Areas of regions surrounded by the XPS waveforms derived from the respective elements and the baseline are calculated for every detected element. Further, the ratio of the area of each element becomes the existence ratio of each element. If the existence ratio of each element is standardized such that the sum of the existence ratios are equal to 100%, the existence amount of each element, namely, the content of each element is obtained by atomic %. For a specific element, when the content or amount present at the surface side of the glass article is compared with the content or amount present in the inner side thereof, the content or amount is indicated by atomic %. For the outermost surface of the glass article, when the amount of each element is measured, the existence ratio of each element is obtained except pollutants (contamination), such as C or N. Meanwhile, the glass surface is dug by sputtering in a vacuum chamber, so that it is considered that there is little adhesion of the pollutants to the formed surface. Thus, the existence ratio of the element detected by the XPS is calculated.

Also, since the surface (optical functional face, surface formed as the optical functional face, etc.) of the glass article requiring the high surface quality is treated by coming into contact with the treatment liquid, it is unnecessary to perform an XPS analysis throughout an entire region of the surface requiring the high quality in order to check the composition ratio and the bond state of each element at the surface side and the inner side. In other words, the XPS analysis must simply be performed on at least one place on the surface requiring the high quality in order to check the composition ratio or the bond state of each element at the surface side and the inner side.

The reason is as follows: the modifying substance (alkali earth metal and F) is eluted into the solvent of the treatment liquid, but the glass skeleton substance (P, Al, and O) is newly combined with the solute (e.g., phosphate) of the treatment liquid, thus allowing the glass skeleton to become dense. As a result, the glass article according to the exemplary embodiment achieve the same effect as the effect described in the <1. Method of manufacturing the glass article>.

Further, the following glass articles are suitable for the glass article using the fluorophosphate glass according to the exemplary embodiment.

glass article containing Al and alkali earth metal (preferably, the alkali earth metal is at least one of a group consisting of Mg, Ca, Sr, and Ba)
    glass article containing Zn
    glass article containing a rare earth element Of course, a glass article containing substances other than the above-described substances is possible. Further, when the glass component constituting glass in the fluorophosphate glass is divided into a cation component and an anion component, as well known to those skilled in the art, P, Al, alkali earth metal, Zn, and the rare earth element are cation components, whereas O and F are anion components.

When the glass article contains the rare earth element component, and a total content of the rare earth element in the inner side of the glass article is defined as RE(in) and a total content of the rare earth element at the surface side thereof is defined as RE(su), by atomic %, RE(su)/RE(in) that is a ratio of RE(su) to RE(in) is preferably equal to or less than 3 to suppress the defect from occurring on the surface of the glass article and maintain a high quality surface. If the glass is immersed in DI water or pure water, as described above, the component that is likely to be eluted into water is selectively eluted, while the rare earth element that is not easily eluted into water remains on the glass surface. Hence, the existence amount of the rare earth element is increased at the surface side of the glass surface side, thus causing the deterioration in surface quality, for example, the white turbidity of the glass surface. For example, in glass C that will be described later, the glass is immersed in pure water, so that the ratio RE(su)/RE(in) exceeds 5. In contrast, if the ratio RE(su)/RE(in) is 3 or less, it is possible to keep a good quality for the glass surface. In order to maintain the good quality for the glass surface, the ratio RE(su)/RE(in) is more preferably 2.5 or less, much more preferably 2.0 or less, and still more preferably 1.5 or less.

Regardless of the existence of the rare earth element, when the content of O at the inner side of the glass article is defined as O(in) and the content of O at the surface side of the glass article is defined as O(su), by atomic %, O(su)/O(in) that is a ratio of O(su) to O(in) may be considered as a reference indicating the denseness of the glass skeleton on the glass surface.

For example, if glass containing $F^-$ content of 80 anion % or more and $O^{2-}$ content of 20 anion % or less is immersed into the phosphate aqueous solution having pH around 7, glass that is not immersed yet has the ratio O(su)/O(in) less than 2.0, whereas glass that has been immersed has the ratio O(su)/O(in) of 2.0 or more. Thus, in order to maintain the high quality for the glass surface, the ratio O(su)/O(in) is preferably 2.0 or more. Further, in order to maintain the high quality for the glass surface, the ratio O(su)/O(in) is more preferably 2.1 or more, much more preferably 2.2 or more, and still more preferably 2.4 or more.

According to this exemplary embodiment, on the surface of the glass article, the modifying substance F is eluted into the solvent of the treatment liquid, and the glass skeleton substance (P, Al, and O) combine newly with the solute (e.g., phosphate) of the treatment liquid, so that the glass article having the F content which is less at the surface side than the inner side is obtained. As shown in Table 7, in the glass article (glass C) treated using the phosphate aqueous solution, the ratio (F content of the surface side/F content of the inner side) is equal to or less than 0.80. In contrast, in the glass article from which pollutants are removed by wiping the polished surface using ethanol, the ratio (F content at the surface side/F content at the inner side) exceeds 0.80. Further, as shown in Table 9, even in the glass article (glass D) treated using the phosphate aqueous solution, the ratio (F content at the surface side/F content at the inner side) is equal to or less than 0.80.

As such, since the ratio (F content at the surface side/F content at the inner side) is an index for the poor solubilization of the surface of the glass article in water, in the exemplary embodiment, the ratio (F content at the surface side/F content at the inner side) is preferably 0.80 or less, more preferably 0.75 or less, and much more preferably 0.70 or less.

Further, the glass article of the exemplary embodiment is the glass article containing F and O. In order to obtain the glass having excellent optical properties (low dispersibility or anomalous partial dispersibility), it is preferable that the content of F is 20 anion % or more and the content of O is 80 anion % or less. Particularly, more preferably, the content of F is 55 anion % or more and the content of O is 45 anion % or less. Still more preferably, the content of F is 70 anion % or more and the content of O is 30 anion % or less. Even more preferably, the content of F is 80 anion % or more and the content of O is 20 anion % or less. Far more preferably, the content of F is 85 anion % or more and the content of O is 15 anion % or less.

The composition of the glass article is distributed in a depth direction thereof. The composition on the outermost surface of the glass article is different from the composition of the inner region of the glass article. The composition of the inner region of the glass article is continuously changed depending on the depth. However, the composition is kept constant after a given depth from the outermost surface despite a change in depth. Thus, it is to be considered that a range having a constant composition in the depth direction is a portion having an original glass composition, that is, a bulk portion. The contents of F and O are contents in the bulk portion, respectively. The composition of the bulk portion may be measured in the following manner. The surface of the glass article is dug by sputtering, and the existence ratio of each element detected by the XPS is measured on the dug surface. If the kind of the detected element and the existence ratio of each element are invariable regardless of the digging depth, the existence ratio of that element is the composition of the bulk portion. The composition of the bulk portion is uniform and constant.

If the composition of the glass article or the content of the glass component is expressed without specifying a particular portion, this expression means the composition or the content of the glass component on the bulk portion.

As such, the composition or the content of the glass component on the bulk portion of the glass article may be expressed in cation % and anion %. For example, an important factor of the composition for determining Abbe number is the content ratio of F and O. Thus, if the behavior of the Abbe number is taken into consideration, the content of F and the content of O are preferably expressed by anion %. In this way, the cation % and the anion % are preferably provided for the entire properties of the glass article to make it easy to understand a relationship between the glass article and the glass composition.

The composition or the content of the glass component on the bulk portion of the glass article may be measured by an ICP-AES method, an ICP-MS method, atom absorptiometry and the like.

In the case of the fluorophosphate glass, Al of the glass skeleton substance or Ca and Sr of the modifying substance is combined with F. If they satisfy the above-mentioned range, the metal fluoride is not eluted as the modifying substance, but a bond between Al and F is cut and a new bond between Al and O is sufficiently created in the glass skeleton substance.

In addition thereto, a total content of Al in the oxidation state and Al in the phosphate state is preferably greater at the surface side of the glass article than the inner side of the glass article. Further, the content of Al in the phosphate state is preferably greater at the surface side of the glass article than the inner side of the glass article. Likewise, the contents of Al in the oxidation state and Al in the phosphate state are preferably greater at the surface side of the glass article than the inner side of the glass article. Before the defect suppressing treatment is performed, Al and F are combined with each other, and the combined portion becomes an end of the glass skeleton. However, after the defect suppressing treatment is performed, as described above, a bond between Al and F is cut, and a new bond is created between Al and O, so that a new glass skeleton is sequentially formed based on this bond. Consequently, the total content of Al in the oxidation state and Al in the phosphate state, and the content of Al in the phosphate state are greater at the surface side of the glass article coming into contact with the treatment liquid than the inner side of the glass article. Further, the contents of Al in the oxidation state and Al in the phosphate state are preferably greater at the surface side of the glass article coming into contact with the treatment liquid than the inner side of the glass article. Furthermore, Al in the oxidation state means Al that is directly combined directly with oxygen, and Al in the phosphate state means Al that is directly combined with P of $P_xO_y$. Here, x and y represent a natural number. Further, in the XPS spectrum, the waveform derived from Al in the oxidation state has a peak where binding energy is around 74.07 eV, and the waveform derived from Al in the phosphate state has a peak where the binding energy is around 74.93 eV. If Al in the oxidation state and Al in the phosphate state are present, the waveform of the XPS spectrum is a waveform formed by overlapping the waveform derived from Al in the oxidation state with the waveform derived from Al in the phosphate state. Further, if there is Al having bond states other than the oxidation state and the phosphate state, the waveform of the XPS spectrum is a waveform formed by additionally overlapping the waveform derived from Al having bond states other than the oxidation state and the phosphate state with the above-described overlapping waveforms. Therefore, it is possible to determine whether Al is in the oxidation state or the phosphate state based on the analysis result of XPS with measurement data of XPS.

Further, when the content (total amount) of Al is defined as Al(all), the content of Al in the oxidation state is defined as Al(ox), and the content of Al in the phosphate state is defined as Al(ph), by atomic %, the total content of Al in the oxidation state and Al in the phosphate state is preferably set such that a ratio (Al(ox)+Al(ph))/Al(all)) that is a ratio of a sum of Al(ox) and Al(ph) to Al(all) at the surface side is 0.5 or more, namely, either of Al in the oxidation state or Al in the phosphate state preferably occupies a half or more of the total amount of Al at the surface side for the poor solubilization of the glass surface in water or the like. In order to cause the glass surface to become poor soluble in water or the like, the ratio (Al(ox)+Al(ph))/Al(all) is more preferably 0.55 or more, and much more preferably 0.60 or more.

Similarly, the content of the alkali earth metal in a fluoridation state is greater at the surface side of the glass article than the inner side of the glass article.

The surface of the glass article having the above-described composition has Haze value of 1% or less, and may very effectively suppress the occurrence of defects. Haze value preferably has a range of 0.5% or less, more preferably 0.1% or less, and much more preferably 0.0%.

In the exemplary embodiment, the glass article is very suitable for the optical element (e.g., optical glass article lens). Naturally, as another specific example, various kinds of lenses, such as a spherical surface lens, a non-spherical surface lens or a micro lens, a diffraction grid, a lens equipped with a diffraction grid, a lens array, a prism and the like may be exemplified. Further, a concave meniscus lens, a bi-concave lens, a plane-concave lens, a convex meniscus lens, a bi-convex lens, a plane-convex lens and the like may be exemplified according to the shape.

Further, a thin optical film or a multi-layered film, such as an anti-reflection film, a complete reflection film, a partial reflection film, or a film having spectral characteristics, may be formed on the lens, if necessary, to serve as an optical element.

Further, the optical element is suitable for a component of an image capturing optical system which is high in performance and is compact, and is suitable for an image capturing optical system, such as a digital still camera, a digital video camera, a camera mounted on a mobile phone, or an in-vehicle camera.

Further, a glass article having a polish surface, especially an optical polish surface, among the glass article, is likely to be largely affected by the deterioration in surface quality after liquid treatment is performed.

Therefore, the glass article is preferably a glass article manufactured through the process including the polishing process, that is, preferably a glass article having a polish surface, and more preferably a glass article having an optical polish surface. Thus, the glass article is preferably an optical element having an optical polish surface.

3. Effect of Exemplary Embodiment

According to the exemplary embodiment, the glass article comes into contact with the treatment liquid, so that some of the solute contained in the treatment liquid is combined with the glass component present on the glass surface, and a compound which is poorly soluble in the treatment liquid is formed on the glass surface (poor solubilization of the glass surface) and is integrated with a network structure that is originally included in the fluorophosphate glass. In this way, after the glass article comes into contact with the treatment liquid, a denser network structure is obtained in the proximity of the surface of the glass article. Since this network structure relatively has a strong bond, it has low reactivity with the solvent. Thus, even if the solvent is water, it is possible to suppress hydronium ions, hydroxide ions or the like in the solvent from moving into the glass.

Particularly, in the fluorophosphate glass, if an element (alkali metallic element, alkali earth metallic element, fluorine, etc.) that is considered to be present in the gaps of the network structure in the form of an ion or an ionic bond compound is easily eluted into the treatment liquid, some of the solute enters the gaps of the glass structure formed by the elution and then is combined with the glass component, and the glass surface is reconfigured as a portion which makes it difficult to move hydrogen in the treatment liquid into the glass. Therefore, it is possible to further suppress the movement of the hydrogen into the glass.

Further, if phosphate is adopted as the solute of the treatment liquid for the fluorophosphate glass constituting the glass article, phosphate ions ($PO_4^{3-}$ and the like) including both P and O, which are main components of the network structure, in the fluorophosphate glass, are introduced into the glass. Therefore, the phosphate ions introduced into the glass are combined with the glass component, thus preventing the quality of the glass surface from being deteriorated.

Furthermore, water that is considered to be unsuitable for treating the fluorophosphate glass is used as the solvent of the treatment liquid, thus reducing an environmental load and allowing the treatment liquid to be prepared at low cost. Further, since the treatment liquid may have the buffer action of pH, the concentration of some of the solute combined with the glass component in the treatment liquid may be kept constant, and thereby it is possible to stably suppress the quality of the glass surface from being deteriorated. In addition, pH is set to a specific range, thus allowing the elution of the glass component to be further suppressed.

As a result, this provides the glass article which may previously reduce the possibility that the quality of the glass article will be deteriorated and may maintain a high quality even if the glass article is subjected to the wet process, the method of manufacturing such a glass article, and the method of suppressing the occurrence of the defect in the glass article so as to prevent its quality from being deteriorated.

4. Variant

Hereinafter, variants other than the above-described exemplary embodiment will be described.

(Grade of Glass Article)

As described above, the glass article according to the exemplary embodiment is not particularly limited. However, the present invention allows even the glass article which is relative low in latent-scratch resistance ($D_{NaOH}$) to lessen the negative effect of the treatment liquid on the surface of the glass article. Particularly, the present invention is suitable for a glass type (i.e. glass type having low latent-scratch resistance) that is liable to deteriorate in quality due to the appearance of latent scratches and the like. Specifically, the invention is particularly suitable for a glass type (i.e. glass type having low latent-scratch resistance) that deteriorates in quality due to browning, the occurrence of fogging, or the appearance of latent scratches when the glass article is stored in the air or water. Further, if water is used as the treatment liquid (grinding liquid, polishing liquid, cleaning liquid, rinsing liquid, etc.), the invention is particularly suitable for a glass type (i.e. glass type having low latent-scratch resistance) that deteriorates in quality due to browning, the occurrence of fogging, the appearance of the latent scratches.

(Treatment Liquid Using Organic Compound)

Merits that may be obtained by using aqueous solution as the treatment liquid have been described above. However, it is possible to use the treatment liquid employing the organic compound, if a solute can be taken as a member of the glass skeleton.

(Treatment Liquid Other than Phosphate Aqueous Solution)

If the solute can be taken as a member of the glass skeleton, the treatment liquid is not particularly limited. For example, the solute may be a salt produced by combining an acid with a base. Further, since the solute is combined with one kind of glass component, the solute is more preferably composed of elements contained in the glass component. Examples of the treatment liquid other than the phosphate aqueous solution may include silicate aqueous solution. However, in this case, it is preferable that the glass article is a silicate glass article. Also, borosilicate aqueous solution is possible. Further, aqueous solution containing phosphate and borosilicate therein may be used as the treatment liquid.

Further, a compound may be appropriately mixed with aqueous solution of a compound (acetate, citrate, phthalate and the like) used as the buffer solution, and this mixture may be used as the treatment liquid. However, since liquid containing solute having a chelate function may cause deterioration in surface quality of the glass article, this liquid is not preferred as the treatment liquid.

(Timing when Defect Suppressing Treatment is Performed)

In the present exemplary embodiment, after the c) polishing processing, the defect suppressing treatment was performed. However, this treatment may be performed at any time, as long as it is performed before the defect of the glass article occurs or appears. For example, the defect suppressing treatment may be performed simultaneously with the storing process. Although the polishing process, the cleaning process or the rinsing process takes a time when the glass article makes contact with the treatment liquid to be shortened, it is possible to realize the effect of the present invention because the surface is momentarily poorly solubilized. When the optical element is manufactured by grinding and polishing, the optical functional face requiring a high quality is finally obtained by the polishing process. Even if the quality of the glass surface is degraded before the polishing process, the surface having a high quality may be obtained by eliminating the surface degraded in quality by the polishing process. The reason why degradation in surface quality becomes a problem is because this causes quality degradation in optical functional face after the polishing process or in a final step of the polishing process. Thus, it is preferable that the defect suppressing treatment is performed in a process after the polishing process, or a polishing process including the final step of the polishing process. In the case where the optical element is manufactured by precision press forming, the surface quality of the pre-form for precision press forming significantly affects the quality of the optical functional face of the optical element. Thus, the defect suppressing treatment is preferably performed in the final step of the polishing process of the pre-form for the precision press forming, the pre-form cleaning process subsequent to the polishing process, or the rinsing process.

(Various Conditions for Defect Suppressing Treatment)

Further, the condition for realizing the effect according to the exemplary embodiment depends on a glass type of the glass article and the like. An example where the glass article is the fluorophosphate glass is mainly described herein. The use of the phosphate aqueous solution as the treatment liquid may not achieve the effect of the present invention depending on the glass type of the glass article.

In any case, the technical idea of the present invention is based on the fact that ⌈the solute of the treatment liquid serves as a source for newly supplying a glass component in the glass article, and some of the solute (e.g., phosphate ions) as the glass component is added to the glass article⌋, and the idea itself is worth being protected. Those skilled in the art can obtain specific conditions for the defect suppressing treatment (solvent, solute, treatment temperature, treatment pH, contact time with treatment liquid and the like) for each the glass type of the glass article, on the basis of research using the substance including the same substance as the glass skeleton substance of the glass article.

(Method of Manufacturing Glass Article)

In the exemplary embodiment, the optical lens is manufactured by grinding and polishing the glass material. However, the optical lens may be manufactured by press forming, for example, a precision mold press forming method. This forming method is as follows. First, a glass material which is preformed to have a predetermined shape such as a spherical shape, a flat spherical shape or the like, is fed to a forming mold including upper and lower molds, and then is heated together with the forming mold. The glass material, which is softened by heating, is pressed by the upper and lower molds to be deformed. Subsequently, after the temperature of the glass material is lowered to be less than a glass transition temperature, the glass material is taken out from the forming mold. Thereby, the optical lens is obtained as the glass article.

The precision mold press forming method also includes a method in which a glass material, preheated outside the forming mold prior to being fed to the mold, is fed to the forming mold heated at a predetermined temperature, the glass material is subjected to press forming, and then the glass material is taken out from the forming mold after its temperature being lowered to be less than the glass transition temperature.

Further, in the case where an outer circumference of the optical lens obtained by press forming such as the precision mold press forming method is subjected to centering, this is performed in the same manner as the polishing lens of the exemplary embodiment. When it is required to clean centering liquid attached to the lens that is subjected to centering, the treatment liquid may be used as either or both of the cleaning liquid and the rinsing liquid. Further, even in the case where the cleaning process is performed before a film is formed on the optical lens obtained by press forming, the treatment liquid may be used as either or both of the cleaning liquid and the rinsing liquid.

Further, when the optical lens is manufactured by the precision mold press forming method, a thin film such as a hard carbon film may be sometimes deposited on the surface of the glass material in order to prevent the glass material and the forming mold from being fused together during the manufacturing process. The cleaning process is performed prior to the deposition process. Likewise when this cleaning process is performed, the treatment liquid may be used as either or both of the cleaning liquid and the rinsing liquid.

(Composition of Glass Article)

Next, the composition examples of the fluorophosphate glass will be described, but the glass according to the present exemplary embodiment is not limited to glass having these composition examples. Further, these composition examples are for the composition of the bulk portion.

First preferred glass (hereinafter referred to as glass 1) of the fluorophosphate glass is glass whose F content is 55 anion % or more and O content is 45 anion % or less, namely, glass containing $F^-$ of 55 anion % or more and $O^{2-}$ of 45 anion % or less. When the glass surface comes into contact with water, the deterioration of the surface quality is further pronounced with the increase of F content in the glass. Thus, the effect according to this aspect becomes further enhanced in the glass having more F content. Thus, in glass 1, more preferable glass is glass containing $F^-$ of 70 anion % or more and $O^{2-}$ of 30 anion % or less, much more preferable glass is glass containing $F^-$ of 80 anion % or more and $O^{2-}$ of 20 anion % or less, and still more preferable glass is glass containing $F^-$ of 85 anion % or more and $O^{2-}$ of 15 anion % or less. Among glass 1, more preferable glass is fluorophosphate glass (glass 1A) that contains $P^{5+}$ of 1 to 35 cation %, $Al^{3+}$ of 10 to 40 cation %, $Li^+$ of 0 to 25 cation %, $F^-$ of 55 to 99 anion %, and $O^{2-}$ of 1 to 45 anion % as the glass component. Further, among glass 1A, more preferable glass (glass 1B) is fluorophosphate glass that contains $P^{5+}$ of 3 to 25 cation %, $Al^{3+}$ which is more than 30 cation % and is 40 cation % or less, $Li^+$ of 0 to 20 cation %, $F^-$ of 65 to 99 anion %, and $O^{2-}$ of 1 to 35 anion % as the glass component. Further, in glass 1B, in order to obtain glass having lower dispersion, a lower limit of F content of the glass is preferably 70 anion %, more preferably 80 anion %, and much more preferably 85 cation %.

For any of glass 1, glass 1A, and glass 1B, glass containing, by cation %, $Mg^{2+}$ of 0 to 15%, $Ca^{2+}$ of 0 to 35%, $Sr^{2+}$ of 0 to 25%, $Ba^{2+}$ of 0 to 20%, $Na^+$ of 0 to 10%, $K^+$ of 0 to 10%, and rare earth ions of 0 to 12% in total, in addition to the above-described components is more preferable. Among them, an upper limit of the total content of the rare earth ions is preferably 10%, more preferably 7%, and much more preferably 5%. Further, a lower limit of the total content of the rare earth ions is preferably 0.1%. Furthermore, glass containing $Ca^{2+}$ of 3 to 35% is preferable. As the rare earth ions, any of $Y^{3+}$, $Gd^{3+}$, $La^{3+}$, $Yb^{3+}$ and $Lu^{3+}$ which do not cause the glass to be colored is preferred, and the total content of them is preferably 0.1 cation % or more and is preferably 12 cation % or less. Above all, the total content of $Y^{3+}$, $Gd^{3+}$, $La^{3+}$ and $Yb^{3+}$ is preferably 0.1 to 10 cation %, more preferably 0.1 to 7 cation %, and much more preferably 0.1 to 5 cation %. Further, among the rare earth ions, the glass preferably contains $Y^{3+}$ to maintain the stability of the glass. The glass preferably contains $Y^{3+}$ of 0.1 to 12 cation %, more preferably 0.1 to 10 cation %, much more preferably 0.1 to 7 cation %, and still more preferably 0.1 to 5 cation %.

Abbe number vd of the glass 1 (including glass 1A and glass 1B) is preferably 78 or more, more preferably 80 or more, much more preferably 85 or more, even more preferably 90 or more, and still more preferably 93 or more. The upper limit of Abbe number vd is naturally determined by the composition, and may be set based on 100 or less. Abbe number vd generally depends on the content of F in the glass. As the F content increases, Abbe number vd increases as well. Therefore, the larger Abbe number vd of the glass is, the worse the surface quality becomes when the glass comes into contact with water. Thus, the higher effect of this aspect is expected in the glass having larger Abbe number vd.

$P^{5+}$ has the function of forming the network structure of the glass. In order to maintain the stability of glass, suppress volatilization when the glass is dissolved and thereby obtain optically homogeneous glass, the content of $P^{5+}$ is preferably set to be in the above-described range.

$Al^{3+}$ acts to improve the stability of the glass, and is the component that is useful to be combined with some of the solute and thereby form a poor soluble compound in solvent such as water. The content of $Al^{3+}$ is preferably set to be in the above-described range in view of such an action.

$Li^+$ reduces the viscosity of glass melt but very strongly acts to lower liquid-phase temperature. Consequently, the viscosity of glass is increased at the liquid-phase temperature, thus suppressing the occurrence of striaes when molten glass is formed. This also acts to lower glass transition temperature. To obtain such an effect, the content of $Li^+$ is preferably set to be in the above-described range. The preferred lower limit of $Li^+$ is 0.1 cation %.

$F^-$ is an essential component for imparting low dispersibility and anomalous dispersibility to the glass. To obtain the desired low dispersibility and anomalous dispersibility, the content of $F^-$ is preferably set to be in the above-described range.

The anion component of glass 1 is substantially composed of $F^-$ and $O^{2-}$. In addition, a small amount of $Cl^-$ may be introduced as the anion component. When molten glass flows out from a platinum-based pipe, the glass may wet and swell an outer circumferential surface of the pipe and thereby may cause striaes and the like. However, the addition of $Cl^-$ may achieve the effect of reducing the wetting and swelling of the glass melt.

To achieve the glass having good thermal stability, the total content of $F^-$ and $O^{2-}$ is preferably set to be 95% or more by anion %.

To improve the thermal stability and water resistance of glass, the content of each component of $Mg^{2+}$, $Ca^{2+}$, $Sr^{2+}$, $Ba^{2+}$, $Na^+$, and $K^+$ is preferably set to be in the above-described range.

The addition of a small amount of $Y^{3+}$ is expected to improve the thermal stability of the glass, whereas the addition of an excessive amount of $Y^{3+}$ rises the melting temperature of the glass, thus leading to volatilization from molten glass and reducing the thermal stability of the glass. Thus, the content of $Y^{3+}$ is preferably set to be in the above-described range. The content of $Y^{3+}$ is more preferably in the range of 0.1 to 12 cation %, much more preferably of 0 to 10 cation %, even more preferably of 0.1 to 7 cation %, and still more preferably of 0.1 to 5 cation %.

In addition, for the purpose of adjusting a refractive index, a small amount of $La^{3+}$, $Gd^{3+}$, $Zr^{4+}$ or $Zn^{2+}$ may be introduced. Further, $Yb^{3+}$ or $Lu^{3+}$ may be introduced.

In $B^{3+}$, $B^{3+}$ is preferably in the range of 0 to 1% to significantly increase the volatility of the glass, and it is more preferable that $B^{3+}$ is not substantially contained. Further, an expression 「not substantially contained」 means that $B^{3+}$ is never contained and a slight amount of $B^{3+}$ is contained such that the volatility of the glass is not exhibited.

Since Pb, As, Cd, Tl, Te, Cr, Se, U, and Th are substances having high environmental load, it is preferable that they are not introduced into the glass.

Glass 1 does not need components such as Sc, Hf, or Ge. Since Sc, Hf, and Ge are expensive components, it is preferable that they are not introduced into the glass. Further, since Lu is not an essential but expensive component, preferably, it is not introduced into the glass so as to reduce a material cost for the glass article. Glass 1 shows high light transmissivity over a wide visible-wavelength region. In order to provide these properties, it is preferable that substances causing coloring, such as Cu, Cr, V, Fe, Ni, Co, Nd, Er, Tb, or Eu, are not introduced into the glass.

The preferable range of the refractive index nd is 1.42 to 1.53. Further, in order to suppress the volatility and corrosivity of glass 1, the mole ratio of $O^{2-}$ content to $P^{5+}$ content, $O^{2-}/P^{5+}$ is preferably set to be 3.5 or more, that is, 7/2 or more.

A second preferable glass (hereinafter referred to as glass 2) of the fluorophosphate glass is glass containing, by atomic %, P of 0.1 to 6%, Al of 0.8 to 22%, O of 1 to 20%, and F of 30 to 60%, wherein the total content of Ca, Sr, and Ba exceeds 0 atomic %, and a value obtained by dividing a sum amount of P and Al by F content, namely, $(P+Al)/F^-$ is in the range of 0.1 to 0.4.

Glass 2 preferably contains Ca of 1 to 20 atomic %, Sr of 1 to 20 atomic %, Ba of 1 to 20 atomic %, F of 30 to 60 atomic %, 0 of 1 to 20 atomic %, Mg of 0 to 10 atomic %, and Y of 0 to 10 atomic %. By glass 2, it is possible to obtain glass having Abbe number vd of 90 to 100.

Further, in order to maintain the thermal stability of glass, in any of glass 1, glass 1A, glass 1B, and glass 2, the mole ratio of $O^{2-}$ content to $P^{5+}$ content, $O^{2-}/P^{5+}$ is preferably 2.5 or more, more preferably 2.8 or more, much more preferably 2.9 or more, and still more preferably 3 or more.

Further, the glass article using the fluorophosphate glass is applied to the exemplary embodiment. However, the present invention is also applicable to the glass article having other substances.

Hereinafter, an example of using a borate glass article as the glass article will be described.

The borate glass article contains B. At that time, water is used as solvent and borate is used as solute. Here, phosphate may be used as the solute.

Further, in the present exemplary embodiment, the following glass article is suitable for the borate glass article.
  glass article containing alkali earth metal and Zn
  glass article containing rare earth metal (rare earth element)
  glass article containing alkali metal Of course, a glass article additionally containing substances other than the above-described substances may be used, and a glass article containing F may be used similarly to the fluorophosphate glass.

Although the exemplary embodiments of the present invention have been disclosed for illustrative purposes, it will be understood that the present invention is not limited to the above-described exemplary embodiments and various changes are possible without departing from the scope of the present invention.

EXAMPLE

Next, examples will be described to specifically illustrate the present invention. Of course, the present invention is not limited to the following examples.

Example 1

First, a disc-shaped plane glass substrate (diameter of 43.7 mm and thickness of 5 mm) was used as the glass article. This plane substrate was previously polished to have an optical polish surface. Further, a glass material of the glass substrate is fluorophosphate glass (mole ratio $O^{2-}/P^{5+}=3.5$) containing, as a cation component, $P^{5+}$ of 5.4 cation %, $Al^{3+}$ of 33.7 cation %, $Li^+$ of 1.0 cation %, $Na^+$ of 1.2 cation %, $Mg^{2+}$ of 6.8 cation %, $Ca^{2+}$ of 28.7 cation %, $Sr^{2+}$ of 17.2 cation %, $Ba^{2+}$ of 4.7 cation %, and $Y^{3+}$ of 1.3 cation %, and, as an anion component, $F^-$ of 91.6 anion %, $O^{2-}$ of 8.2 anion %, and $Cl^-$ of 0.2 anion %, and having the refractive index nd of 1.433 and Abbe number vd of 96 (also referred to as glass A). Here, the glass composition and the optical properties are the composition and properties of the bulk portion of the glass substrate.

By atomic %, the composition of glass A is as follows: the content of P is 1.64%, the content of Al is 10.21%, the content of Mg is 2.06%, the content of Ca is 8.69%, the content of Sr is 5.21%, the content of Ba is 1.42%, the content of Li is 0.3%, the content of Na is 0.36%, the content of Y is 0.39%, the content of F is 63.85%, the content of O is 5.72%, and the content of Cl is 0.14%.

Further, this glass substrate was immersed in the phosphate aqueous solution that is the treatment liquid. Further, as the phosphate aqueous solution, an aqueous solution in which $NaH_2PO_4$ and $Na_2HPO_4$ has a mole ratio of 1:1 and thus pH is 7.0 is used. Furthermore, the concentration of phosphorus P and the concentration of sodium Na in the treatment liquid were set to be 160 ppm together, the temperature of the treatment liquid was set to be 16° C., and the immersion time was set to be 15 hours in total.

Reference Example

According to a reference example, the surface of the glass substrate that has been subjected to polishing in Example 1 was immediately wiped with ethanol to remove slurry or sludge from the glass surface. The glass substrate obtained in this way was used as the reference example. Thus, the glass substrate of the reference example does not come into contact with the phosphate aqueous solution. Except the above, the glass substrate of the reference example was manufactured using the same method as Example 1. In consideration of the mass production of the glass article, such a method is not practically preferable, because work of removing polishing particles or the like causing the adherence by wiping the glass surface with ethanol immediately after the polishing lowers productivity.

(Evaluation)

After the surface of the glass substrate obtained in Example 1 was wiped with ethanol, XPS spectrums were measured for the respective glass substrates of Example 1 and the reference example to evaluate the kind and bond state of the elements included in a region (4 to 5 nm) adjacent to the surface of the glass substrate. For the purpose of comparison, the composition and the kind and bond state of the elements included in an inner region (about 100 nm from the surface) of the glass substrate were also evaluated. Further, when the inner region of the glass substrate was measured, the surface was cut out by about 100 nm by sputtering.

Further, the measurement conditions of XPS are as follows.

Excitation X-ray: Al mono
Detection region: $\phi$100 μm
Take-off angle: 45 deg
Detection depth: dashed line: 4 to 5 nm, solid line: 100 nm (sputtering)
Sputtering condition: $Ar^+$ 2.0 kV
Sputtering rate: about 5 nm/min (in terms of $SiO_2$)

By the above-described measurement conditions, the kind of the elements, the existence ratio and the bond state of the respective elements existing at the surface side and the inner side of the glass substrate, namely, the glass article, may be evaluated.

Figure 2:
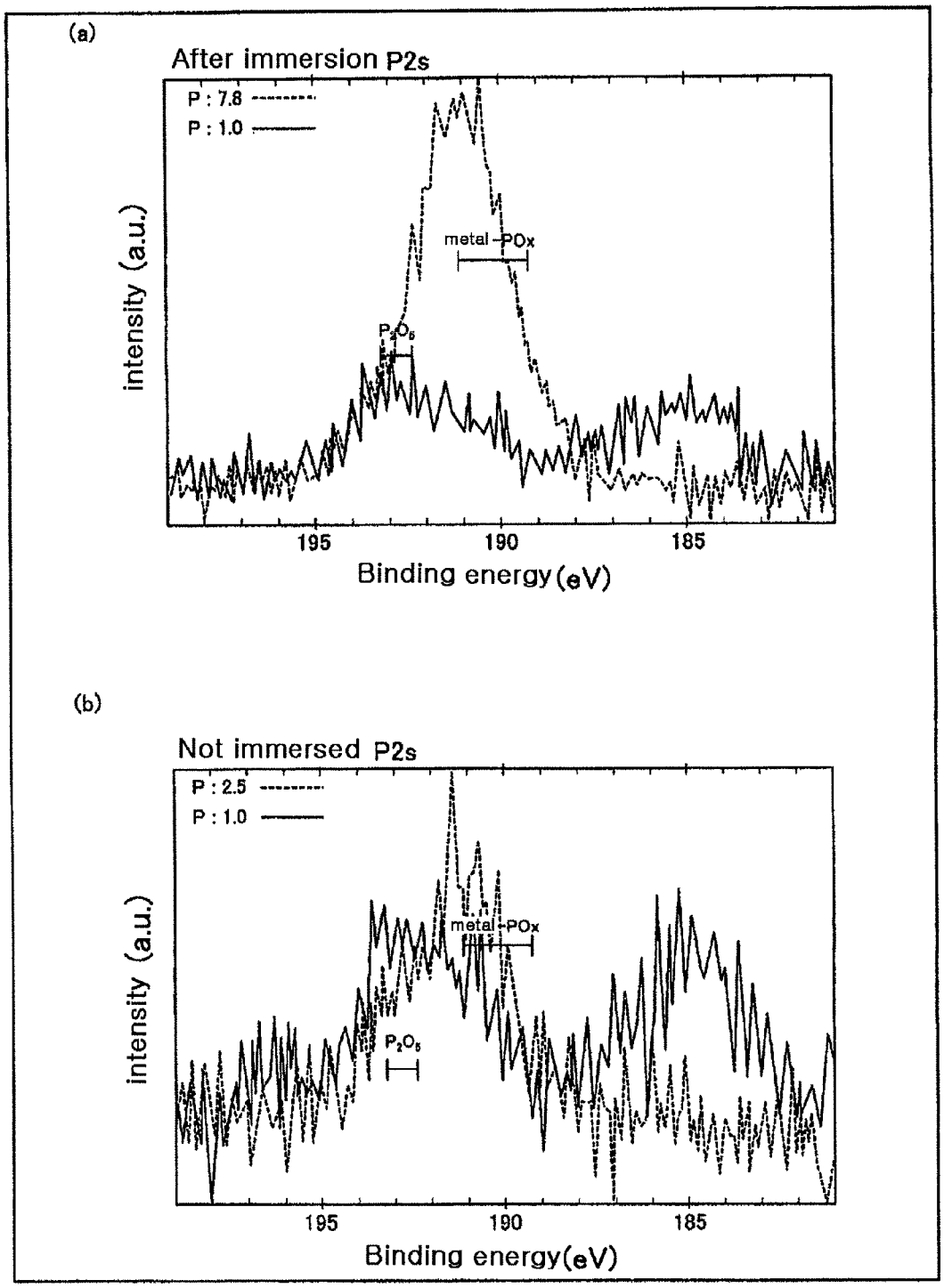
FIG. 2 is a graph showing results of performing the XPS for the glass substrates according to Example 1 and the reference example, and is a graph showing results for P. (a) shows the result of Example 1, and (b) shows the result of the reference example.
Figure 3:
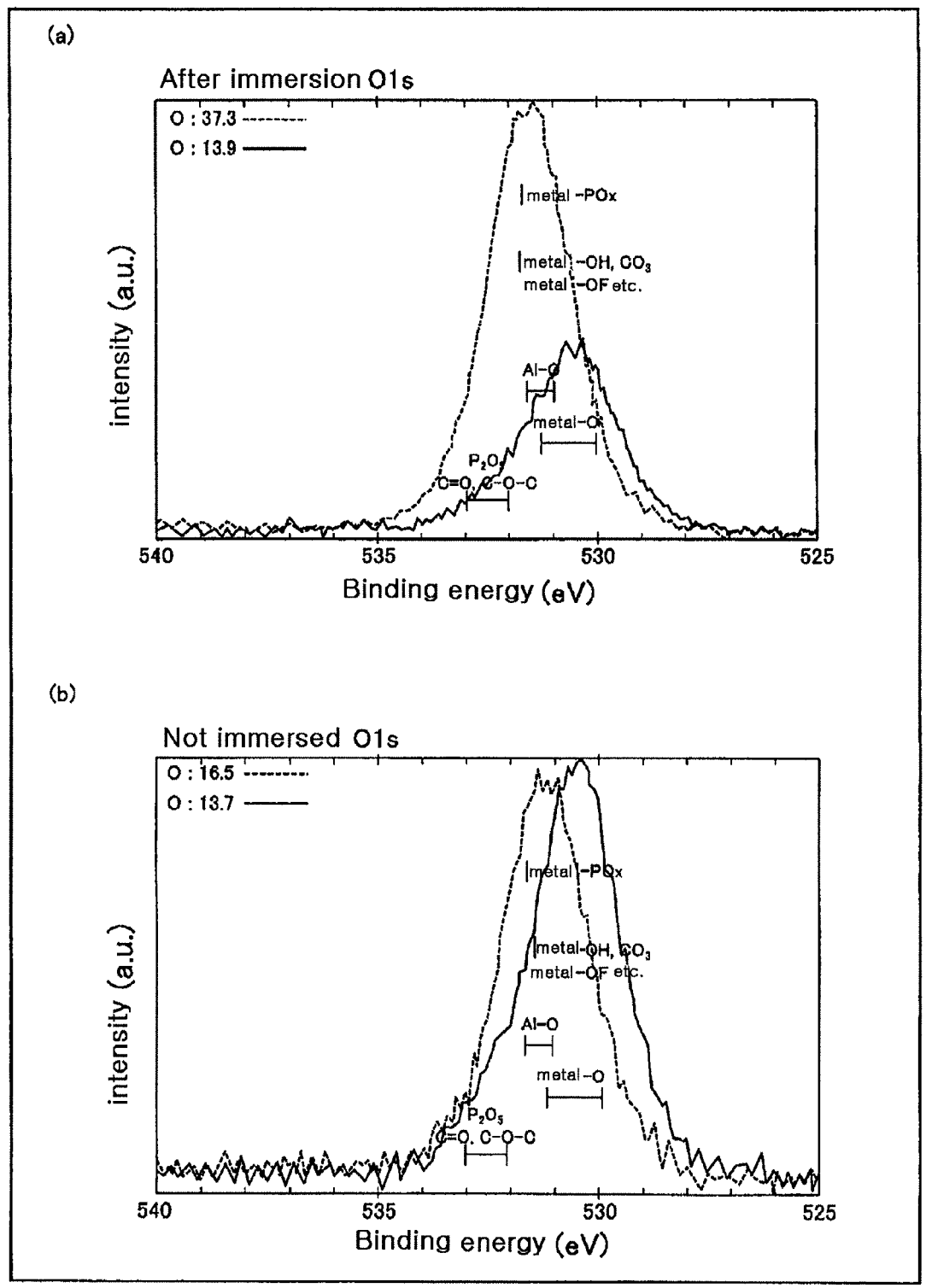
FIG. 3 is a graph showing results of performing the XPS for the glass substrates according to Example 1 and the reference example, and is a graph showing results for O. (a) shows the result of Example 1, and (b) shows the result of the reference example.
Figure 4:
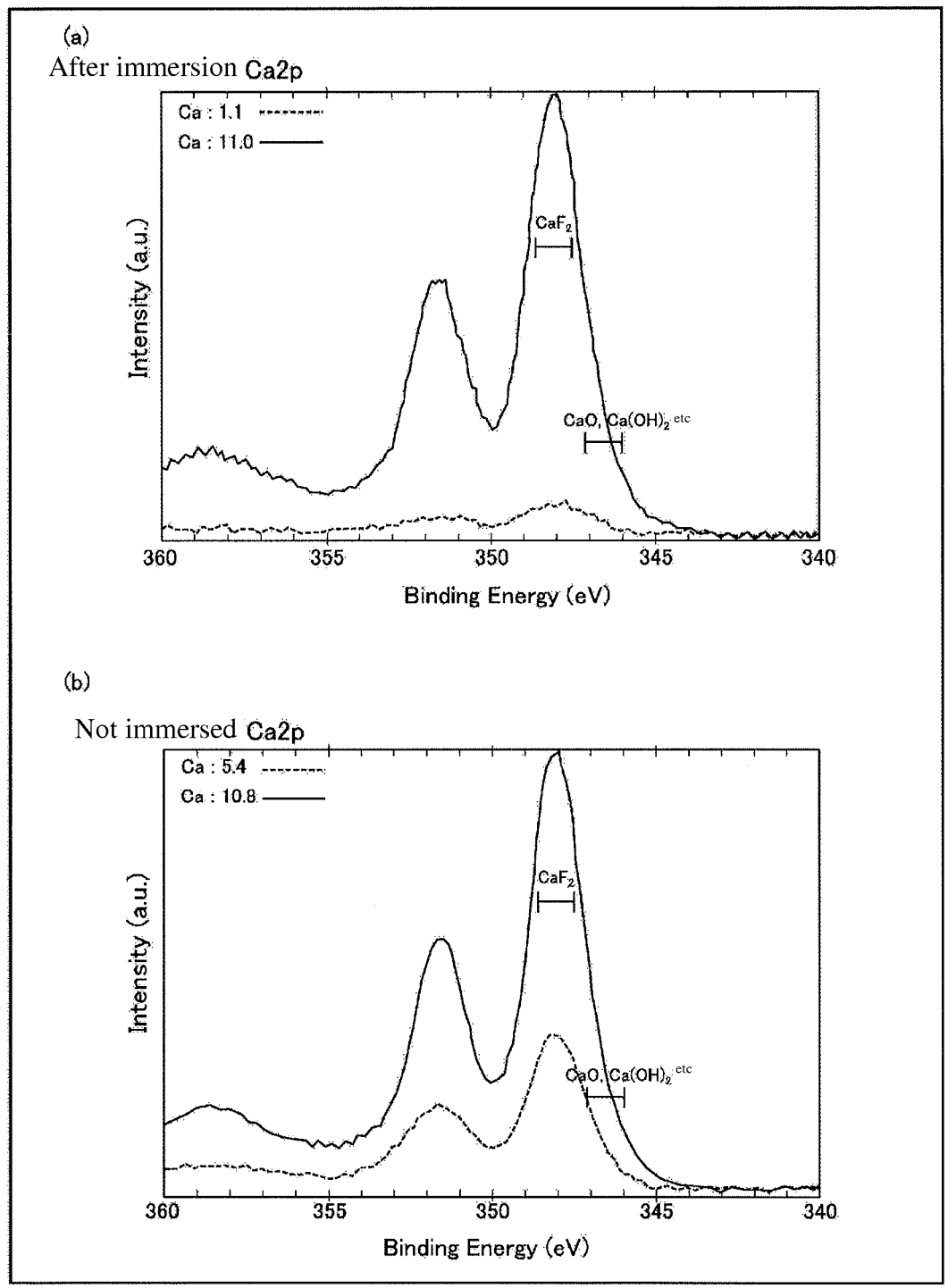
FIG. 4 is a graph showing results of performing the XPS for the glass substrates according to Example 1 and the reference example, and is a graph showing results for Ca. (a) shows the result of Example 1, and (b) shows the result of the reference example.
Figure 5:
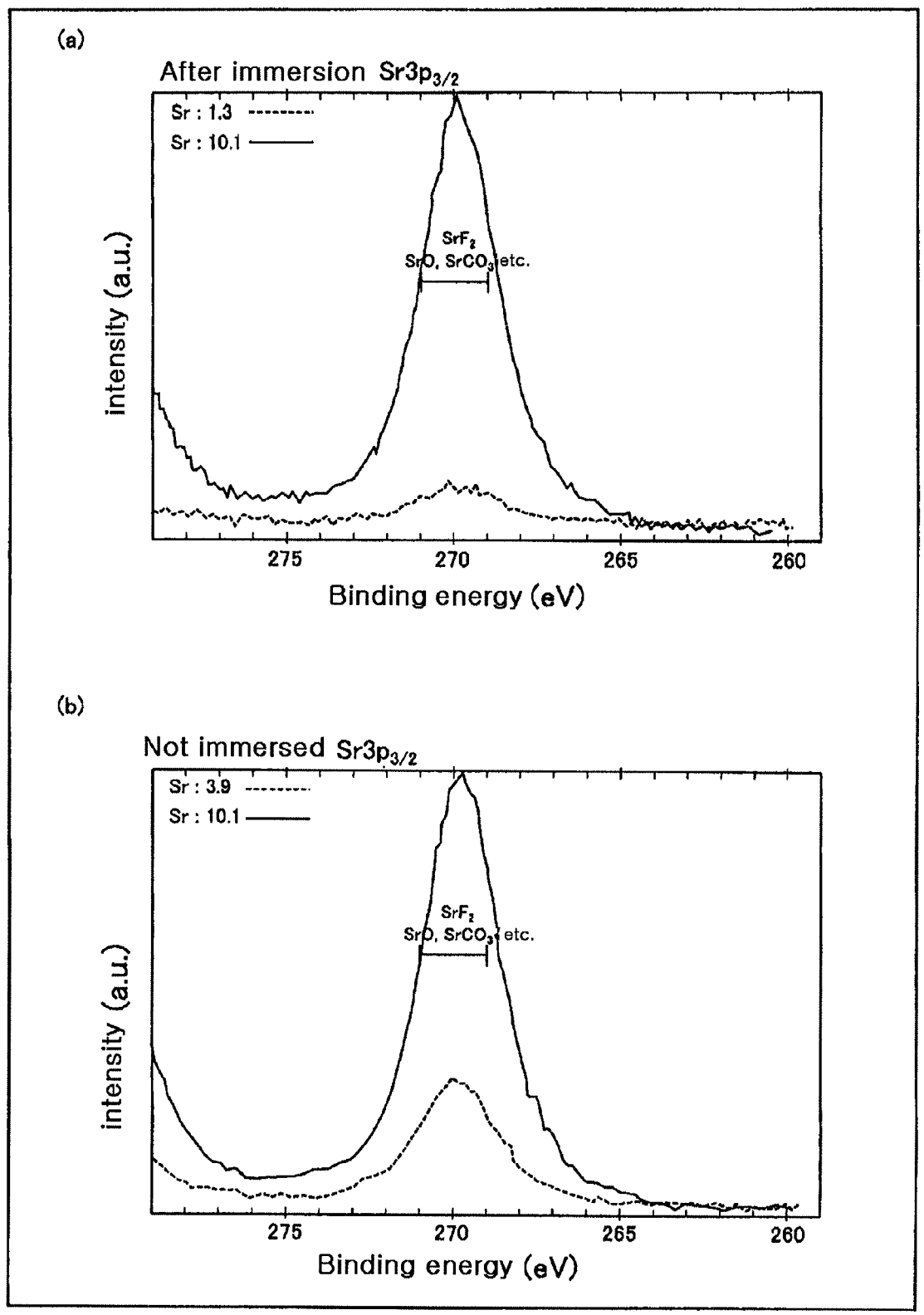
FIG. 5 is a graph showing results of performing the XPS for the glass substrates according to Example 1 and the reference example, and is a graph showing results for Sr. (a) shows the result of Example 1, and (b) shows the result of the reference example.
Figure 6:
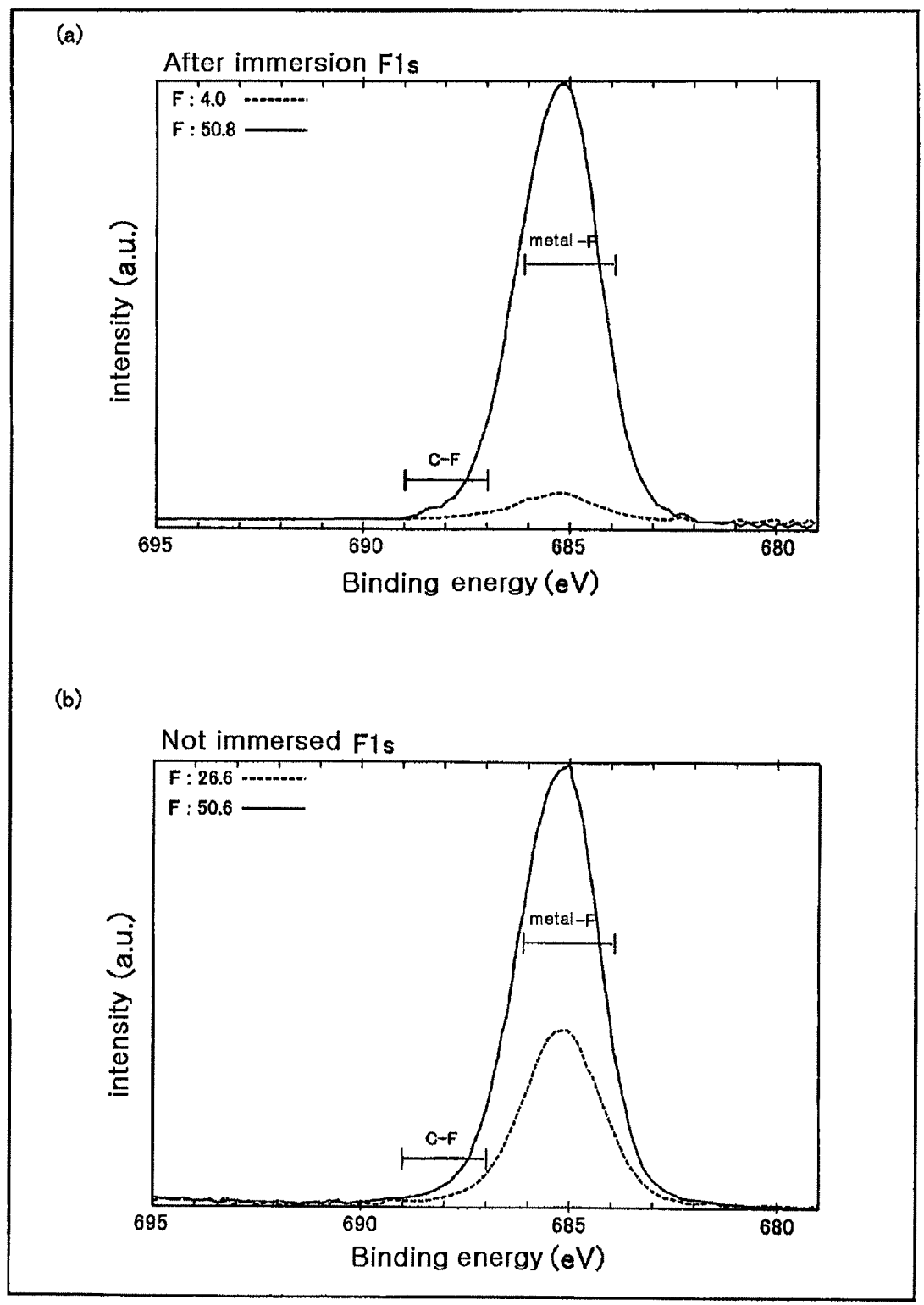
FIG. 6 is a graph showing results of performing the XPS for the glass substrates according to Example 1 and the reference example, and is a graph showing results for F. (a) shows the result of Example 1, and (b) shows the result of the reference example.
Figure 7:
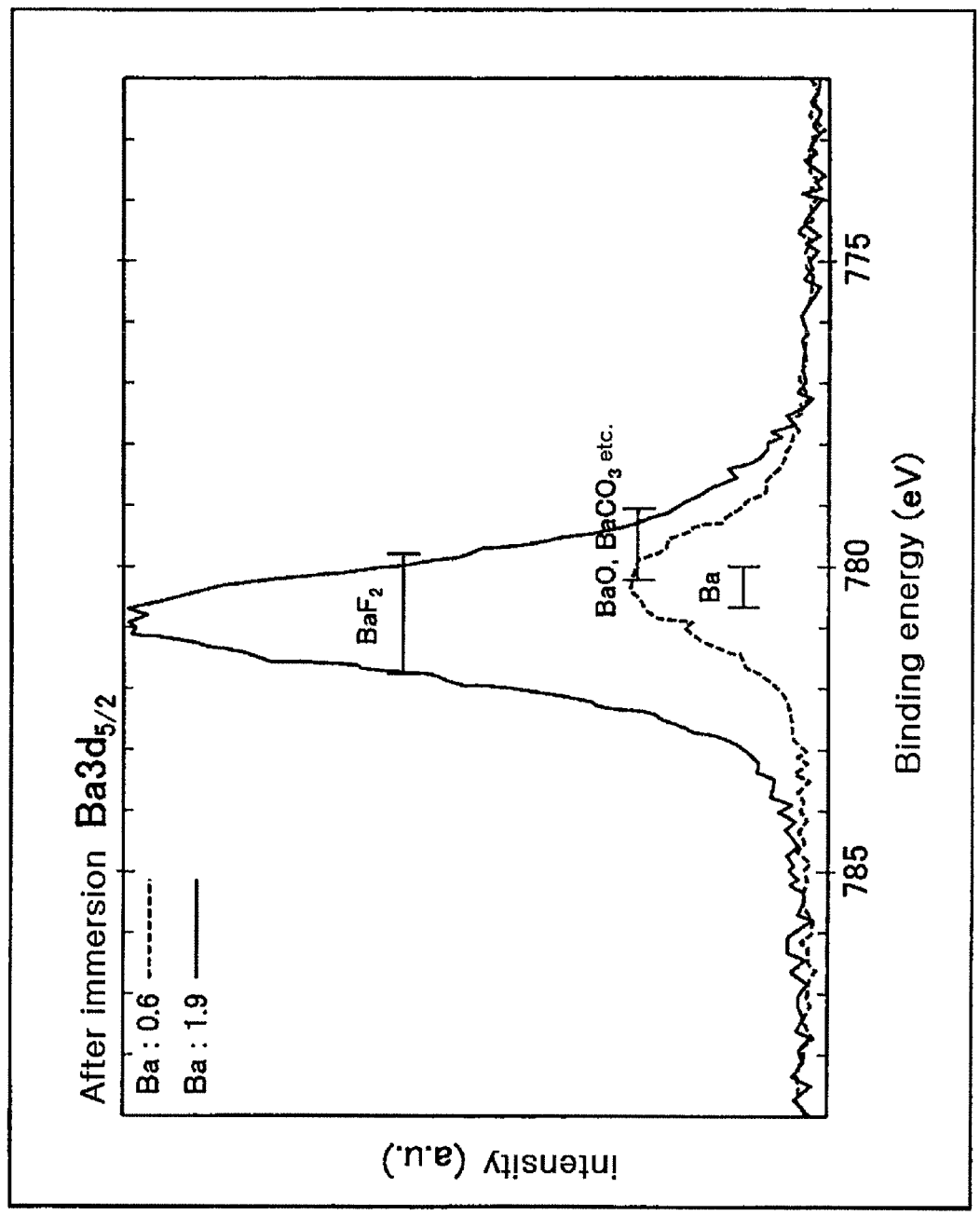
FIG. 7 is a graph showing a result of performing the XPS for the glass substrate according to Example 1, and is a graph showing results for Ba.
Figure 8:
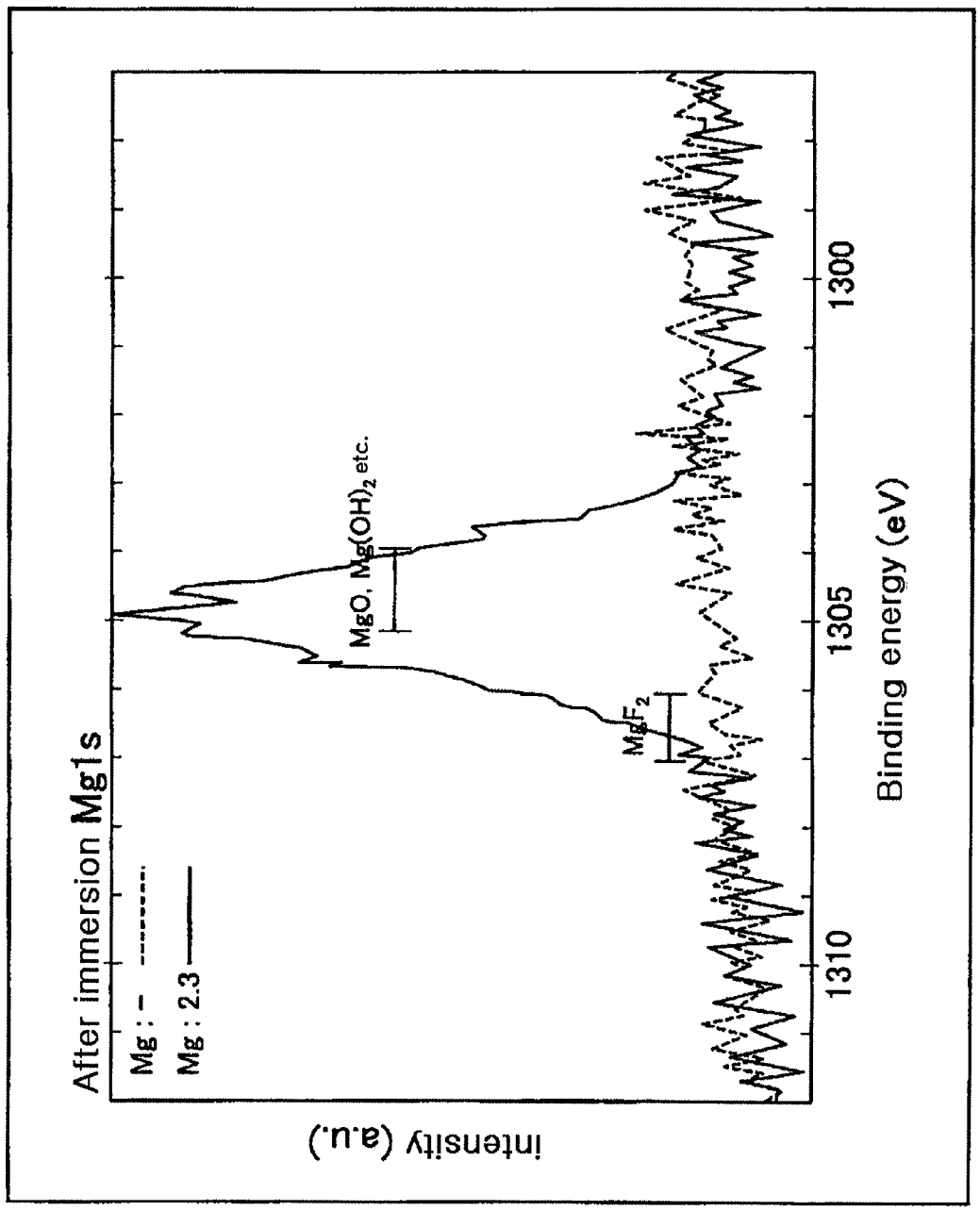
FIG. 8 is a graph showing a result of performing the XPS for the glass substrate according to Example 1, and is a graph showing results for Mg.

Further, FIGS. 1 to 6 are graphs showing results of performing the XPS, in which (a) illustrate the results of Example 1, and (b) illustrate the results of the reference example. Among the composition of the glass substrate, FIG. 1 is a graph showing the result for Al2p, FIG. 2 is a graph showing the result for P2s, FIG. 3 is a graph showing the result for O1s, FIG. 4 is a graph showing the result for Ca2p, FIG. 5 is a graph showing the result for Sr3p3/2, and FIG. 6 is a graph showing the result for F1s. Further, FIGS. 7 and 8 show only the results of Example 1. FIG. 7 is a graph showing the result for Ba3d5/2, and FIG. 8 is a graph showing the result for Mg1s.

FIGS. 1 to 3 illustrate the results for elements Al, P and O that form the network structure in the fluorophosphate glass. Since it is considered that the XPS spectrum for the inner region of the glass shown by the solid line in each drawing is not affected by the treatment liquid, it is thought that Example 1 and the reference example show an almost equal spectrum.

When comparing the reference example ((b) of each drawing) with Example 1 ((a) of each drawing), the latter shows that the peak intensity of the elements P, Al, and O forming the network structure is more significantly higher in the surface of the glass substrate than the inner side of the glass substrate. The reason is as follows: the surface of the glass substrate comes into contact with the treatment liquid, so that some of the solute is introduced into the glass substrate and is combined with the glass component, with the result that a peak intensity indicating a bond is increased.

It is considered that this result shows that a poor soluble compound (aluminum phosphate) is formed in the surface of the glass substrate.

Meanwhile, FIGS. 4 to 6 show the results for elements that are considered to be present in the gaps of the network structure. In contrast to FIGS. 1 to 3, when comparing the reference example ((b) of each drawing) with Example 1 ((a) of each drawing), the latter shows that the peak intensity of alkali earth metal and $F^-$ is more significantly lower in the surface of the glass substrate than the inner side of the glass substrate. Two reasons are considered for such a result. One of them is because the alkali earth metallic element and fluorine may escape from the glass surface and then may flow into the treatment liquid. The other is because the phosphate ion may be combined with Al of the network structure in the proximity of the surface, and thereby a ratio of the alkali earth metallic element to fluorine on the surface may be relatively reduced. Eventually, it is considered that this result shows that the poor soluble compound (aluminum phosphate) is formed on the surface of the glass substrate, even if this occurs due to any reason.

Likewise, FIGS. 7 and 8 show the results for elements that are considered to be present in the gaps of the network structure in Example 1, but show the same tendency as FIGS. 4 (a) to 6 (a).

Particularly in FIGS. 2 and 3, Example 1 and the reference example are considerably different from each other in peak intensity as well as peak position. In FIG. 2, Example 1 (FIG. 2 (a)) has a more extreme increase in peak intensity resulting from a bond between metal and POx compared to the reference example (FIG. 2 (b)), and has a shift in peak position from the peak due to $P_2O_5$. Similarly, Al (FIG. 1(a)) or O (FIG. 3(a)) forming the network structure are increased in peak intensity, and O (FIG. 3(a)) is extremely increased in peak intensity resulting from the bond between the metal and POx, and has a shift in peak position from the peak due to the bond between the metal and O. They indicate that the network structure including Al, P, and O increases on the glass surface.

Further, glass substrates were made in the same manner as Example 1 and the reference example, respectively, and then were analyzed in depth direction by a secondary ion mass analysis (SIMS). Consequently, both a sample (sample immersed in phosphate aqueous solution) of Example 1 and a sample (sample that is not immersed in phosphate aqueous solution) of the reference example show a tendency that the secondary ion intensity of hydrogen is gradually decreased from the surface and is almost constant after a certain depth. Thus, in Example 1, the migration of hydrogen contained in the treatment liquid into the glass is the same level as the reference example in which the migration of hydrogen contained in the treatment liquid does not occur. This shows that the migration of hydrogen contained in the treatment liquid into the glass is suppressed.

Further, it can be seen that Example 1 maintains a high quality of glass surface without fogging, while preventing the adhesion of polishing particles to the glass surface by means of immersion in the treatment liquid.

Next, glass A was ground to have a lens shape, and then was optically polished using the polishing liquid, thus manufacturing the optical lens. The polishing liquid is produced by dispersing the polishing particles in the treatment liquid. After the polishing, the same kind of liquid as the treatment liquid was used as the storage liquid, and the lens was immersed and stored in the storage liquid. Further, the lens was taken out from the storage liquid, and was cleaned by liquid produced by adding detergent to the same kind of liquid as the treatment liquid to remove foreign matters from the lens surface. Further, the lens was rinsed using the same kind of liquid as the treatment liquid as rinsing liquid. Finally, the lens was treated by IPA (isopropyl alcohol) and dried, so that a clean lens having no fogging on the surface was obtained.

Examples and Comparative Examples for Every Glass Type

Next, the results of examples and comparative examples for every glass type will be described.

Examples 2 to 18

First, a disc-shaped plane glass substrate (diameter of 43.7 mm and thickness of 5 mm) made of the same glass A as Example 1 was used as a sample glass article. This plane substrate was subjected to the polishing processing to have an optical polish surface.

Further, this glass substrate was immersed in the treatment liquid indicated by Table 1. The temperature of the phosphate aqueous solution was set to be 16° C., and the immersion time thereof was set to be 15 hours in total. Further, for reference, the element analysis concentration of the treatment liquid was also shown in Table 1.

For the glass article subjected to the storing treatment, weight change values ΔWt (mg) between weight before storing and weight after storing and Haze values (%) after the storing were evaluated by the following method. Further, the presence or absence of defects on the surface of the glass article was evaluated by the naked eyes. In addition, pH of the treatment liquid before or after the above-described treatment was measured. The results are shown in Table 1.

(Weight Change Value)

The weight change value is calculated as a differential between measured results, by measuring the weight of the sample before or after the sample is immersed in the treatment liquid. If the weight change value is high, there is high probability that latent scratches are extended. Thus, a low weight change value is preferable. The result is shown in Table 1.

(Haze Value)

Haze value is a value indicating the degree of fogging of glass. The lower the value is, the higher transparency is. Thus, the lower Haze value is preferable. Specifically, Haze value is represented by the following equation: Haze value (%)=Td/Tt×100 (Td: diffuse transmittance, Tt: total light transmittance). Such a Haze value is measured by using a hazemeter, which is specified in ⌈Method of measuring chemical durability of optical glass article of Japanese optical glass industrial standard JOGIS (surface method) 07-1975⌋, and perpendicularly transmitting measuring light to two opposing surfaces of a glass material sample after it is immersed in the treatment liquid for a predetermined time. The result is shown in Table 1.

TABLE 1

| | Glass Type | Buffer Function | Treatment Liquid | Analysis Concentration | | | | pH | |
| | | | | P (ppm) | Na (ppm) | B(ppm) | K (ppm) | Before Treatment | After Treatment |
|---|---|---|---|---|---|---|---|---|---|
| Example 2 | Glass A | Yes | pH Buffer Solution | 160 | 125 | 98 | 83 | 7.1 | 7.1 |
| Example 3 | Glass A | Yes | pH Buffer Solution | 160 | 125 | 98 | 83 | 7.1 | 7.2 |
| Example 4 | Glass A | Yes | pH Buffer Solution + NaOH | 156 | 110 | | 91.5 | 8.0 | 8.1 |
| Example 5 | Glass A | Yes | pH Buffer Solution | 156 | 110 | | 91.5 | 7.2 | 7.1 |
| Example 6 | Glass A | Yes | pH Buffer Solution | 78 | 55 | | 45.75 | 7.2 | 7.0 |
| Example 7 | Glass A | Yes | pH Buffer Solution | 1560 | 1100 | | 915 | 6.9 | 6.9 |
| Example 8 | Glass A | Yes | $NaH_2PO_4 + Na_2HPO_4$ | 3100 | 2200 | | | 5.7 | 5.8 |
| Example 9 | Glass A | Yes | $NaH_2PO_4 + Na_2HPO_4$ | 3100 | 3400 | | | 7.0 | 7.0 |
| Example 10 | Glass A | Yes | $NaH_2PO_4 + Na_2HPO_4$ | 3100 | 4300 | | | 8.0 | 8.1 |
| Example 11 | Glass A | Yes | $NaH_2PO_4 + Na_2HPO_4$ | 160 | 220 | | | 8.4 | 8.3 |
| Example 12 | Glass A | Yes | $NaH_2PO_4 + Na_2HPO_4$ | 150 | 110 | | | 5.7 | 5.8 |
| Example 13 | Glass A | Yes | $NaH_2PO_4 + Na_2HPO_4$ | 150 | 160 | | | 7.2 | 7.1 |
| Example 14 | Glass A | Yes | $H_2PO_4 + NaOH$ | 160 | 190 | | | 7.6 | 7.6 |
| Example 15 | Glass A | Yes | $KH_2PO_4 + Na_2B_4O_7$ | 1900 | 1500 | 2000 | 1600 | 7.9 | 7.9 |
| Example 16 | Glass A | Yes | $NaH_2PO_4 + Na_2HPO_4 + NaOH$ | 160 | 200 | | | 7.9 | 8.0 |
| Example 17 | Glass A | Yes | $NaH_2PO_4 + Na_2HPO_4 + NaOH$ | 180 | 210 | | | 9.0 | 8.7 |
| Example 18 | Glass A | Yes | $NaH_2PO_4 + Na_2HPO_4 + NaOH$ | 150 | 210 | | | 10.1 | 9.5 |

| | Weight Change Value | | Haze Value | Visual | |
| | ΔWt(mg) | 10 − 3 mg/(cm2 · h) | haze(%) | Evaluation | Remarks |
|---|---|---|---|---|---|
| Example 2 | 0.55 | 1.2 | 0.15 | OK(◎) | No Change |
| Example 3 | 0.47 | 1.0 | 0.18 | OK(◎) | No Change |
| Example 4 | 1.05 | 2.3 | 0.15 | OK(◎) | No Change |
| Example 5 | 0.57 | 1.3 | 0.28 | OK(○) | Indication of slight staining |
| Example 6 | 0.78 | 1.7 | 0.29 | OK(○) | Many dots |
| Example 7 | 0.82 | 1.8 | 0.00 | OK(◎) | No Change |
| Example 8 | 0.60 | 1.3 | 0.30 | OK(◎) | No Change |
| Example 9 | 0.75 | 1.7 | 0.09 | OK(◎) | No Change |
| Example 10 | 1.35 | 3.0 | 0.20 | OK(○) | Non-uniform staining |
| Example 11 | 0.5 | 1.9 | 0.20 | OK(◎) | No Change |
| Example 12 | 0.0 | 1.8 | 0.85 | OK(○) | Slight white turbidity |
| Example 13 | 0.70 | 1.6 | 0.00 | OK(◎) | No Change |
| Example 14 | 0.70 | 1.6 | 0.05 | OK(◎) | No Change |
| Example 15 | 0.45 | 1.0 | 0.15 | OK(◎) | No Change |
| Example 16 | 0.69 | 1.3 | 0.10 | OK(◎) | No Change |
| Example 17 | 0.95 | 2.1 | 0.45 | OK(◎) | No Change |

TABLE 1-continued

| | | | | | |
|---|---|---|---|---|---|
| Example 18 | 0.90 | 2.0 | 0.40 | OK(○) | Browning on surroundings, Adhesive material on surface |

From Table 1, it can be seen that some examples have samples (marked by ○ in table) that have the indication of slight staining or white turbidity, but are mostly good (marked by ◉ in table).

Comparative Examples 1 to 21

The comparative examples were evaluated in the same manner as Examples 2 to 18 except that samples come into contact with the treatment liquid shown in Table 2. The result is shown in Table 2.

TABLE 2

| | Glass Type | Buffer Function | Treatment Liquid | Analysis Concentration | | | | pH Before Treatment | pH After Treatment |
|---|---|---|---|---|---|---|---|---|---|
| | | | | P (ppm) | Na (ppm) | B(ppm) | K (ppm) | | |
| Comparative Example 1 | Glass A | No | HNO$_2$ | | | | | 3.1 | 3.8 |
| Comparative Example 2 | Glass A | No | Pure Water | | | | | 5.8 | 5.2 |
| Comparative Example 3 | Glass A | No | NaOH | | | | | 6.9 | 5.8 |
| Comparative Example 4 | Glass A | No | NaOH | | | | | 7.8 | 5.7 |
| Comparative Example 5 | Glass A | No | NaOH | | | | | 8.8 | 6.1 |
| Comparative Example 6 | Glass A | No | NaOH | | | | | 8.8 | 6.1 |
| Comparative Example 7 | Glass A | No | NaOH | | | | | 9.1 | 5.8 |
| Comparative Example 8 | Glass A | No | NaOH | | | | | 9.1 | 5.9 |
| Comparative Example 9 | Glass A | No | NaOH | | | | | 9.3 | 5.7 |
| Comparative Example 10 | Glass A | No | NaOH | | | | | 11.9 | 11.0 |
| Comparative Example 11 | Glass A | No | NaOH | | | | | 11.9 | 11.3 |
| Comparative Example 12 | Glass A | No | NaOH | | | | | 11.9 | 11.3 |
| Comparative Example 13 | Glass A | Yes | Phthalate pH Buffer Solution | | | | | 4.0 | 4.0 |
| Comparative Example 14 | Glass A | Yes | Citrate pH Buffer Solution | | | | | 6.9 | 6.7 |
| Comparative Example 15 | Glass A | Yes | Boric-acid pH Buffer Solution | | | | | 9.2 | 9.0 |
| Comparative Example 16 | Glass A | No | H$_3$PO$_4$ | 160 | | | | 2.5 | 2.7 |
| comparative Example 17 | Glass A | Yes | Na$_2$B$_4$O$_7$ | | 890 | 920 | | 9.2 | 9.1 |
| Comparative Example 18 | Glass A | No | NaOH | | 229.898 | | | 11.4 | 11.0 |
| comparative Example 19 | Glass A | No | HNO$_3$ | | | | | 3.2 | 3.3 |
| Comparative Example 20 | Glass A | No | NaOH | | | | | 7.3 | 5.4 |
| Comparative Example 21 | Glass A | No | Pure Water | | | | | 5.8 | |

| | Weight Change Value | | Haze Value | Visual | |
|---|---|---|---|---|---|
| | Δ Wt(mg) | 10 − 3 mg/(cm2 · h) | haze(%) | Evaluation | Remarks |
| Comparative Example 1 | 16.35 | 36.3 | 94.10 | NG | Pure White Surface Gloss |
| Comparative Example 2 | 6.72 | 14.9 | 82.10 | NG | Staining, White turbidity |
| Comparative Example 3 | 6.28 | 13.9 | 51.24 | NG | Staining, White turbidity |

TABLE 2-continued

| | | | | | |
|---|---|---|---|---|---|
| Comparative Example 4 | 5.77 | 12.8 | 51.60 | NG | Staining, White turbidity |
| Comparative Example 5 | 6.18 | 13.7 | 51.10 | NG | White turbidity, Staining on Surface, Transparent, Partial dot scattering |
| Comparative Example 6 | 6.28 | 14.0 | 50.90 | NG | White turbidity, Staining on Surface, Transparent, Partial dot scattering |
| Comparative Example 7 | 5.95 | 13.2 | 48.95 | NG | White turbidity, Staining on Surface, Transparent, Partial dot scattering |
| Comparative Example 8 | 6.18 | 13.7 | 52.70 | NG | White turbidity, Staining on Surface, Transparent, Partial dot scattering |
| Comparative Example 9 | 2.65 | 5.9 | 18.85 | NG | Attachment of white powder to surface |
| Comparative Example 10 | 31.67 | 70.4 | 93.10 | NG | Pure white surface gloss |
| Comparative Example 11 | 28.00 | 82.2 | 13.25 | NG | Change to rainbow color, Partial white turbidity on outer side |
| Comparative Example 12 | 27.53 | 81.2 | 14.88 | NG | Change to rainbow color, Partial white turbidity on outer side |
| Comparative Example 13 | 24.20 | 53.6 | 93.35 | NG | Partial staining, Slight white turbidity, No surface roughness |
| Comparative Example 14 | 116.60 | 259.1 | 3.85 | NG | Slight white turbidity, Many scratches on surface |
| Comparative Example 15 | 17.40 | 36.7 | 3.28 | NG | Change to rainbow color |
| Comparative Example 16 | 40.40 | 89.8 | 93.90 | NG | No change |
| comparative Example 17 | 19.50 | 44.0 | 5.20 | NG | Change to rainbow color, Many doughnut-shaped dots |
| Comparative Example 18 | | 220.0 | | NG | White turbidity, Browning of surface |
| comparative Example 19 | | 78.8 | | NG | White turbidity, Partial browning of surface |
| Comparative Example 20 | | 25.2 | | NG | White turbidity, Staining of Surface |
| Comparative Example 21 | | 146.4 | | NG | Dimming + Staining |

※ Blanks in weight change value and haze value indicate immeasurable state.

From table 2, it can be seen that defects, such as white turbidity, browning, or fine scratches, occur on the surfaces of the glass articles of all the comparative examples.

Examples 2 to 18 obtained the clean lens having no fogging on the surface made of glass A in the same manner as Example 1.

Examples 19 to 22

As a glass material, fluorophosphate glass (referred to as glass B) is used, which contains, as the cation component, $P^{5+}$ of 27.4 cation %, $Al^{3+}$ of 20.9 cation %, $Mg^{2+}$ of 8.3 cation %, $Ca^{2+}$ of 14.2 cation %, $Sr^{2+}$ of 16.9 cation %, $Ba^{2+}$ of 11.7 cation %, $Y^{3+}$ of 0.6 cation %, and, as anion component, $F^-$ of 62.9 anion % and $O^{2-}$ of 37.1 anion %, wherein the mole ratio of $O^{2-}/P^{5+}$ is 3, the refractive index nd is 1.497 and Abbe number vd is 81.6. The examples were evaluated in the same manner as Examples 2 to 18 except that samples come into contact with the treatment liquid shown in Table 3. Further, the composition of the bulk portion of the glass substrate is the composition of the glass material.

Glass B has a composition containing, by atomic %, a P content of 8.52%, an Al content of 6.5%, a Mg content of 2.58%, a Ca content of 4.42%, a Sr content of 5.26%, a Ba content of 3.64%, a Y content of 0.19%, a F content of 43.34%, and an O content of 25.56%.

TABLE 3

| | Glass Type | Buffer Function | Treatment Liquid | Analysis Concentration | | | | pH Before Treatment | pH After Treatment |
|---|---|---|---|---|---|---|---|---|---|
| | | | | P (ppm) | Na (ppm) | B(ppm) | K (ppm) | | |
| Example 19 | Glass B | Yes | pH Buffer Solution | 160 | 125 | 98 | 83 | 7.2 | 7.2 |
| Example 20 | Glass B | Yes | pH Buffer Solution | | | | | 7.3 | 7.2 |
| Example 21 | Glass B | Yes | pH Buffer Solution | | | | | 7.3 | 7.0 |
| Example 22 | Glass B | Yes | pH Buffer Solution | 1580 | 1100 | | 915 | 6.9 | 6.9 |

| | Weight Change Value | | Haze Value | Visual | |
|---|---|---|---|---|---|
| | Δ Wt(mg) | 10−3 mg/(cm2 · h) | haze(%) | Evaluation | Remarks |
| Example 19 | 0.40 | 0.9 | 0.10 | OK(○) | No change (different part in nature is partially present) |
| Example 20 | 0.47 | 1.0 | 0.58 | OK(◎) | No change |
| Example 21 | 0.02 | 1.8 | 0.55 | OK(○) | White powder is partially present |
| Example 22 | 0.82 | 1.4 | 0.33 | OK(◎) | No change |

From Table 3, it can be seen that in some examples, samples have the indication of slight staining or white turbidity, but sample on the whole are good.

Next, glass B was ground to have a lens shape, and then was optically polished using the polishing liquid, thus manufacturing an optical lens. The polishing liquid is produced by dispersing the polishing particles in the respective treatment liquid. After the polishing, the same kind of liquid as the treatment liquid was used as the storage liquid, and the lens was immersed and stored in the storage liquid. Further, the lens was taken out from the storage liquid, and was cleaned by liquid produced by adding detergent to the same kind of liquid as the respective treatment liquid to remove foreign matters adhering to the lens surface. Further, the lens was rinsed using the same kind of liquid as the respective treatment liquid as rinsing liquid. Finally, the lens was treated by IPA (isopropyl alcohol) and dried to obtain a clean lens having no fogging on the surface.

Comparative Examples 22 to 30

The comparative examples were evaluated in the same manner as Examples 19 to 22 except that samples come into contact with the treatment liquid shown in Table 4. The result is shown in Table 4.

From table 4, it can be seen that defects, such as white turbidity, browning, or fine scratches, occur on the surfaces of the glass articles of all the comparative examples.

Further, from the results shown in Tables 1 to 4, it can be seen that the treatment liquid does not necessarily have the buffer function. In addition, it can be seen that pH of the treatment liquid is not necessarily in the above-described range. Further, the treatment liquid does not necessarily have phosphate as the solute, and for example, may have a combination of phosphoric acid ($H_3PO_4$) and sodium hydroxide (NaOH).

That is, as clearly seen from FIGS. 1 to 8, the treatment liquid is selected such that some of the solute is combined with the glass component present on the surface of the glass article.

Further, in consideration of the results from Tables 1 to 4, the treatment liquid should not necessarily have the buffer function, and pH of the treatment liquid should not necessarily be 6 or more and 8 or less. It is necessary to adjust the treatment liquid and the treatment condition depending on the glass type of the glass article. However, as shown in FIGS. 1 to 8, when the defect suppressing treatment is performed, the solute of the treatment liquid has only to serve as a source for newly supplying the glass component

TABLE 4

| | Glass Type | Buffer Function | Treatment Liquid | Analysis Concentration | | | | pH | |
| | | | | P (ppm) | Na (ppm) | B(ppm) | K (ppm) | Before Treatment | After Treatment |
|---|---|---|---|---|---|---|---|---|---|
| Comparative Example 22 | Glass B | No | $HNO_3$ | | | | | 3.0 | |
| Comparative Example 23 | Glass B | No | $HNO_3$ | | | | | 4.4 | 4.8 |
| Comparative Example 24 | Glass B | No | $HNO_3$ | | | | | 4.7 | 4.7 |
| Comparative Example 25 | Glass B | No | $HNO_3$ | | | | | 4.9 | |
| Comparative Example 26 | Glass B | No | Pure water | | | | | 5.0 | 5.0 |
| Comparative Example 27 | Glass B | No | NaOH | | | | | 5.6 | 5.0 |
| Comparative Example 28 | Glass B | No | NaOH | | | | | 5.8 | 5.3 |
| Comparative Example 29 | Glass B | No | NaOH | | | | | 7.5 | |
| Comparative Example 30 | Glass B | No | NaOH | | | | | 11.2 | |

| | Weight Change Value | | Haze Value | Visual | |
| | Δ Wt(mg) | $10^{-3}$ mg/(cm2·h) | haze(%) | Evaluation | Remarks |
|---|---|---|---|---|---|
| Comparative Example 22 | 22.40 | 49.8 | 8.80 | NG | |
| Comparative Example 23 | 5.15 | 11.4 | 1.45 | NG | Fine Scratches |
| Comparative Example 24 | 3.90 | 8.7 | 1.85 | NG | Fine Scratches |
| Comparative Example 25 | 2.70 | 6.0 | 2.80 | NG | Fine Scratches |
| Comparative Example 26 | 1.50 | 3.3 | 0.55 | NG | Fine Scratches |
| Comparative Example 27 | 1.60 | 3.6 | 2.80 | NG | Staining (brown) |
| Comparative Example 28 | 1.50 | 3.3 | 7.05 | NG | Staining (brown) |
| Comparative Example 29 | 2.03 | 4.6 | 1.80 | NG | Attachment of white powder to surface |
| Comparative Example 30 | 5.40 | 12.0 | 4.00 | NG | | to the glass article. That is, those skilled in the art may appropriately set the condition such that the solute in the treatment liquid freely is combined with the glass component in the glass article and is freely involved in that glass component (particularly glass skeleton substance), by adjusting pH or the kind of the solute or solvent of the treatment liquid. Eventually, the idea that the content of the component capable of constituting the glass skeleton is greater at the surface side of the glass article than the inner side of the glass article is the important characteristics of the present invention.

Example 23

Next, fluorophosphate glass (referred to as glass C) is used, which contains, by atomic %, P of 1.89%, Al of 9.74%, Mg of 2.04%, Ca of 8.55%, Sr of 5.11%, Ba of 1.4%, Li of 1.47%, Na of 0.61%, Y of 0.38%, F of 61.41%, O of 7.28%, and Cl of 0.12%, wherein the refractive index nd is 1.437 and Abbe number vd is 95.1. Seven disc-shaped plane glass substrates having the same optical polish surface as Example 1 were prepared.

Further, the mole ratio ($O^{2-}/P^{5+}$) of glass C is 3.85. The composition of glass C is as follows, by cation % and anion %: the content of $P^{5+}$ is 6.06 cation %, the content of $Al^{3+}$ is 31.23 cation %, the content of $Mg^{2+}$ is 6.54 cation %, the content of $Ca^{2+}$ is 27.41 cation %, the content of $Sr^{2+}$ is 16.38 cation %, the content of $Ba^{2+}$ is 4.49 cation %, the content of $Li^+$ is 4.71 cation %, the content of $Na^+$ is 1.96 cation %, the content of $Y^{3+}$ is 1.22 cation %, the content of $F^-$ is 89.25 anion %, the content of $O^{2-}$ is 10.58 anion %, and the content of $Cl^-$ is 0.17 anion %.

Further, the composition of the bulk portion of the glass substrate is the composition of the glass material.

The respective substrates were treated under 5 conditions, namely, condition C-1 to condition C-5, respectively, which will be described below.

(Condition C-1)

First, phosphate aqueous solution was prepared as the treatment liquid. The phosphate aqueous solution is an aqueous solution such that the mole ratio of $NaH_2PO_4$ to $Na_2HPO_4$ is 1:1 and thus pH is 7.0. The concentration of phosphorus (P) and the concentration of sodium (Na) in the treatment liquid were set to be 150 ppm together.

A rinsing device having seven tanks was used. The above-described treatment liquid was put into first to third tanks as the rinsing liquid, while isopropyl alcohol (IPA) was put into fourth to sixth tanks as the rinsing liquid.

An ultrasonic cleaning process was performed in the first, second, fourth and fifth tanks. The glass substrate was immersed in each tank sequentially from the first to sixth tank, so that the cleanliness of the surface of the glass substrate was more and more increased. The immersion time of the glass substrate in each of the first to sixth tanks was set to be 100 seconds. Further, in each of the first to sixth tanks, liquid contained in each tank was circulated from the tank, through a filter and ion exchange resin, into the tank, thus preventing the function of the rinsing liquid from being deteriorated. In each of the first to sixth tanks, the rinsing liquid is at room temperature. The seventh tank is referred to as a vapor tank. In the vapor tank, vapor treatment (IPA steam drying treatment) was performed at 103° C. for 60 seconds using the isopropyl alcohol (IPA), and the surface of the glass substrate was dried in a clean state.

(Condition C-1+Condition C-2)

The plane glass substrate rinsed under condition C-1 was vacuum heated at 250° C. for 30 minutes (condition C-2). Condition C-2 was assumed to heat the substrate when an optical multilayered film is coated on the optical polish surface.

(Condition C-1+Condition C-2+Condition C-3)

Along with the vacuum heating of condition C-2, oxygen and argon gas was introduced, and the optical polish surface of the plane glass substrate was ion-cleaned using a thermionic ion gun (condition C-3). Condition C-3 was also assumed to heat the substrate when an optical multilayered film is coated on the optical polish surface.

(Condition C-4)

The plane glass substrate was immersed in the same phosphate aqueous solution as Example 1 for 15 hours. The temperature of the phosphate aqueous solution was set to be 16° C. The phosphate aqueous solution corresponds to the storage liquid.

(Condition C-5)

The plane glass substrate was immersed in the same phosphate aqueous solution as Example 1 for 1 minute. The temperature of the phosphate aqueous solution was set to be 16° C.

Test Example A

The surface of the glass substrate after being subjected to polishing was immediately wiped with ethanol, thus removing slurry or sludge adhering to the glass surface.

Test Example B

The plane glass substrate was immersed in pure water of 16° C. for 15 hours.

(Evaluation)

For each glass substrate treated under each of conditions C-1 to C-5, the XPS spectrum was measured, and the existence ratio and the bond state of elements included in the region (4 to 5 nm) adjacent to the surface of the glass substrate were evaluated. For the purpose of comparison, the XPS spectrum was also measured for the inner region (about 100 nm from the surface) of the glass substrate to evaluate the existence ratio and the bond state of the elements. Further, when the inner region of the glass substrate is measured, the surface is cut out by about 100 nm through sputtering.

The measurement conditions of XPS are the same as Example 1.

In the XPS spectrum, the peak appears at a position of binding energy inherent to an element. An area of a region surrounded by the spectrum waveform around the peak and the baseline of the spectrum is taken to calculate an area ratio for every element. Then, this ratio becomes the existence ratio of each element.

If a single element is in a single bond state, the waveform of the XPS spectrum derived from the element becomes the Gaussian function form. If the element is not in the single bond state but in a plurality of bond states, the waveform of the XPS spectrum becomes a form obtained by synthesizing a plurality of Gaussian function forms which are slightly different in peak position from each other. Thus, the spectrum waveform obtained by XPS is decomposed (separated) into a plurality of kinds of Gaussian function that have the position of the binding energy corresponding to the assumed bond state as the peak, and an area ratio of the region surrounded by each obtained Gaussian function and the baseline is found. In this manner, it is possible to calculate the existence ratio of the element in each bond state. The decomposition (separation) of the XPS spectrum into the plurality of kinds of Gaussian functions is implemented by fitting the constant in each Gaussian function into a least-squares method and the like.

The existence ratio and bond state of the element at the inner region (inner side) of the glass substrate are almost identical to those under each of conditions C-1 to C-5 and conditions of test example A and test example B. Thus, the existence amount of each element at the inner side obtained for every glass substrate treated by condition C-1 and the existence amount of Al per bond state were used as the existence amount of each element at the inner side of the glass substrate and the existence amount of Al per bond state. In this context, the existence amount is an existence amount of elements remaining other than contamination such as C or N, by atomic %.

[As for Table 5]

In Table 5, after XPS measurement is performed on the glass substrate treated under each of conditions C-1 to C-5, a ratio of an existence amount of each of P, Al, Mg, Ca, Sr, Ba, F, and O at the surface side of the glass substrate to an existence amount of each element at the inner side is shown.

TABLE 5

| Glass | Condition | Treatment details | Analysis location | existence amount of surface side (atomic %)/ existence amount of inner side (atomic %)(Note 1) | | | | | | | | | Defect suppressing effect |
| --- | --- | --- | --- | --- | --- | --- | --- | --- | --- | --- | --- | --- | --- |
| | | | | P | Al | Mg | Ca | Sr | Ba | AE (Note 2) | F | O | |
| Glass C | C-1 | Phosphate aqueous solution rinse | surface side | 6.3 | 1.22 | 0.12 | 0.54 | 0.50 | 0.47 | 0.47 | 0.63 | 2.59 | Excellent |
| | C-1 + C-2 | Phosphate aqueous solution rinse + vacuum heat | surface side | 6 | 1.15 | 0.15 | 0.55 | 0.48 | 0.53 | 0.48 | 0.66 | 2.54 | Excellent |
| | C-1 + C-2 + C-3 | Phosphate aqueous solution rinse + vacuum heat + Ion cleaning | surface side | 3.9 | 1.34 | 0.12 | 0.70 | 0.63 | 0.63 | 0.61 | 0.29 | 3.87 | Excellent |
| | C-4 | Immersion in phosphate aqueous solution for 15 hours | surface side | 12.7 | 1.67 | 0.00 | 0.17 | 0.21 | 0.53 | 0.19 | 0.13 | 4.45 | Excellent |
| | C-5 | Immersion in phosphate aqueous solution for 1 minute | surface side | 6.1 | 1.39 | 0.04 | 0.59 | 0.54 | 0.53 | 0.51 | 0.58 | 2.45 | Excellent |

(Note 1)This indicates a ratio of the existence ratio of each element on the surface side of the glass substrate treated under each condition, based on the existence ratio of each element on the inner side of the glass substrate treated under condition C-1.
(Note 2) AE = Mg + Ca + Br + Ba As clearly seen from Table 5, in any condition where treatment is performed using the phosphate aqueous solution, the ratio of the existence amount of P, Al, and O exceeds 1.0, respectively, and the existence amount of the surface side is more than the existence amount of the inner side. The ratio of the existence amount of each of Mg, Ca, Sr, Ba, and $F^-$ and the ratio of the sum existence amount (sum content) of Mg, Ca, Sr, and Ba both are less than 1.0, and the existence amount at the surface side is less than the existence amount in the inner side.

The optical polish surface of each glass substrate treated under condition C-1 to C-5 has Haze value of 0.0%, and weight variation of $1.6 \times 10^{-3}$ mg/(cm$^2$·hour) or less.

[As for Table 6]

XPS measurement is performed on the glass substrate treated under each of conditions C-1 to C-5 and the glass substrate of test example B, and then a ratio of the existence amount of Y at the surface side of the glass substrate to the existence amount of Y in the inner side, obtained from the measurement result, is shown in table 6.

TABLE 6

| Glass | Condition | Treatment details | Analysis localation | Y (Note 1) | Defect suppressing effect |
| --- | --- | --- | --- | --- | --- |
| Glass C | C-1 | Phosphate aqueous solution rinse | Surface side | 0.63 | Excellent |
| | C-1 + C-2 | Phosphate aqueous solution rinse + vacuum heat | Surface side | 0.75 | Excellent |
| | C-1 + C-2 + C-3 | Phosphate aqueous solution rinse + vacuum heat + ion cleaning | Surface side | 0.75 | Excellent |

TABLE 6-continued

| Glass | Condition | Treatment details | Analysis localation | Y (Note 1) | Defect suppressing effect |
|---|---|---|---|---|---|
| | C-4 | Immersion in phosphate aqueous solution for 15 hours | Surface side | 1 | Excellent |
| | C-5 | Immersion in phosphate aqueous solution for 1 minute | Surface side | 1.13 | Excellent |
| Test Example B | | Immersion in pure water for 15 hours | Surface side | 5.13 | Occurrence of defect and fogging |

(Note 1) existence amount of surface side (atomic %)/existence amount of inner side (atomic %) for Y As clearly seen from Table 6, in condition C-1 to C-5 performing treatment using the phosphate aqueous solution, the ratio (existence amount of surface side/existence amount of inner side) of the existence amount of Y at the surface side to the existence amount of Y in the inner side is 1.13 or less. In contrast, in Test Example B having white turbidity on the surface, a ratio (existence amount of surface side/existence amount of inner side) is 5.13, which is a very high value.

[As for Table 7]

XPS measurement is performed on the glass substrate treated under each of conditions C-1 to C-5 and the glass substrate of Test Example A, and then a ratio of the existence amount of O at the surface side of the glass substrate to the existence amount of O in the inner side, and a ratio of the existence amount of F at the surface side of the glass substrate to the existence amount of F in the inner side, which are obtained from the measurement result, are shown in table 7.

amount of F at the surface side to the existence amount of F in the inner side is 0.13 to 0.68, which indicates a value of 0.80 or less. On the other hand, in Test Example A, the ratio (existence amount of surface side/existence amount of inner side) is 0.84, which exceeds 0.80.

[As for Table 8]

XPS measurement is performed on the glass substrate treated under each of conditions C-1 to C-5 and the glass substrate of Test Example A, and then the existence amount of Al per bond state at the surface side of the glass substrate and the existence amount of Al per bond state in the inner side of the glass substrate of Test Example A, which are obtained from the measurement result, are shown in table 8.

Further, in Table 8, the existence amount of Al was set such that the sum of the existence amounts of Al and other glass component elements was 100 atomic %.

The XPS spectrum waveform of Al may be separated into Gaussian function forms of six kinds of bond states.

TABLE 7

| Glass | Condition | Treatment details | Analysis location | O | F | Defect suppressing effect |
|---|---|---|---|---|---|---|
| Glass C | C-1 | Phosphate aqueous solution rinse | Surface side | 2.59 | 0.63 | Excellent |
| | C-1 + C-2 | Phosphate aqueous solution rinse + vacuum heat | Surface side | 2.54 | 0.66 | Excellent |
| | C-1 + C-2 + C-3 | Phosphate aqueous, solution rinse + vacuum heat + ion cleaning | Surface side | 3.87 | 0.29 | Excellent |
| | C-4 | Immersion in phosphate aqueous solution for 15 hours | Surface side | 4.45 | 0.13 | Excellent |
| | C-5 | Immersion in phosphate aqueous solution for 1 minute | Surface side | 2.45 | 0.68 | Excellent |
| Test Example A | | Wiping by ethanol | Surface side | 1.91 | 0.84 | — |

(Note 1)
Existence amount of surface side (atomic %)/existence amount of inner side (atomic %) for O and F As clearly seen from Table 7, in condition C-1 to C-5 treated using the phosphate aqueous solution, the ratio (existence amount of surface side/existence amount of inner side) of the existence amount of O at the surface side to the existence amount of O in the inner side is 2.45 to 4.45, which is a very high value. On the other hand, in Test Example A, the ratio (existence amount of surface side/existence amount of inner side) is 1.91 which is less than 2.0.

Further, in condition C-1 to C-5 treated using the phosphate aqueous solution, the ratio (existence amount of surface side/existence amount of inner side) of the existence The six kinds of bond states include metal Al having binding energy corresponding to 70.60 eV and having a different charged state, metal Al having binding energy corresponding to 73.05 eV, Al in oxidation state, such as $Al_2O_3$, having binding energy corresponding to 74.07 eV, Al in phosphate state, such as Al-POx, having binding energy corresponding to 74.93 eV, AlOF or the like having binding energy corresponding to 75.45 eV, and Al in fluoridation state such as $AlF_3$ having binding energy corresponding to 76.90 eV.

By the above-described method, the XPS spectrum waveform of Al was separated into waveforms corresponding to the six kinds of bond states, and the existence amount of Al for each bond state was obtained from an area ratio of a region surrounded by each separated waveform and the baseline.

amount of Al) of the sum existence amount of Al in the oxidation state and Al in the phosphate state to the total amount of Al (the sum of the existence amounts of Al in the respective states) is 0.5 or more for every glass substrate treated by conditions C-1 to C-4. In contrast, for the glass

TABLE 8

| Glass | Condition | Treatment details | Analysis location | Amount of Al per bond state (atomic %) | | | |
|---|---|---|---|---|---|---|---|
| | | | | Metal Al of different charged state Binding energy = 70.60 eV | Metal Al Binding energy = 73.05 eV | Al2CO3 and the like Binding energy = 74.07 eV | Al—POx and the like Binding energy = 74.93 eV |
| Glass C | C-1 | Phosphate aqueous solution rinse | Surface side | 0 | 0 | 1.48 | 4.86 |
| | C-1 + C-2 | Phosphate aqueous solution rinse + vacuum heat | Surface side | 0 | 0 | 2.2 | 4.27 |
| | C-1 + C-2 + C-3 | Phosphate aqueous solution rinse + vacuum heat + ion cleaning | Surface side | 0 | 0 | 9.35 | 2.03 |
| | C-4 | Immersion in phosphate aqueous solution for 15 hours | Surface side | 0 | 0 | 5.06 | 8.32 |
| | C-1 | Phosphate aqueous solution rinse | Inner side | 0.6 | 1.7 | 2.4 | 0.4 |

| Glass | Condition | Treatment details | Amount of Al per bond state (atomic %) | | | Al2CO3 and the like + Al—POx and the like (atomic %) | (Al2CO3 and the like + Al—POx and the like)/ total amount of Al |
|---|---|---|---|---|---|---|---|
| | | | AlOF and the like Binding energy = 75.45 eV | AlF3 and the like Binding energy = 76.90 eV | Total amount of Al (atomic %) | | |
| Glass C | C-1 | Phosphate aqueous solution rinse | 4.05 | 0 | 10.39 | 8.34 | 0.61 |
| | C-1 + C-2 | Phosphate aqueous solution rinse + vacuum heat | 3.29 | 0 | 9.76 | 6.47 | 0.86 |
| | C-1 + C-2 + C-3 | Phosphate aqueous solution rinse + vacuum heat + ion cleaning | 0 | 0 | 11.38 | 11.38 | 1 |
| | C-4 | Immersion in phosphate aqueous solution for 15 hours | 0.82 | 0 | 14.2 | 13.38 | 0.94 |
| | C-1 | Phosphate aqueous solution rinse | 3.4 | 0 | 8.5 | 2.8 | 0.33 |

From Table 8, it can be seen that the existence amount of Al in the oxidation state at the outermost surface of the glass substrate treated under conditions C-3 and C-4 is more than the existence amount of Al in the oxidation state at the inner surface of the glass substrate.

Further, it can be seen that the existence amount of Al in the phosphate state at the outermost surface of the glass substrate treated under conditions C-1 to C-4 is more than the existence amount of Al in the phosphate state at the inner surface of the glass substrate.

Further, it can be seen that the sum existence amount of Al in the oxidation state and Al in the phosphate state at the outermost surface of the glass substrate treated under conditions C-1 to C-4 is more than the sum existence amount of Al in the oxidation state and Al in the phosphate state at the inner surface of the glass substrate.

Further, a ratio ((existence amount of Al in oxidation state+existence amount of Al in phosphate state)/total substrate of Test Example A, the ratio is 0.43. This shows that the sum existence amount of Al in the oxidation state and Al in the phosphate state is less than a half of the total amount of Al.

Consequently, Table 8 shows that, if the glass substrate is treated by the treatment liquid (phosphate aqueous solution) and the solute of the treatment liquid is added to glass so that the surface of the glass substrate becomes poorly soluble, the defect suppressing effect is maintained even if Al in the phosphate state is reduced at the surface side by post-treatment, such as heating treatment.

Example 24

Next, a disc-shaped plane glass substrate was prepared using flourophosphoric acid glass (hereinafter referred to as glass D) containing, by atomic %, P of 8.53%, Al of 6.5%, Mg of 2.58%, Ca of 4.41%, Sr of 5.25%, Ba of 3.64%, Y of 0.2%, F of 43.32%, and O of 25.58%, wherein a refractive index nd is 1.497 and Abbe number vd is 81.61, the substrate having the same optical polish surface as Example 1.

Further, the mole ratio ($O^{2-}/P^{5+}$) of glass D is 3.00, and the composition is as follows by cation % and anion %: the content of $P^{5+}$ is 27.42 cation %, the content of $Al^{3+}$ is 20.89 cation %, the content of $Mg^{2+}$ is 8.29 cation %, the content of $Ca^{2+}$ is 14.18 cation %, the content of $Sr^{2+}$ is 16.88 cation %, the content of $Ba^{2+}$ is 11.70 cation %, the content of $Y^{3+}$ is 0.64 cation %, the content of $F^-$ is 62.87 anion % and the content of $O^{2-}$ is 37.13 anion %.

Further, the composition of the bulk portion of the glass substrate is the composition of the glass material.

The glass substrate was treated under the same condition D-1 as condition C-1.

[As for Table 9]

In the same manner as example 23, the existence amounts of the glass component elements at the surface side and the inner side of the glass substrate treated by condition D-1 were measured. A ratio of the existence amount of P, Al, Mg, Ca, Sr, Ba, Y, F, and O at the surface side to the existence amount of each element in the inner side, which are obtained in this way, is shown in Table 9.

side/existence amount of inner side) of each alkali earth metal, the ratio (total existence amount of surface side/total existence amount of inner side) of the total existence amount AE of alkali earth metal, and the ratio (existence amount of surface side/existence amount of inner side) of F are less than 1.0, respectively.

Further, the ratio (existence amount of surface side/existence amount of inner side) of Y is 1.00, and an increase in ratio is suppressed by using the phosphate aqueous solution, similarly to the treatment using the phosphate aqueous solution in Example 23.

After the treatment was performed under condition D-1, Haze value of the optical polish surface was 0.0%, and the weight variation was less than $0.9 \times 10^{-3}$ mg/($cm^2$·hour).

[As for Table 10]

In the same manner as example 23, XPS measurement was performed on the glass substrate after being treated by condition D-1, and the existence amounts of Al per bond

TABLE 9

| Glass | Condition | Treatment details | Analysis location | existence amount of surface side (atomic %)/ existence amount of inner side (atomic %) (Note 1) | | | | | | | | | | Defect suppressing effect |
|---|---|---|---|---|---|---|---|---|---|---|---|---|---|---|
| | | | | P | Al | Mg | Ca | Sr | Ba | AE Note 2 | Y | F | O | |
| Glass D | D-1 | Phosphate aqueous solution rinse | Surface side | 1.97 | 0.93 | 010 | 0.72 | 0.63 | 0.58 | 0.57 | 1.00 | 0.71 | 1.39 | Effective |

(Note 1) This indicates a ratio of the existence ratio of each element on the surface side of the glass substrate treated under each condition, based on the existence ratio of each element on the inner side of the glass substrate treated under condition D-1.
Note 2 AE = Mg + Ca + Sr + Ba From Table 9, the ratio (existence amount of surface side/existence amount of inner side) of each of P and O exceeds 1.0, and the ratio (existence amount of surface state at the surface side and the inner side of the glass substrate were measured. The existence amount (atomic %) of Al of each bond state is shown in Table 10.

TABLE 10

| Glass | Condition | Treatment details | Analysis location | Amount of Al per bond state (atomic %) | | | |
|---|---|---|---|---|---|---|---|
| | | | | Metal Al of different charged state Binding energy = 70.60 eV | Metal Al Binding energy = 73.05 eV | Al2CO3 and the like Binding energy = 74.07 eV | Al—POx and the like Binding energy = 74.93 eV |
| Glass D | D-1 | Phosphate aqueous solution rinse | Surface side | 0 | 0 | 0.3 | 6.4 |
| | | | Inner side | 0 | 0 | 2.3 | 5 |

| Glass | Condition | Treatment details | Amount of Al per bond state (atomic %) | | Total amount of Al (atomic %) | Al2CO3 and the like + Al—POx and the like (atomic %) | (Al2CO3 and the like + Al—POx and the like)/ total amount of Al |
|---|---|---|---|---|---|---|---|
| | | | AlOF and the like Binding energy = 75.45 eV | AlF3 and the like Binding energy = 76.90 eV | | | |
| Glass D | D-1 | Phosphate aqueous solution rinse | 0.3 | 0 | 7 | 6.7 | 0.96 |
| | | | 0.2 | 0 | 7.5 | 7.3 | 0.97 |

From Table 10, the existence amount of Al in the phosphate state, the ratio ((existence amount of Al in oxidation state+existence amount of Al in phosphate state)/total amount of Al) exceed 0.5.

Example 25

In twelve kinds of fluorophosphoric acid glass, glass E1 to E10, glass F1 and glass F2 having the composition and the properties shown in Table 11 (by atomic %) and table 12 (by cation % and by anion %), similarly to the above-described examples, the plane glass substrate having the optical polish surface was manufactured and was treated under each of conditions C-1 to C-5. Subsequently, the existence amount and the bond state of each element were analyzed and measured at the surface side and the inner side of the glass substrate by XPS.

TABLE 11

| Atomic % | Glass A | Glass B | Glass C | Glass D | Glass E1 | Glass E2 | Glass E3 | Glass E4 | Glass E5 |
|---|---|---|---|---|---|---|---|---|---|
| P  | 1.64 | 8.52 | 1.89 | 8.53 | 0.64 | 0.83 | 0.83 | 2.78 | 2.78 |
| Al | 10.21 | 6.50 | 9.74 | 6.5 | 11.11 | 10.25 | 10.25 | 9.02 | 9.03 |
| Mg | 2.06 | 2.58 | 2.04 | 2.58 | 2.32 | 2.31 | 2.31 | 2.01 | 1.93 |
| Ce | 8.69 | 4.42 | 8.55 | 4.41 | 9.84 | 6.94 | 6.94 | 7.75 | 7.78 |
| Sr | 5.21 | 5.26 | 5.11 | 5.25 | 4.01 | 2.31 | 2.31 | 5.33 | 5.34 |
| Ba | 1.42 | 3.64 | 1.4 | 3.64 | 0.22 | 2.31 | 2.31 | 2.19 | 2.19 |
| Zn | 0 | 0 | 0 | 0 | 0 | 0 | 0 | 0 | 0 |
| Li | 0.30 | 0 | 1.47 | 0 | 0 | 0 | 0 | 0 | 0 |
| Na | 0.36 | 0 | 0.61 | 0 | 1.44 | 0 | 0 | 0 | 0 |
| K  | 0 | 0 | 0 | 0 | 0 | 0 | 0 | 0 | 0 |
| Y  | 0.39 | 0.19 | 0.38 | 0.2 | 0.23 | 3.34 | 3.06 | 0.28 | 0.28 |
| Gd | 0 | 0 | 0 | 0 | 0 | 0.28 | 0 | 0 | 0.71 |
| La | 0 | 0 | 0 | 0 | 0 | 0 | 0.55 | 0 | 0 |
| Yb | 0 | 0 | 0 | 0 | 0 | 0 | 0 | 0.68 | 0 |
| Lu | 0 | 0 | 0 | 0 | 0 | 0 | 0 | 0 | 0 |
| Si | 0 | 0 | 0 | 0 | 0 | 0 | 0 | 0 | 0 |
| F  | 63.85 | 43.34 | 61.41 | 43.32 | 68.26 | 69.34 | 69.34 | 61.46 | 61.47 |
| O  | 5.72 | 25.56 | 7.28 | 25.58 | 1.92 | 2.08 | 2.08 | 8.48 | 8.49 |
| Cl | 0.14 | 0 | 0.12 | 0 | 0 | 0 | 0 | 0 | 0 |
| total | 100 | 100 | 100 | 100.01 | 100 | 100 | 100 | 100 | 100 |
| O/P | 3.49 | 3.00 | 3.85 | 3.00 | 3.00 | 2.50 | 2.50 | 3.05 | 3.05 |
| RE | 0.39 | 0.19 | 0.38 | 0.20 | 0.23 | 3.62 | 3.61 | 0.96 | 0.99 |
| nd | 1.433 | 1.497 | 1.43700 | 1.49700 | 1.43525 | 1.4297 | 1.432 | 1.4427 | 1.443 |
| vd | 96 | 81.6 | 95.10 | 81.61 | 95 | 97.7 | 96.7 | 93.7 | 93.4 |

| Atomic % | Glass E6 | Glass E7 | Glass E8 | Glass E9 | Glass E10 | Glass F1 | Glass F2 |
|---|---|---|---|---|---|---|---|
| P  | 1.74 | 1.54 | 1.54 | 4.74 | 6.63 | 7.58 | 4.76 |
| Al | 9.24 | 9.73 | 9.76 | 21.69 | 20.93 | 6.69 | 1.19 |
| Mg | 1.72 | 1.38 | 1.39 | 1.65 | 1.68 | 2.25 | 5.05 |
| Ce | 5.48 | 7.34 | 7.37 | 9.45 | 9.24 | 6.27 | 2.97 |
| Sr | 2.56 | 2.74 | 2.75 | 6.13 | 7.17 | 5.68 | 2.97 |
| Ba | 1.63 | 2.24 | 2.24 | 3.46 | 2.34 | 2.25 | 6.54 |
| Zn | 0 | 0 | 0 | 0 | 0 | 0 | 0.30 |
| Li | 0 | 0 | 0 | 1.24 | 0.45 | 0 | 0 |
| Na | 0 | 0.34 | 0.34 | 0 | 0 | 0 | 0.36 |
| K  | 3.327898 | 0.25 | 0.25 | 0 | 0 | 0 | 0 |
| Y  | 1.47 | 1.18 | 1.18 | 1.63 | 1.58 | 0 | 0 |
| Gd | 0 | 0 | 0 | 0 | 0 | 0 | 1.37 |
| La | 0.14 | 0 | 0 | 0 | 0 | 0.47 | 0 |
| Yb | 0 | 1.47 | 0 | 0 | 0 | 0 | 0 |
| Lu | 0 | 0 | 1.16 | 0 | 0 | 0 | 0 |
| Si | 1.63 | 0.93 | 0.93 | 0 | 0 | 0 | 0 |
| F  | 67.30 | 66.11 | 66.33 | 43.27 | 40.85 | 45.38 | 58.17 |
| O  | 3.77 | 4.77 | 4.76 | 6.65 | 9.27 | 23.44 | 16.32 |
| Cl | 0 | 0 | 0 | 0.08 | 0.08 | 0 | 0 |
| total | 100 | 100 | 100 | 100 | 100 | 100 | 100 |
| O/P | 2.17 | 3.10 | 3.09 | 1.40 | 1.40 | 3.09 | 3.43 |
| RE | 1.61 | 2.65 | 2.34 | 1.63 | 1.58 | 0.47 | 1.37 |
| nd | 1.43015 | 1.43887 | 1.44076 | 1.43382 | 1.43915 | 1.4945 | 1.4779 |
| vd | 94.7 | 94.2 | 94.2 | 95.8 | 94.9 | 81.6 | 85.2 |

(Note)
RE indicates the sum of amounts of rare-earth metallic elements

TABLE 12

| | Glass A | Glass B | Glass C | Glass D | Glass E1 | Glass E2 | Glass E3 | Glass E4 | Glass E5 |
|---|---|---|---|---|---|---|---|---|---|
| cationic % | | | | | | | | | |
| P | 5.4 | 27.4 | 6.06 | 27.42 | 2.15 | 2.92 | 2.92 | 9.25 | 9.26 |
| Al | 33.7 | 20.9 | 31.23 | 20.89 | 37.27 | 35.87 | 35.88 | 30.03 | 30.06 |
| Mg | 6.8 | 8.3 | 6.54 | 8.29 | 7.79 | 8.09 | 8.10 | 6.70 | 6.43 |
| Ca | 28.7 | 14.2 | 27.41 | 14.18 | 32.99 | 24.28 | 24.29 | 25.78 | 25.90 |
| Sr | 17.2 | 16.9 | 16.38 | 16.88 | 13.44 | 8.09 | 8.10 | 17.75 | 17.77 |
| Ba | 4.7 | 11.7 | 4.49 | 11.70 | 0.75 | 8.09 | 8.10 | 7.27 | 7.28 |
| Zn | 0 | 0 | 0 | 0 | 0 | 0 | 0 | 0 | 0 |
| Li | 1 | 0 | 4.71 | 0 | 0 | 0 | 0 | 0 | 0 |
| Na | 1.2 | 0 | 1.96 | 0 | 4.82 | 0 | 0 | 0 | 0 |
| K | 0 | 0 | 0 | 0 | 0 | 0 | 0 | 0 | 0 |
| Y | 1.3 | 0.6 | 1.22 | 0.64 | 0.78 | 11.69 | 10.69 | 0.94 | 0.95 |
| Gd | 0 | 0 | 0 | 0 | 0 | 0.97 | 0 | 0 | 2.36 |
| La | 0 | 0 | 0 | 0 | 0 | 0 | 1.94 | 0 | 0 |
| Yb | 0 | 0 | 0 | 0 | 0 | 0 | 0 | 2.27 | 0 |
| Lu | 0 | 0 | 0 | 0 | 0 | 0 | 0 | 0 | 0 |
| Si | 0 | 0 | 0 | 0 | 0 | 0 | 0 | 0 | 0 |
| total | 100 | 100 | 100 | 100 | 100 | 100 | 100 | 100 | 100 |
| RE | 1.30 | 0.60 | 1.22 | 0.64 | 0.78 | 12.66 | 12.63 | 3.21 | 3.31 |
| anionic % | | | | | | | | | |
| F | 91.6 | 62.9 | 89.25 | 62.87 | 97.26 | 97.08 | 97.08 | 87.87 | 87.87 |
| O | 8.2 | 37.1 | 10.58 | 37.13 | 2.74 | 2.92 | 2.92 | 12.13 | 12.13 |
| Cl | 0.2 | 0 | 0.17 | 0 | 0 | 0 | 0 | 0 | 0 |
| total | 100 | 100 | 100 | 100 | 100 | 100 | 100 | 100 | 100 |
| nd | 1.433 | 1.497 | 1.43700 | 1.49700 | 1.43525 | 1.4297 | 1.432 | 1.4427 | 1.443 |
| vd | 96 | 81.6 | 95.10 | 81.61 | 95 | 97.7 | 96.7 | 93.7 | 93.4 |

| | Glass E6 | Glass E7 | Glass E8 | Glass E9 | Glass E10 | Glass F1 | Glass F2 |
|---|---|---|---|---|---|---|---|
| cationic % | | | | | | | |
| P | 6.00 | 5.27 | 5.33 | 9.49 | 13.25 | 24.31 | 18.65 |
| Al | 31.94 | 33.39 | 33.76 | 43.37 | 41.86 | 21.46 | 4.66 |
| Mg | 5.94 | 4.74 | 4.79 | 3.31 | 3.35 | 7.20 | 19.81 |
| Ca | 18.95 | 25.21 | 25.49 | 18.90 | 18.47 | 20.11 | 11.66 |
| Sr | 8.84 | 9.40 | 9.51 | 12.26 | 14.34 | 18.23 | 11.66 |
| Ba | 5.65 | 7.68 | 7.77 | 6.92 | 4.68 | 7.20 | 25.64 |
| Zn | 0 | 0 | 0 | 0 | 0 | 0 | 1.17 |
| Li | 0 | 0 | 0 | 2.49 | 0.90 | 0 | 0 |
| Na | 0 | 1.16 | 1.17 | 0 | 0 | 0 | 1.40 |
| K | 11.50 | 0.86 | 0.87 | 0 | 0 | 0 | 0 |
| Y | 5.08 | 4.05 | 4.10 | 3.27 | 3.16 | 0 | 0 |
| Gd | 0 | 0 | 0 | 0 | 0 | 0 | 5.36 |
| La | 0.47 | 0 | 0 | 0 | 0 | 1.50 | 0 |
| Yb | 0 | 5.05 | 0 | 0 | 0 | 0 | 0 |
| Lu | 0 | 0 | 4.00 | 0 | 0 | 0 | 0 |
| Si | 5.63 | 3.19 | 3.22 | 0 | 0 | 0 | 0 |
| total | 100 | 100 | 100 | 100 | 100 | 100 | 100 |
| RE | 5.55 | 9.10 | 8.10 | 3.27 | 3.16 | 1.50 | 5.36 |
| anionic % | | | | | | | |
| F | 94.70 | 93.27 | 93.30 | 86.55 | 81.30 | 65.94 | 78.09 |
| O | 5.30 | 6.73 | 6.70 | 13.29 | 18.54 | 34.06 | 21.91 |
| Cl | 0 | 0 | 0 | 0.16 | 0.15 | 0 | 0 |
| total | 100 | 100 | 100 | 100 | 100 | 100 | 100 |
| nd | 1.43015 | 1.43887 | 1.44076 | 1.43382 | 1.43915 | 1.4945 | 1.4779 |
| vd | 94.7 | 94.2 | 94.2 | 95.8 | 94.9 | 81.6 | 85.2 |

(Note)
RE indicates the sum of amounts of rare-earth metallic elements

[As for Analysis Results of Glass E1 to E10]

In the glass substrate treated under conditions C-1 to C-5, the contents of P, Al, and O are greater at the surface side of the glass article than the inner side of the glass article, and the content of the alkali earth metal, the total content of the alkali earth metal and the content of F are less at the surface side of the glass article than the inner side of the glass article.

All glass E1 to E10 include rare earth element components. When the content of the rare earth element at the inner side of the glass article is defined as RE(in) and the content of the rare earth element at the surface side thereof is defined as RE(su), by atomic %, RE(su)/RE(in) that is a ratio of RE(su) to RE(in) is equal to or less than 2, for each glass substrate treated under conditions C-1 to C-5. In contrast, for the glass substrate that uses each of glass E1 to E10 and is treated by the same method as Test Example B, the optical polish surface suffers from white turbidity, and the ratio (RE(su)/RE(in)) exceeds 3.

In each glass substrate treated under conditions C-1 to C-5, when the content of O at the inner side is defined as O(in) and the content of O at the surface side is defined as O(su), by atomic %, a ratio of O(su) to O(in), (O(su)/O(in)) is 2.0 or more. Meanwhile, in the glass substrate treated by the same method as Test Example A, a ratio (O(su)/O(in)) is less than 2.0.

In each glass substrate treated under conditions C-1 to C-5, all the content of Al in phosphate state and the sum content of Al in oxidation state and Al in phosphate state are greater at the surface side of the glass article than the inner side of the glass article.

Further, in each glass substrate treated under conditions C-1 to C-5, when the content (total amount of Al) of Al in each bond state is defined as Al(all), the content of Al in oxidation state is defined as Al(ox), and the content of Al in phosphate state is defined as Al(ph), by atomic %, a ratio of the sum of Al(ox) and Al(ph) to Al(all) at the surface side, (Al(ox)+Al(ph))/Al(all), is 0.5 or more.

For each glass substrate treated under conditions C-1 to C-5, a ratio of the existence amount of F at the surface side to the existence amount of F in the inner side, existence amount of F in surface side/existence amount of F at inner side, is 0.1 to 0.69. This ratio is 0.70 or less for any glass substrate.

Defects such as fogging or white turbidity were not found on the optical polish surface of each glass substrate treated under conditions C-1 to C-5. Further, the Haze value of the optical polish surface of each glass substrate was 0.0%. A weight decrement was equal to the weight decrement in Example 23.

[As for Analysis Results of Glass F1 and Glass F2]

In the glass substrate treated under conditions C-1 to C-5, the contents of P and O are greater at the surface side of the glass article than the inner side of the glass article, and the content of the alkali earth metal, the total content of the alkali earth metal and the content of F are less at the surface side of the glass article than the inner side of the glass article.

Both glass F1 and F2 include rare earth element components. When the total content of the rare earth element in the inner side of the glass article is defined as RE(in) and the total content of the rare earth element at the surface side thereof is defined as RE(su), by atomic %, RE(su)/RE(in) that is a ratio of RE(su) to RE(in) is equal to or less than 2, for each glass substrate treated under conditions C-1 to C-5. In contrast, for the glass substrate treated by the same method as Test Example B, the optical polish surface suffers from white turbidity, and the ratio (RE(su)/RE(in)) exceeds 3.

In each glass substrate treated under conditions C-1 to C-5, when the content of O in the inner side is defined as O(in) and the content of O at the surface side is defined as O(su), by atomic %, a ratio of O(su) to O(in), (O(su)/O(in)) is more than 1.0.

In each glass substrate treated under conditions C-1 to C-5, the content of Al in phosphate state is greater at the surface side of the glass article than the inner side of the glass article.

Further, in each glass substrate treated under conditions C-1 to C-5, when the content (total amount of Al) of Al in each bond state is defined as Al(all), the content of Al in oxidation state is defined as Al(ox), and the content of Al in phosphate state is defined as Al(ph), by atomic %, a ratio of the sum of Al(ox) and Al(ph) to Al(all) at the surface side, (Al(ox)+Al(ph))/Al(all), is 0.5 or more.

For each glass substrate treated under conditions C-1 to C-5, a ratio of the existence amount of F at the surface side to the existence amount of F in the inner side, existence amount of F in surface side/existence amount of F in inner side, is 0.69 to 0.75. This ratio is 0.75 or less for any glass substrate.

In each glass substrate treated in the same manner as test example A, a ratio (existence amount of surface side/existence amount of inner side) is 0.85 or more.

Defects such as fogging or white turbidity were not found on the optical polish surface of each glass substrate treated under conditions C-1 to C-5. Further, the Haze value of the optical polish surface of each glass substrate was 0.0%. A weight decrement was equivalent to the weight decrement in Example 24.

Example 26

Each of glass A to glass D was processed by a process including the polishing process to have a lens shape such as a biconvex lens, a convex meniscus lens, a concave meniscus lens or a biconcave lens. During the polishing process, the glass was immersed and stored in phosphate aqueous solution (storage liquid) used in each example. Subsequently, the glass was taken out from the phosphate aqueous solution, and was further polished to have the lens shape.

Next, the lens made of each of glass A to glass D was cleaned to remove polishing slurry or processing waste therefrom. The lens cleaned under the same condition as condition C-1 was rinsed, and then vapor treated by IPA. In this way, the lens having the clean surface was obtained.

For the optical polish surface (corresponding to the optical functional face) of the obtained lens, the existence amount of each element at the surface side and the inner side and the existence amount of an element in specific state were analyzed by XPS. The analyzed result was identical to that obtained in the above-described examples.

Next, after the lens made of glass C was treated under condition C-2 (condition C-1+vacuum heating), it was analyzed by XPS. The same result as Example 23 was obtained.

Further, after the lens made of glass C was treated under condition C-3 (condition C-2+ion cleaning), it was analyzed by XPS. The same result as Example 23 was obtained.

In any case, fogging or white turbidity was not found on the optical polish surface of each lens, and Haze value was 0.0%. In addition, since cleaning and rinsing were sufficiently performed, pollutants, such as polishing agent or processing waste, were completely removed. As such, even if vacuum heating or ion cleaning is performed after the treatment by the phosphate aqueous solution, the surface quality of the glass article is maintained.

An optical multilayered film for preventing reflection was coated on the optical polish surface of the lens. The surface side of the lens was not affected by coating and thereby was maintained in a state before the coating, and fogging or white turbidity was not found on the optical polish surface.

Thus, even if the surface of the glass article is coated, the surface quality of the glass article is maintained.

The lens is the glass article that is processed through the process including the polishing process. However, even for a lens that is not subjected to the polishing process and is formed by precision press forming, a lens which is clean or has no fogging or white turbidity may be likewise obtained. The same relationship as the above-described example is applied to the existence amount and the bond state of the element at the surface side and the inner side.

Various kinds of lenses obtained in this way are suitable for an optical element constituting an image-capturing optical system such as a camera, an optical element constituting a projection optical system such as a projector, an optical element such as a micro lens constituting an optical system for recording data on an optical disk or the like or reading data recorded on the optical disk, an optical element mounted on an image-capturing optical system of a monitoring camera such as a CCTV or an in-vehicle camera, an endoscope or the like.

When comparing the conventional optical element with these optical elements, the latter suppresses a defect on the surface, for example, fogging, white turbidity, or the adherence of pollutants, in a very low level, thus allowing the image-capturing optical system to provide a very clear image. For example, they are suitable for a medical instrument requiring a very clear image, such as an endoscope. Further, since the surface defect is a low level, the optical element is not damaged even if the laser beam is incident thereon. Hence, the optical element according to this element is suitable for an optical element for guiding laser beams.

Although the lens has been described as an example of the optical element, other kinds of optical elements such as a prism are possible.

Likewise, it is possible to make the optical element having the high surface quality with glass E1 to E10, glass F1, and glass F2.

Example 27

As the example of glass to which the present invention is applicable, glass 1 and glass 2 were exemplified. Meanwhile, depending on the properties of glass, there is a case where it is more preferable to apply the present invention. According to a specific example, the application of the present invention is more effective in glass having a surface that is likely to cause white turbidity when the glass is immersed in pure water for a given time, compared to glass having a surface that is resistant to white turbidity when the glass is immersed in pure water for a given time. The reason is because the effect of suppressing the white turbidity and maintaining the quality of the glass article may be more remarkably realized in the former glass.

Thus, the inventors researched to provide a standard for distinguishing 「glass to which the present invention is applicable」 from 「glass for which the application of the present invention is suitable」. In this research, XPS spectrums were measured for two types of glass, namely, glass (the above-described glass 1) having the white turbidity on the surface when the glass is immersed in pure water for 15 hours and fluorine-based glass (glass a) having no white turbidity on the surface even if the glass is immersed in pure water for 15 hours. The measurement conditions are identical to those of the above-describe example. Subsequently, unless otherwise particularly mentioned, it remains the same as the above-described example. Further, glass α contains $P^{5+}$ of 24.4 cation %, $O^{2-}$ of 49.7 anion %, $F^-$ of 50.3 anion %, and other cation components.

Figure 9:
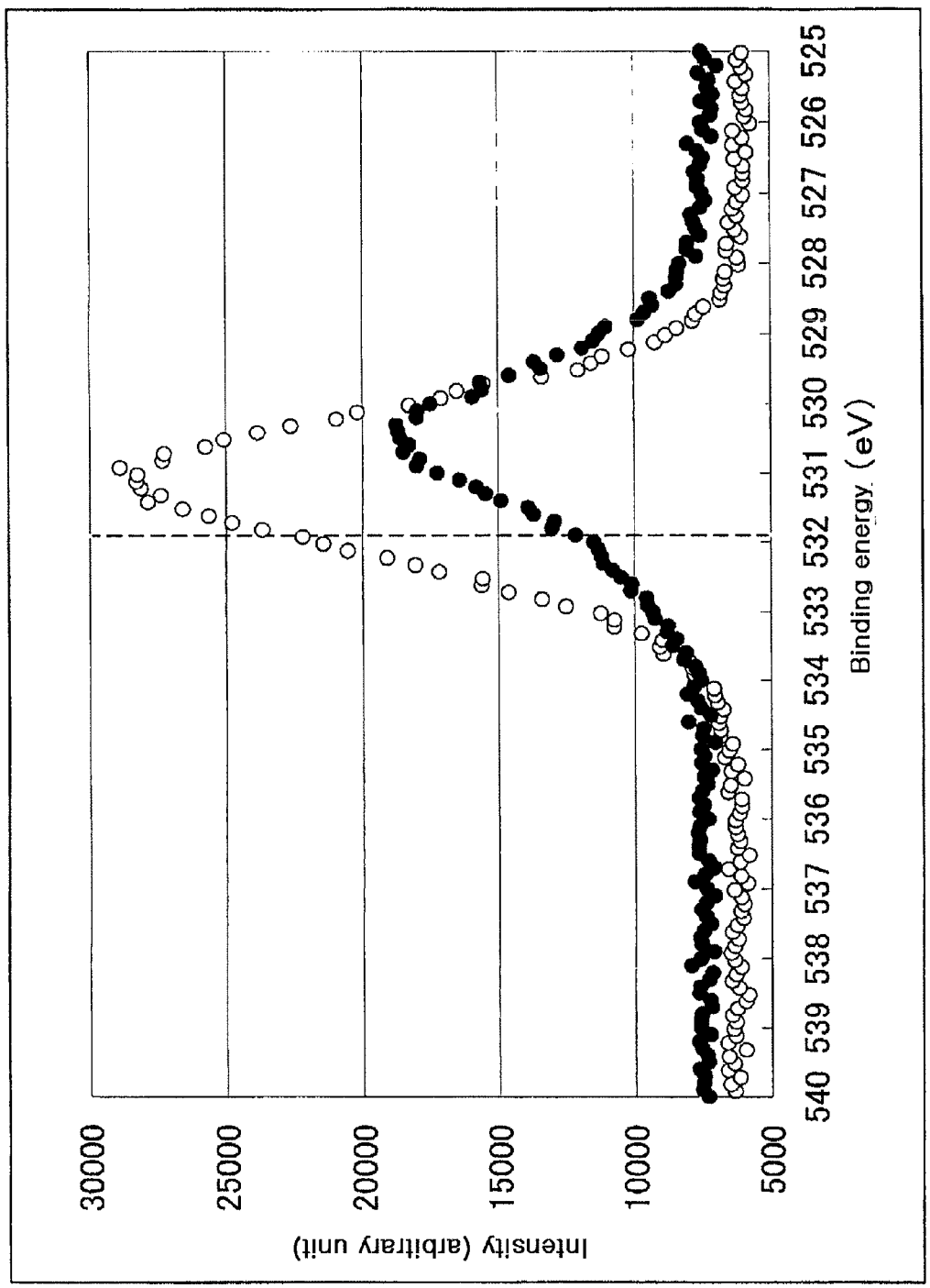
FIG. 9 is a graph showing a result of performing XPS for a glass substrate made of glass 1, and is a graph showing results for O.

First, validation Example 1 is based on the result obtained by performing XPS for glass 1, and will be described below. FIG. 9 is a graph showing a result of performing XPS for a glass substrate made of glass 1.

In FIG. 9, a horizontal axis represents binding energy, while a vertical axis represents a signal intensity of XPS. Here, oxygen O1s is observed, and a XPS spectrum is shown when the binding energy is in a range of 525 to 540 eV.

In FIG. 9, white circles show data obtained at the outermost surface of the glass substrate when the glass substrate made of glass 1 is immersed in pure water for 15 hours. Black circles show data obtained by digging the outermost surface of the glass substrate to 100 nm through sputtering and then performing the XPS analysis for the dug surface. That is, the white circles are a plot about the surface side (outermost surface) after the immersion in pure water, while the black circles are a plot about the inner side of the glass substrate.

In this example, a region deeper than a point of 100 nm from the outermost surface of the glass substrate has an almost constant composition, regardless of a depth.

Further, after the glass substrate made of glass 1 is immersed in pure water for 15 hours, white turbidity occurs on the surface of the glass substrate.

Figure 10:
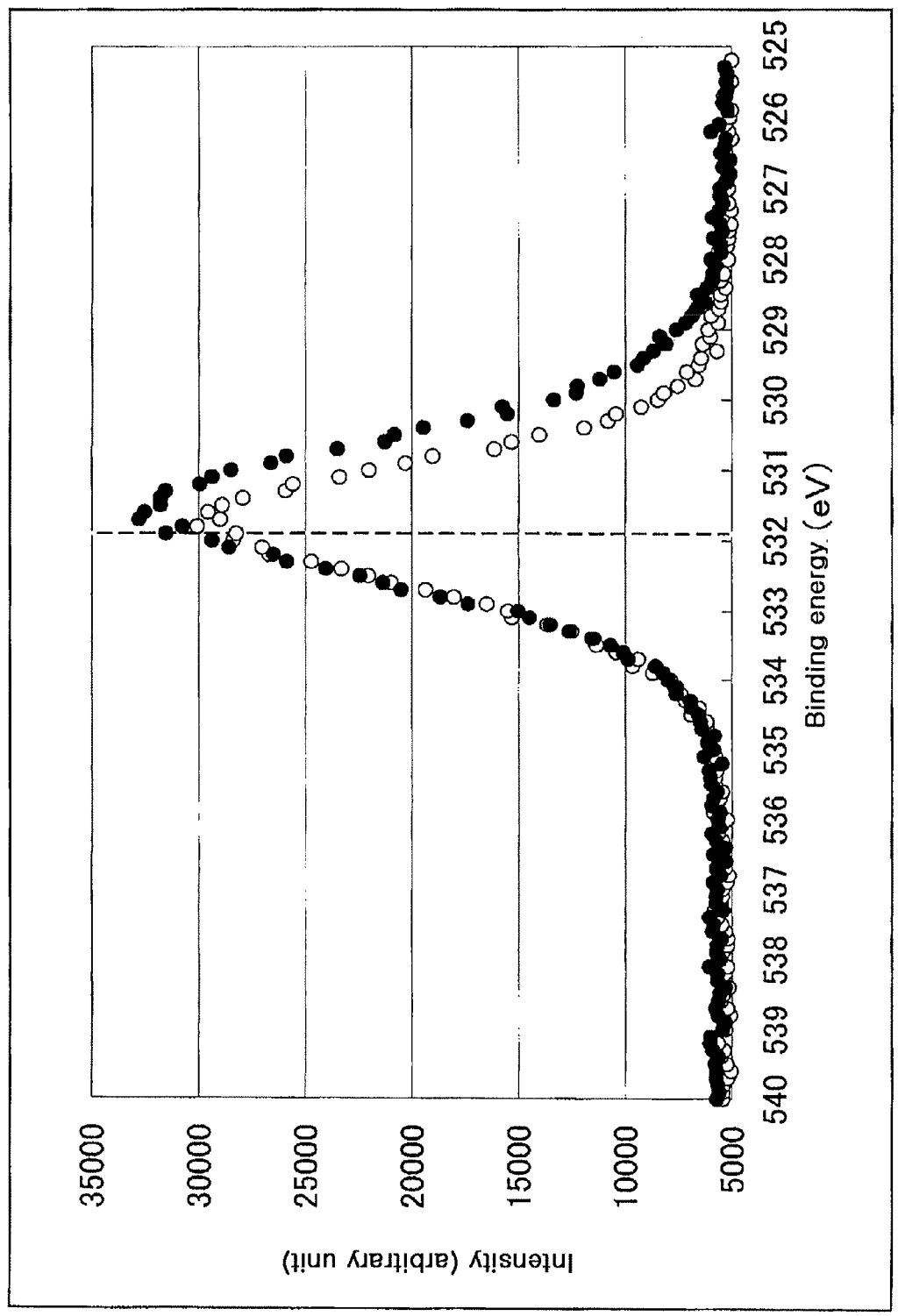
FIG. 10 is a graph showing a result of performing XPS for a glass substrate made of glass α, and is a graph showing results for O.

Meanwhile, validation Example 2 is based on the result obtained by performing XPS for glass α, and will be described below. FIG. 10 is a graph showing a result of performing XPS for a glass substrate made of glass α, and is a graph showing the result for O.

In FIG. 10, a horizontal axis represents binding energy, while a vertical axis represents a signal intensity of XPS.

FIG. 10 shows a XPS waveform when the binding energy is in a range of 525 to 540 eV.

In FIG. 10, white circles are a plot for the outermost surface of the glass substrate when the glass substrate made of glass α is immersed in pure water for 15 hours. Black circles show data obtained by digging the outermost surface of the glass substrate to 100 nm through sputtering and then performing the XPS analysis for the dug surface. That is, the white circles are a plot about the surface side (outermost surface) after the immersion in pure water, while the black circles are a plot about the inner side of the glass substrate.

Likewise, in this example, a region deeper than a point of 100 nm from the outermost surface of the glass substrate has an almost constant composition, regardless of a depth.

Further, after the glass substrate made of glass α is immersed, no white turbidity occurs on the surface of the glass substrate.

In glass α (FIG. 10) having no white turbidity on the surface, when comparing the surface side, i.e., the outermost surface (white circles) with the inner side (black circles) after the immersion in pure water, they are equivalent to each other in signal intensity of XPS or a peak of the signal intensity (white circle) of the outermost surface is lower than a peak of the signal intensity (black circle) of the inner side when the binding energy is 531.9 eV.

On the other hand, in glass 1 (FIG. 9) having white turbidity on the surface, after the immersion in pure water, the surface side, i.e., the outermost surface (white circle) has a significantly higher signal intensity of XPS at the binding energy of 531.9 eV than the inner side (black circle) which is at 100 nm in depth.

Examples of bonds having binding energy corresponding to around 531.9 eV include a metal-POx bond, a metal-OH bond, a metal-$CO_3$ bond, a metal-OF and the like. In contrast, binding energy corresponding to a metal-O bond is at a low energy side.

In FIG. 9, compared to the inner side (black circle), the position of the peak of the surface side (white circle) after the immersion in pure water is shifted to a high energy side.

If the glass substrate made of glass A is immersed in pure water, it is considered that the alkali earth metal component or the F component which are the modifying substance are eluted from the surface of the substrate to the pure water, and ions derived from water, such as hydronium ions or hydroxide ions, are introduced into the glass. Therefore, it is considered that the immersion in pure water causes oxygen in bond state on the surface of the substrate, such as metal-POx or metal-OH, to be relatively increased. When this glass is immersed into pure water, its surface is likely to cause the white turbidity.

On the other hand, even if the glass substrate made of glass α is immersed in pure water, no relative increase in oxygen in bond state, such as metal-POx or metal-OH is observed on the surface of the substrate. Even if this glass is immersed into relatively pure water, its surface rarely has white turbidity.

Further, the existence amounts of each element at the surface side and the inner side are obtained from XPS data. Based on a ratio of the existence amount (atomic %) of oxygen O at the surface side to the existence amount (atomic %) of oxygen O at the inner side, it is possible to determine whether glass is likely to cause white turbidity or not when it being immersed in pure water.

In glass C immersed in pure water under the same condition as test example B, a ratio (existence amount of oxygen O in surface side/existence amount of oxygen O at inner side) of an existence amount of oxygen O at the surface side to an existence amount of oxygen O at the inner side was 3.3.

Meanwhile, in glass α immersed in pure water under the same condition, a ratio (existence amount of oxygen O in surface side/existence amount of oxygen O at inner side) was 1.8.

As such, the ratio (existence amount of oxygen O in surface side/existence amount of oxygen O at inner side) for the glass which is resistant to white turbidity when it being immersed in pure water is less than 2.0, whereas the ratio for the glass which is likely to cause white turbidity is 2.0 or more.

Therefore, after the immersion in pure water is carried out under the same condition as Test Example B, the glass article having the ratio (existence amount of oxygen O in surface side/existence amount of oxygen O at inner side) of 2.0 or more is the glass article to which the present invention is preferably applied. After the immersion in pure water is carried out under the same condition as Test Example B, the glass article having the ratio (existence amount of oxygen O in surface side/existence amount of oxygen O at inner side) of 2.5 or more is a glass article which is more suitable to apply the present invention. The glass article having the ratio of 3.0 or more is a glass article which is much more suitable to apply the present invention. Particularly, in glass having an F content of 80 anion % or more and an O content of 20 anion % or less, glass is preferable, in which a ratio (existence amount of oxygen O in surface side/existence amount of oxygen O at inner side) is within the above-described range after the immersion in pure water is carried out under the same condition as Test Example B.

In glass A, glass E1 to glass E10 each having the F content of 80 anion % or more, a ratio (existence amount of oxygen O in surface side/existence amount of oxygen O at inner side) is 3.0 or more after the immersion in pure water is carried out under the same condition as Test Example B.

For glass B, glass D, glass F1, and glass F2, a ratio (existence amount of oxygen O in surface side/existence amount of oxygen O at inner side) is 2.5 or more after the immersion in pure water is carried out under the same condition as reference example 3.

In the glass that is likely to cause white turbidity on the surface after the immersion in water, a large amount of fluorine is eluted from the glass surface. Thus, a ratio (existence amount of fluorine F in surface side/existence amount of fluorine F at inner side) of the existence amount (atomic %) of fluorine F in surface side to the existence amount (atomic %) of fluorine F at the inner side becomes smaller, compared to the glass that is resistant to white turbidity on the surface after the immersion in water.

In glass C that is immersed in pure water under the same condition as Test Example B, a ratio (existence amount of fluorine F in surface side/existence amount of fluorine F at inner side) is 0.5.

On the other hand, in glass α that is immersed in pure water under the same condition, a ratio (existence amount of fluorine F in surface side/existence amount of fluorine F at inner side) is 0.74.

As such, in the glass that is resistant to white turbidity when it being immersed in water, the ratio (existence amount of oxygen O in surface side/existence amount of oxygen O at inner side) is 0.7 or more. In contrast, in the glass that is likely to cause white turbidity, this ratio is less than 0.7.

Therefore, the glass article that is less than 0.7 in ratio (existence amount of fluorine F in surface side/existence amount of fluorine F at inner side) after the immersion in pure water under the same condition as Test Example B is the glass article to which the present invention is preferably applied. The glass article that is 0.65 or less in ratio (existence amount of fluorine F in surface side/existence amount of fluorine F at inner side) after the immersion in pure water under the same condition as Test Example B is the glass article to which the present invention is more preferably applied. The application of the present invention is more suitable for the glass article having the ratio that is 0.6 or less, and much more suitable for the glass article having the ratio that is 0.55 or less.

In glass A, glass E1 to glass E10, a ratio (existence amount of fluorine F in surface side/existence amount of fluorine F at inner side) is 0.55 or less after the immersion in pure water is carried out under the same condition as test example B.

Further, when the XPS analysis is performed on the surface side of the glass article, the surface subjected to the analysis is preferably an optical polish surface.

As such, a relationship between the XPS spectrum of the outermost surface after the immersion in pure water and the XPS spectrum of the surface that is dug by 100 nm through sputtering may correlate with the ease of white turbidity on the glass surface after the immersion in pure water.

In summary, the application of the present invention is more suitable for a glass article that is made of glass satisfying the following relationship, in addition to the exemplary embodiments described hereinbefore.

$$I_{sur} > I_{in}$$

$I_{sur}$: signal intensity of XPS at binding energy of 531.9 eV, for the surface of glass immersed in pure water for 15 hours $I_{in}$: signal intensity of XPS at binding energy of 531.9 eV, for the surface that is at a point which is 100 nm in depth from the outermost surface of the glass by digging the glass immersed in pure water for 15 hours Here, $I_{sur}$ and $I_{in}$ are an arbitrary unit, but are values calculated by the common unit.

Further, the measurement conditions of XPS remain the same as the above-described conditions and are as follows.

Excitation X-ray: Al mono
Detection region: ϕ100 μm
Take-off angle: 45 deg
Detection depth: 4 to 5 nm (surface)
Sputtering depth: 100 nm
Sputtering condition: $Ar^+$ 2.0 kV
Sputtering rate: about 5 nm/min (in terms of $SiO_2$)

After the immersion in pure water at 16° C. for 15 hours, a glass article having the ratio (existence amount of oxygen O in surface side/existence amount of oxygen O at inner side) of 2.0 or more is preferable, a glass article having the ratio of 2.5 or more is more preferable, and a glass article having the ratio of 3.0 or more is much more preferable.

Further, although pure water has been described as an example of an object for immersing the glass article, the same explanation may apply to sodium hydroxide (NaOH). That is, the application of the present invention is more effective in glass 1 having a surface that is likely to cause white turbidity by eluting a predetermined component from the glass when the glass is immersed in NaOH aqueous solution (pH=8.2) for a given time, compared to glass α having a surface that is resistant to white turbidity even though the glass is immersed in NaOH aqueous solution (pH=8.2) for a given time. The reason is because the effect of suppressing the white turbidity and maintaining the quality of the glass article may be more remarkably realized in the former glass. Further, the ease of white turbidity on the surface when the glass is immersed in NaOH aqueous solution (pH=8.2) may correlate with condition ⌈$I_{sur}$>$I_{in}$⌋.

In this case, the application of the present invention is more suitable for glass satisfying the following relationship, in addition to the exemplary embodiments described hereinbefore.

After the glass is immersed in NaOH aqueous solution (pH=8.2) for 15 hours, the glass surface has Haze value of >1%.

A more suitable relationship is as follows.

After the glass is immersed in NaOH aqueous solution (pH=8.2) for 15 hours, the glass surface has Haze value of >5%.

A much more suitable relationship is as follows.

After the glass is immersed in NaOH aqueous solution (pH=8.2) for 15 hours, the glass surface has Haze value of >10%.

That is, the poorer the quality of the glass surface becomes when the glass article comes into contact with NaOH aqueous solution, the more valuable the application of the present invention is. Therefore, the present invention is suitable for a glass article made of the glass having the above-described properties.

Further, all glass A to D, glass E1 to E10, glass F1, and glass F2 cause the white turbidity on the surface when the glass is immersed in the sodium hydroxide aqueous solution for 15 hours.

Hereinafter, other aspects of the present invention may be additionally described.

[Additional Note 1]

A method of manufacturing a glass article having a cleaning process for cleaning the glass article using liquid, characterized in that a substance constituting the liquid is used as a source for newly supplying a glass component to a surface of the glass article, and a defect occurring in the surface of the glass article coming into contact with the liquid is suppressed.

[Additional Note 2]

A method of manufacturing a glass article having a cleaning process for cleaning the glass article using liquid, characterized in that the liquid is solution including solvent and solute, and the solute is used as a source for newly supplying a glass component to the glass article during the cleaning process.

[Additional Note 3]

A method of manufacturing a glass article by processing a glass material, characterized in that a treatment process is included, which renders a surface of at least a part of the glass material or the glass article to come into contact with treatment liquid (grinding liquid, polishing liquid, cleaning liquid, rinsing liquid, storage liquid, etc.) including solute and solvent and thus treats the glass material or the glass article, the glass material contains, as a glass component, at least P, Al, alkali earth metallic element, O, and F, and in the surface of the glass material or the glass article coming into contact with the treatment liquid, some of the solute is combined with at least one kind of the glass component, thus causing the surface to become poorly soluble in the solvent.

[Additional Note 4]

The method of manufacturing the glass article according to additional note 3, characterized in that a poorly soluble compound is formed on the surface of the glass article.

[Additional Note 5]

The method of manufacturing the glass article according to additional note 4, characterized in that the poorly soluble compound is aluminum phosphate.

[Additional Note 6]

The method of manufacturing the glass article according to any one of additional notes 3 to 5, characterized in that the glass material contains an F content of 55 anion % or more, and an O content of 45 anion % or less.

[Additional Note 7]

A method of manufacturing a glass article by processing a glass material, characterized in that it includes a treatment process of rendering a surface of at least a part of the glass material or the glass article to come into contact with treatment liquid (grinding liquid, polishing liquid, cleaning liquid, rinsing liquid, storage liquid, etc.) including solute and solvent to treat the glass material or the glass article, the glass material contains, as a glass component, at least P, Al, alkali earth metallic element, O, and F, and the treatment liquid is phosphate solution.

[Additional Note 8]

The method of manufacturing the glass article according to any one of additional notes 3 to 7, characterized in that migration of hydrogen contained in the treatment liquid to the glass material or the glass article is suppressed.

[Additional Note 9]

A method of manufacturing a glass article by processing a glass material, characterized in that it includes a treatment process of rendering a surface of at least a part of the glass material or the glass article to come into contact with treatment liquid (grinding liquid, polishing liquid, cleaning liquid, rinsing liquid, storage liquid, etc.) including solute and solvent to treat the glass material or the glass article, the glass material contains, as a glass component, at least P, Al, alkali earth metallic element, O, and F, and in the surface of the glass material or the glass article coming into contact with the treatment liquid, some of the solute is combined with at least one kind of the glass component, thus suppressing migration of hydrogen contained in the treatment liquid to the glass material or the glass article.

[Additional Note 10]

The method of manufacturing the glass article according to any one of additional notes 7 to 9, characterized in that the glass material contains an F content of 55 anion % or more, and an O content of 45 anion % or less.

[Additional Note 11]

The method of manufacturing the glass article according to any one of additional notes 3 to 10, characterized in that the solute is phosphate.

[Additional Note 12]

The method of manufacturing the glass article according to any one of additional notes 3 to 11, characterized in that the solvent includes water.

[Additional Note 13]

The method of manufacturing the glass article according to any one of additional notes 3 to 12, characterized in that the glass material includes Zn.

[Additional Note 14]

The method of manufacturing the glass article according to any one of additional notes 3 to 13, characterized in that the glass material includes a rare earth element.

[Additional Note 15]

The method of manufacturing the glass article according to any one of additional notes 3 to 14, characterized in that the treatment liquid has a buffer action of pH.

[Additional Note 16]

The method of manufacturing the glass article according to any one of additional notes 3 to 15, characterized in that pH of the treatment liquid is in a range of 3 to 9.8.

[Additional Note 17]

The method of manufacturing the glass article according to any one of additional notes 3 to 16, characterized in that the treatment process is at least one process selected from a group including a grinding process using the treatment liquid as the grinding liquid, a polishing process using the treatment liquid as the polishing liquid, and a cleaning process using the treatment liquid as the cleaning liquid.

[Additional Note 18]

The method of manufacturing the glass article according to additional note 17, characterized in that the cleaning process includes a rinsing process using the treatment liquid as the rinsing liquid.

[Additional Note 19]

The method of manufacturing the glass article according to additional note 17 or 18, characterized in that, after the cleaning process, it includes a film forming process of forming a film on the glass article.

[Additional Note 20]

The method of manufacturing the glass article according to any one of additional notes 3 to 19, characterized in that the glass article is an optical element.

[Additional Note 21]

A method of treating a glass article by rendering a surface of at least a part of the glass article to come into contact with treatment liquid (grinding liquid, polishing liquid, cleaning liquid, rinsing liquid, storage liquid, etc.) to thus treat the glass article, characterized in that the glass article contains, as a glass component, at least P, Al, alkali earth metallic element, O, and F, and in the surface of the glass article coming into contact with the treatment liquid, some of solute contained in the treatment liquid is combined with at least one kind of the glass component, thus causing the surface to become poorly soluble in the solvent.

[Additional Note 22]

A method of treating a glass article by rendering a surface of at least a part of the glass article to come into contact with treatment liquid (grinding liquid, polishing liquid, cleaning liquid, rinsing liquid, storage liquid, etc.) to thus treat the glass article, characterized in that the glass article contains, as a glass component, at least P, Al, alkali earth metallic element, O, and F, and the treatment liquid is phosphate solution.

[Additional Note 23]

A method of treating a glass article by rendering a surface of at least a part of the glass article to come into contact with treatment liquid (grinding liquid, polishing liquid, cleaning liquid, rinsing liquid, storage liquid, etc.) to thus treat the glass article, characterized in that the glass article contains, as a glass component, at least P, Al, alkali earth metallic element, O, and F, and in the surface of the glass article coming into contact with the treatment liquid, some of solute contained in the treatment liquid is combined with at least one kind of the glass component, thus suppressing migration of hydrogen contained in the treatment liquid into the glass material or the glass article.

[Additional Note 24]

The method of manufacturing the glass article according to any one of additional notes 3 to 16, characterized in that the treatment process is a storing process for rendering the glass article after being subjected to the polishing process to come into contact with the storage liquid to store the glass article.

[Additional Note 25]

The method of manufacturing the glass article according to additional note 24, characterized in that it includes a cleaning process of cleaning the glass material or the glass article stored in the storing process.

Next, the exemplary embodiments will be summarized.

Exemplary embodiment 1 of the present invention provides a glass article containing P, Al, alkali earth metal, $F^-$ and O, characterized in that contents of P and O are greater at a surface side of the glass article than an inner side thereof, and a total content of the alkali earth metal and a content of F are less at the surface side of the glass article than the inner side thereof.

Preferably, further, a content of the alkali earth metal is less at the surface side of the glass article than the inner side thereof.

Exemplary embodiment 2 of the present invention provides the glass article according to embodiment 1, characterized in that a content of Al is greater at the surface side of the glass article than the inner side thereof.

Exemplary embodiment 3 of the present invention provides the glass article according to embodiment 1 or 2, in which a sum content of Al in oxidation state and Al in phosphate state is preferably greater at the surface side of the glass article than the inner side thereof.

Exemplary embodiment 4 of the present invention provides the glass article according to any one of embodiments 1 to 3, in which a content of Al in phosphate state is preferably greater at the surface side of the glass article than the inner side thereof.

Exemplary embodiment 5 of the present invention provides the glass article according to any one of embodiments 1 to 4, in which contents of Al in oxidation state and Al in phosphate state are preferably greater at the surface side of the glass article than the inner side thereof.

Exemplary embodiment 6 of the present invention provides the glass article according to any one of embodiments 1 to 5, in which a content of alkali earth metal in fluoridation state is preferably less at the surface side of the glass article than the inner side thereof.

Exemplary embodiment 7 of the present invention provides the glass article according to embodiments 1 to 6, in which the alkali earth metal is preferably at least one selected from a group consisting of Mg, Ca, Sr, and Ba.

Exemplary embodiment 8 of the present invention provides the glass article according to any one of embodiments 1 to 7, which is preferably made of glass containing an F content ($F^-$ content) of 55 anion % or more and an O content ($O^{2-}$ content) of 45 anion % or less, is more preferably made of glass containing an F content of 80 anion % or more and an O content of 20 anion % or less, and is much more preferably made of glass containing an F content of 85 anion % or more and an O content of 15 anion % or less.

Exemplary embodiment 9 of the present invention provides the glass article according to any one of embodiments 1 to 8, in which Haze value of the surface of the glass article is preferably 1% or less.

In the exemplary embodiment of the present invention, the glass article is preferably made of glass, in which a mole ratio ($O^{2-}/P^{5+}$) that is a ratio of an $O^{2-}$ content to a $P^{5+}$ content is 2.8 or more.

In the exemplary embodiment of the present invention, the glass article is preferably made of glass, in which an F content is 55 anion % or more, an O content is 45 anion % or less, and a mole ratio of $O^{2-}/P^{5+}$ is 2.5 or more, and is more preferably made of glass, in which the F content is 80 anion % or more, the O content is 20 anion % or less, and the mole ratio of $O^{2-}/P^{5+}$ is 2.5 or more, and is much more preferably made of glass, in which the F content is 85 anion % or more, the O content is 15 anion % or less, and the mole ratio of $O^{2-}/P^{5+}$ is 2.5 or more.

In the exemplary embodiment of the present invention, the glass article is preferably made of glass satisfying the following equation (1).

$$I_{sur} > I_{in} \quad (1)$$

where $I_{sur}$ signal intensity of XPS at binding energy of 531.9 eV, for the surface of glass immersed in pure water for 15 hours, $I_{in}$: signal intensity of XPS at binding energy of 531.9 eV, for the surface that is at a point which is 100 nm in depth from the outermost surface of the glass by digging the glass immersed in pure water for 15 hours, $I_{sur}$ and $I_{in}$ are an arbitrary unit, but are values calculated by the common unit.

In the exemplary embodiment of the present invention, the glass article is preferably made of glass, in which an F content is 55 anion % or more, an O content is 45 anion % or less, and the above equation (1) is satisfied, and is more preferably made of glass, in which the F content is 80 anion % or more, the O content is 20 anion % or less, and the above equation (1) is satisfied, and is much more preferably made of glass, in which the F content is 85 anion % or more, the O content is 15 anion % or less, and the above equation (1) is satisfied.

In the exemplary embodiment of the present invention, the glass article is preferably made of glass, in which an F content is 55 anion % or more, an O content is 45 anion % or less, a mole ratio of $O^{2-}/P^{5+}$ is 2.5 or more, and the above equation (1) is satisfied, and is more preferably made of glass, in which the F content is 80 anion % or more, the O content is 20 anion % or less, the mole ratio of $O^{2-}/P^{5+}$ is 2.5 or more, and the above equation (1) is satisfied, and is much more preferably made of glass, in which the F content is 85 anion % or more, the O content is 15 anion % or less, the mole ratio of $O^{2-}/P^{5+}$ is 2.5 or more, and the above equation (1) is satisfied.

In the exemplary embodiment of the present invention, the glass article is preferably made of glass, in which Haze value of the glass surface is more than 1% after the glass is immersed in NaOH aqueous solution (pH=8.2) for 15 hours.

Further, in each of the embodiments, a glass article is preferred, which includes a rare earth element and in which RE(su)/RE(in) that is a ratio of RE(su) to RE(in) is equal to or less than 3, when the total content of the rare earth element at the inner side is defined as RE(in) and the total content of the rare earth element at the surface side is defined as RE(su), by atomic %.

Further, in each of the embodiments, a glass article is preferred, in which a ratio of O(su) to O(in), (O(su)/O(in)) is 2.0 or more when the content of O at the inner side is defined as O(in) and the content of O at the surface side is defined as O(su), by atomic %. Particularly, an $F^-$ content of 80 anion % or more is preferable.

Further, in each of the embodiments, a glass article is preferred, in which a sum content of Al in oxidation state and Al in phosphate state is preferably greater at the surface side of the glass article than the inner side thereof.

Further, in each of the embodiments, a glass article is preferred, in which a sum content of rare earth element is 0.1 cation % or more. A glass article is preferred, in which a sum content of Y, La, Gd, Yb, and Lu is 0.1 cation % or more.

Further, in each of the embodiments, a glass article is preferred, in which a sum content of rare earth element is 12 cation % or less. A glass article is preferred, in which a sum content of Y, La, Gd, Yb, and Lu is 12 cation % or less.

Further, in each of the embodiments, a glass article is preferred, in which a ratio (Al(ox)+Al(ph))/Al(all)) that is a ratio of a sum of Al(ox) and Al(ph) to Al(all) at the surface side is 0.5 or more, when the content of Al is defined as Al(all), the content of Al in the oxidation state is defined as Al(ox), and the content of Al in the phosphate state is defined as Al(ph), by atomic %.

Further, in each of the embodiments, a glass article is preferred, in which a ratio (existence amount of oxygen O in surface side/existence amount of oxygen O at inner side) of the existence amount (atomic %) of oxygen O at the surface side to the existence amount (atomic %) of oxygen O at the inner side is 2 or more, after the glass article is immersed in pure water at 16° C. for 15 hours. A glass article having the ratio of 2.5 or more is more preferable, and a glass article having the ratio of 3.0 or more is much more preferable.

In each of the embodiments, a glass article is preferred, in which a ratio (existence amount of fluorine F in surface side/existence amount of fluorine F at inner side) of the existence amount (atomic %) of fluorine F at the surface side to the existence amount (atomic %) of fluorine F at the inner side is less than 0.7, after the glass article is immersed in pure water at 16° C. for 15 hours. A glass article having the ratio of 0.65 or less is more preferable, a glass article having the ratio of 0.6 or less is much more preferable, and a glass article having the ratio of 0.55 or less is still more preferable.

In each of the embodiments, a ratio (content of fluorine F in surface side/content of fluorine F at inner side) of the content of fluorine F at the surface side to the content of fluorine F at the inner side is preferably 0.80 or less, more preferably 0.75 or less, and much more preferably 0.70 or less.

Exemplary embodiment 10 of the present invention provides a glass article according to each embodiment, in which the glass article is preferably an optical element.

Further, in exemplary embodiment 10 of the present invention, a glass article having an optical polish surface is preferred.

Finally, variants of the present invention will be summarized.

Variant 1 of the present invention provides a method of manufacturing a glass article by processing a glass material, characterized in that a treatment process is included, which renders a surface of at least a part of the glass material or the glass article to come into contact with treatment liquid (grinding liquid, polishing liquid, cleaning liquid, rinsing liquid, storage liquid, etc.) including solute and solvent and thus treats the glass material or the glass article, the glass material contains, as a glass component, at least P, Al, alkali earth metallic element, O, and F, and in the surface of the glass material or the glass article coming into contact with the treatment liquid, some of the solute is combined with at least one kind of the glass component, thus causing the surface to become poorly soluble in the solvent.

In variant 1, in the surface of the glass material or the glass article coming into contact with the treatment liquid, at least one kind of an alkali earth metal component and an F component contained in the glass material is eluted into the treatment liquid, and some of the solute is combined with at least one kind of the glass component, thus forming a poor soluble compound.

Further, in variant 1, the solute is preferably phosphate.

Further, in variant 1, preferably, phosphate ions in the treatment liquid are combined with an Al component in the glass, thus forming a poor soluble compound.

Further, in variant 1, it is preferable that the glass material contains Zn as the glass component, and phosphate ions in the treatment liquid are combined with a Zn component in the glass, thus forming a poor soluble compound.

Variant 2 of the present invention provides a method of manufacturing a glass article made by processing a glass material, characterized in that a treatment process is included, which renders a surface of at least a part of the glass material or the glass article to come into contact with treatment liquid (grinding liquid, polishing liquid, cleaning liquid, rinsing liquid, storage liquid, etc.) including solute and solvent and thus treats the glass material or the glass article, the glass material contains, as a glass component, at least P, Al, alkali earth metallic element, O, and F, and in the surface of the glass material or the glass article coming into contact with the treatment liquid, some of the solute is combined with at least one kind of the glass component, thus suppressing migration of hydrogen contained in the treatment liquid into glass.

In Variant 2, in the surface of the glass material or the glass article coming into contact with the treatment liquid, at least one kind of an alkali earth metal component and an F component contained in the glass material is eluted into the treatment liquid, and some of the solute is combined with at least one kind of the glass component, thus suppressing migration of hydrogen.

In Variant 2, the solute is preferably phosphate.

Variant 3 of the present invention provides a method of manufacturing a glass article made by processing a glass material, characterized in that a treatment process is included, which renders a surface of at least a part of the glass material or the glass article to come into contact with treatment liquid (grinding liquid, polishing liquid, cleaning liquid, rinsing liquid, storage liquid, etc.) including solute and solvent and thus treats the glass material or the glass article, the glass material contains, as a glass component, at least P, Al, alkali earth metallic element, O, and F, and the treatment liquid is phosphate solution.

In Variant 3, in the surface of the glass material or the glass article coming into contact with the treatment liquid, at least one kind of an alkali earth metal component and an F component contained in the glass material is eluted into the treatment liquid, and phosphate ions contained in the treatment liquid is combined with at least one kind of the glass component.

In Variants 1 to 3, the method of manufacturing the glass article preferably suppresses migration of hydrogen contained in the treatment liquid to the glass.

In Variants 1 to 3, solvent preferably includes water.

Further, in variants 1 to 3, the glass material preferably contains an F content ($F^-$ content) of 20 anion % or more, and an O content ($O^{2-}$ content) of 80 anion % or less.

Further, in variants 1 to 3, the glass material preferably contains an F content ($F^-$ content) of 55 anion % or more, and an O content ($O^{2-}$ content) of 45 anion % or less.

Further, in the glass material of variants 1 to 3, glass is preferably used, in which a mole ratio of an $O^{2-}$ content to a $P^{5+}$ content, $O^{2-}/P^{5+}$ is 2.8 or more.

Further, in the glass material, glass is preferably used, in which an F content is 55 anion % or more, and an O content is 45 anion % or less, and a mole ratio of $O^{2-}/P^{5+}$ is 2.5 or more.

Further, in the glass material, glass satisfying the following equation (1) is preferably used.

$$I_{sur} > I_{in} \quad (1)$$

where $I_{sur}$: signal intensity of XPS at binding energy of 531.9 eV, for the surface of glass immersed in pure water for 15 hours, $I_{in}$: signal intensity of XPS at binding energy of 531.9 eV, for the surface that is at a point which is 100 nm in depth from the outermost surface of the glass by digging the glass immersed in pure water for 15 hours, $I_{sur}$ and $I_{in}$ are an arbitrary unit, but are values calculated by the common unit.

Further, in the glass material, glass is preferably used, in which an F content is 55 anion % or more, an O content is 45 anion % or less, and the following equation (1) is satisfied.

Further, in the glass material, glass is preferably used, in which an F content is 55 anion % or more, an O content is 45 anion % or less, a mole ratio of $O^{2-}/P^{5+}$ is 2.5 or more, and the following equation (1) is satisfied.

In the glass material, glass is preferably used, in which Haze value of the glass surface is more than 1% after immersion in NaOH aqueous solution (pH=8.2) for 15 hours.

Further, in Variants 1 to 3, the glass material preferably contains Zn.

Further, in Variants 1 to 3, the glass material preferably contains a rare earth element.

Further, in Variants 1 to 3, the glass material preferably contains the rare earth element of 0.1 cation % or more.

Further, in Variants 1 to 3, the glass material preferably contains $Y^{3+}$ as the rare earth element.

Further, in Variants 1 to 3, the glass material preferably contains $Y^{3+}$ of 0.1 cation % or more.

Further, in Variants 1 to 3, the glass material preferably contains alkali metal.

Further, in Variants 1 to 3, the treatment liquid preferably has the buffer action of pH.

Further, in Variants 1 to 3, the treatment liquid preferably has pH of 3 to 9.8.

Further, in Variants 1 to 3, the treatment process is preferably at least one process selected from a group including a grinding process using the treatment liquid as the grinding liquid, a polishing process using the treatment liquid as the polishing liquid, and a cleaning process using the treatment liquid as the cleaning liquid.

Further, in Variants 1 to 3, the cleaning process preferably includes a rinsing process using the treatment liquid as the rinsing liquid.

Further, in Variants 1 to 3, after the cleaning process, a film forming process is preferably included to form a film on the glass article.

Further, in Variants 1 to 3, the glass article is preferably an optical element.

Further, a glass article having an optical polish surface is preferable.

Variant 4 of the present invention provides a method of treating a glass article by rendering a surface of at least a part of the glass article to come into contact with treatment liquid (grinding liquid, polishing liquid, cleaning liquid, rinsing liquid, storage liquid, etc.) to thus treat the glass article, characterized in that the glass article contains, as a glass component, at least P, Al, alkali earth metallic element, O, and F, and the treatment liquid includes solute and solvent, and in the surface of the glass article coming into contact with the treatment liquid, some of solute is combined with at least one kind of the glass component, thus forming a poor soluble compound in solvent.

Variant 5 of the present invention provides a method of treating a glass material by rendering a surface of at least a part of the glass material, which is to form a glass article by processing, to come into contact with treatment liquid (grinding liquid, polishing liquid, cleaning liquid, rinsing liquid, storage liquid, etc.) including solute and solvent to thus treat the glass material, characterized in that the glass material contains, as a glass component, at least P, Al, alkali earth metallic element, O, and F, and in the surface of the glass article coming into contact with the treatment liquid, some of solute is combined with at least one kind of the glass component, thus forming a poor soluble compound in solvent.

Variant 6 of the present invention provides a method of treating a glass article by rendering a surface of at least a part of the glass article to come into contact with treatment liquid (grinding liquid, polishing liquid, cleaning liquid, rinsing liquid, storage liquid, etc.) to thus treat the glass article, characterized in that the glass article contains, as a glass component, at least P, Al, alkali earth metallic element, O, and F, and the treatment liquid includes solute and solvent, and in the surface of the glass article coming into contact with the treatment liquid, some of solute is combined with at least one kind of the glass component, thus causing the surface to become poor soluble in the solvent.

Variant 7 of the present invention provides a method of treating a glass material by rendering a surface of at least a part of the glass material, which is to form a glass article by processing, to come into contact with treatment liquid (grinding liquid, polishing liquid, cleaning liquid, rinsing liquid, storage liquid, etc.) to thus treat the glass material, characterized in that the glass material contains, as a glass component, at least P, Al, alkali earth metallic element, O, and F, and the treatment liquid includes solute and solvent, and in the surface of the glass article coming into contact with the treatment liquid, some of solute is combined with at least one kind of the glass component, thus causing the surface to become poor soluble in the solvent.

Variant 8 of the present invention provides a method of treating a glass article by rendering a surface of at least a part of the glass article to come into contact with treatment liquid (grinding liquid, polishing liquid, cleaning liquid, rinsing liquid, storage liquid, etc.) to thus treat the glass article, characterized in that the glass article contains, as a glass component, at least P, Al, alkali earth metallic element, O, and F, and the treatment liquid includes solute and solvent, and in the surface of the glass article coming into contact with the treatment liquid, some of solute is combined with at least one kind of the glass component, thus suppressing migration of hydrogen contained in the treatment liquid into glass.

Variant 9 of the present invention provides a method of treating a glass material by rendering a surface of at least a part of the glass material, which is to form a glass article by processing, to come into contact with treatment liquid (grinding liquid, polishing liquid, cleaning liquid, rinsing liquid, storage liquid, etc.) to thus treat the glass material, characterized in that the glass material contains, as a glass component, at least P, Al, alkali earth metallic element, O, and F, and the treatment liquid includes solute and solvent, and in the surface of the glass article coming into contact with the treatment liquid, some of solute is combined with at least one kind of the glass component, thus suppressing migration of hydrogen contained in the treatment liquid into glass.

Variant 10 of the present invention provides a method of treating a glass article by rendering a surface of at least a part of the glass article to come into contact with treatment liquid (grinding liquid, polishing liquid, cleaning liquid, rinsing liquid, storage liquid, etc.) to thus treat the glass article, characterized in that the glass article contains, as a glass component, at least P, Al, alkali earth metallic element, O, and F, and the treatment liquid is phosphate solution.

Variant 11 of the present invention provides a method of treating a glass material by rendering a surface of at least a part of the glass material, which is to form a glass article by processing, to come into contact with treatment liquid (grinding liquid, polishing liquid, cleaning liquid, rinsing liquid, storage liquid, etc.) to thus treat the glass material, characterized in that the glass material contains, as a glass component, at least P, Al, alkali earth metallic element, O, and F, and the treatment liquid is phosphate solution.

Further, preferred embodiments in variants 4 to 11 for the treatment method are the same as preferred embodiments in variants for the method of manufacturing the glass article.

The above aspects and embodiments may combine in various ways if there is no contradiction.

What is claimed is:

1. A glass article containing P, Al, alkaline earth metals, F and O, wherein
    contents of P and O are greater at a surface side of the glass article than an inner portion thereof,
    a total content of the alkaline earth metal and a content of F are less at the surface side of the glass article than the inner portion thereof, and
    the content of F is 55 anion % or more and the content of O is 45 anion % or less in the inner portion of the glass article.

2. The glass article according to claim 1, wherein a plurality of alkaline earth metals are contained in the glass article, and a content of each respective alkaline earth metal of the plurality or alkaline earth metals contained in the glass article is less at the surface side of the glass article than the inner portion thereof.

3. The glass article according to claim 1, wherein a content of Al is greater at the surface side of the glass article than the inner portion thereof.

4. The glass article according to claim 1, wherein the glass article contains a rare earth element, and RE(su)/RE(in) that is a ratio of RE(su) to RE(in) is equal to or less than 3, provided that a total content of the rare earth element in the inner portion of the glass article is defined as RE(in) and a total content of the rare earth element at the surface side of the glass article is defined as RE(su), by atomic %.

5. The glass article according to claim 1, wherein, provided that a content of O in the inner portion of the glass article is defined as O(in) and a content of O at the surface side of the glass article is defined as O(su), by atomic %, O(su)/O(in) that is a ratio of O(su) to O(in) is equal to or more than 2.0.

6. The glass article according to claim 1, wherein a total content of Al in an oxidation state and Al in a phosphate state is greater at the surface side of the glass article than the inner portion thereof.

7. The glass article according to claim 1, wherein a content of Al in a phosphate state is greater at the surface side of the glass article than the inner portion thereof.

8. The glass article according to claim 1, wherein, provided that a sum of the content of Al per bond state is defined as Al(all), a content of Al in an oxidation state is defined as Al(ox), and a content of Al in a phosphate state is defined as Al(ph), by atomic %, (Al(ox) Al(ph))/Al(all) that is a ratio of a sum of Al(ox) and Al(ph) to Al(all) at the surface side is equal to or more than 0.5.

9. The glass article according to claim 1, wherein contents of Al in an oxidation state and Al in a phosphate state are greater at the surface side of the glass article than the inner portion thereof.

10. The glass article according to claim 9, wherein a content of alkaline earth metal in a fluorinated state is less at the surface side of the glass article than the inner portion thereof.

11. The glass article according to claim 1, wherein the alkaline earth metal is at least one selected from a group consisting of Mg, Ca, Sr and Ba.

12. The glass article according to claim 1, wherein a Haze value of a surface of the glass article is 1% or less.

13. The glass article according to claim 1, wherein the glass article is an optical element.

14. The glass article according to claim 1, wherein the content of F is 70 anion % or more and the content of O is 30 anion % or less, in the inner portion of the glass article.

15. The glass article according to claim 1, wherein the content of F is 80 anion % or more and the content of O is 20 anion % or less, in the inner portion of the glass article.

16. The glass article according to claim 1, wherein the content of F is 85 anion % or more and the content of O is 15 anion % or less, in the inner portion of the glass article.

17. The glass article according to claim 1, wherein the glass article contains
$P^{5+}$ at 1 to 35 cation %,
$Al^{3+}$ at 10 to 40 cation %,
$Li^+$ at 0 to 25 cation %,
$F^-$ at 55 to 99 anion %, and
$O^{2-}$ at 1 to 45 anion %.

18. The glass article according to claim 17, wherein
the content of $P^{5+}$ is 3 to 25 cation %,
the content of $Al^{3+}$ is more than 30 cation % and is 40 cation % or less,
the content of $Li^+$ is 0 to 20 cation %,
the content of $F^-$ is 65 to 99 anion %, and
the content of $O^{2-}$ is 1 to 35 anion %.

19. The glass article according to claim 1, wherein a total content of rare earth ion is 0.1 to 10 cation %.

20. The glass article according to claim 1, wherein a ratio $$\frac{\text{existence amount of O(oxygen) at the surface side of the glass article}}{\text{existence amount of O(oxygen) in the inner portion of the glass article}}$$

of the existence amount (atomic %) of oxygen at the surface side to the existence amount (atomic %) of oxygen at the inner portion is 2 or more, after the glass article is immersed in pure water at 16° C. for 15 hours.

21. The glass article according to claim 1, wherein a ratio $$\frac{\text{existence amount of F(fluorine) at the surface side of the glass article}}{\text{existence amount of F(fluorine) in the inner portion of the glass article}}$$

of the existence amount (atomic %) of fluorine at the surface side to the existence amount (atomic %) of fluorine in the inner portion is less than 0.7, after the glass article is immersed in pure water at 16° C. for 15 hours.

* * * * *